US009900298B2

(12) United States Patent
Bailor et al.

(10) Patent No.: US 9,900,298 B2
(45) Date of Patent: *Feb. 20, 2018

(54) COLLABORATIVE AUTHORING MODES

(71) Applicant: Microsoft Technology Licensing, LLC, Redmond, WA (US)

(72) Inventors: Jonathan Beckett Bailor, Bellevue, WA (US); Ethan Joseph Bernstein, Mercer Island, WA (US); Mark Rolland Knight, Bellevue, WA (US); Christopher James Antos, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/474,481

(22) Filed: Sep. 2, 2014

(65) Prior Publication Data
US 2014/0373108 A1 Dec. 18, 2014

Related U.S. Application Data

(63) Continuation of application No. 11/957,010, filed on Dec. 14, 2007, now Pat. No. 8,825,758.

(51) Int. Cl.
*G06F 15/16* (2006.01)
*H04L 29/06* (2006.01)
(Continued)

(52) U.S. Cl.
CPC ............. *H04L 63/08* (2013.01); *G06F 17/24* (2013.01); *G06F 17/30168* (2013.01); *G06F 21/31* (2013.01)

(58) Field of Classification Search
CPC . H04L 65/403; H04L 63/08; G06F 17/30168; G06F 17/24; G06F 21/31
See application file for complete search history.

(56) References Cited

U.S. PATENT DOCUMENTS 4,855,580 A 8/1989 Van Maanen, Jr.
5,107,443 A 4/1992 Smith
(Continued)

FOREIGN PATENT DOCUMENTS

CN 1276568 A 12/2000
CN 1489075 A 4/2004
(Continued)

OTHER PUBLICATIONS

European Decision to Refuse and the Minutes of the Oral Hearing in EP Application 09739350.8, dated Dec. 4, 2013, 36 pgs.
(Continued)

*Primary Examiner* — June Sison
*Assistant Examiner* — Steven Nguyen

(57) ABSTRACT

A collaborative authoring application provides an authoring environment in which two or more users can edit a document concurrently. Each user edits a copy of the document, sends updates to a master copy of the document, and receives updates from the master copy of the document. The authoring environment may be configured into a public mode of operation, in which content and metadata are synchronized automatically, or into a private mode of operation, in which metadata is synchronized automatically and content is synchronized only at the request of the user. The authoring application may edit documents offline in public or private mode.

20 Claims, 22 Drawing Sheets

(51) Int. Cl.
*G06F 17/30* (2006.01)
*G06F 17/24* (2006.01)
*G06F 21/31* (2013.01)

(56) References Cited

U.S. PATENT DOCUMENTS

| | | |
|---|---|---|
| 5,142,619 A | 8/1992 | Webster, III |
| 5,313,394 A | 5/1994 | Clapp |
| 5,339,389 A | 8/1994 | Bates |
| 5,446,842 A | 8/1995 | Schaeffer |
| 5,486,686 A | 1/1996 | Zdybel |
| 5,535,332 A | 7/1996 | Ishida |
| 5,568,640 A | 10/1996 | Nishiyama |
| 5,623,659 A | 4/1997 | Shi et al. |
| 5,630,138 A | 5/1997 | Raman |
| 5,664,186 A | 9/1997 | Bennett |
| 5,671,428 A | 9/1997 | Muranaga |
| 5,692,178 A | 11/1997 | Shaughnessy |
| 5,729,734 A | 3/1998 | Parker |
| 5,751,958 A | 5/1998 | Zweben |
| 5,758,079 A | 5/1998 | Ludwig et al. |
| 5,781,732 A | 7/1998 | Adams |
| 5,781,908 A | 7/1998 | Williams |
| 5,787,262 A | 7/1998 | Shakib |
| 5,835,950 A | 11/1998 | Cho et al. |
| 5,893,126 A | 4/1999 | Drews et al. |
| 5,920,694 A | 7/1999 | Carleton et al. |
| 5,963,931 A | 10/1999 | Fagg |
| 5,966,512 A | 10/1999 | Bates et al. |
| 5,999,208 A | 12/1999 | McNerney et al. |
| 6,000,945 A | 12/1999 | Sanchez-Lazer |
| 6,006,239 A | 12/1999 | Bhansali |
| 6,026,461 A | 2/2000 | Baxter et al. |
| 6,055,546 A | 4/2000 | Pongracz |
| 6,065,026 A | 5/2000 | Cornelia |
| 6,067,551 A | 5/2000 | Brown |
| 6,073,161 A | 6/2000 | DeBoskey |
| 6,088,702 A | 7/2000 | Plantz |
| 6,175,853 B1 | 1/2001 | Stracke, Jr. |
| 6,202,085 B1 | 3/2001 | Benson |
| 6,209,010 B1 | 3/2001 | Gauthier |
| 6,209,128 B1 | 3/2001 | Gerard |
| 6,240,414 B1 | 5/2001 | Beizer et al. |
| 6,244,575 B1 | 6/2001 | Vaartstra et al. |
| 6,275,935 B1 | 8/2001 | Barlow |
| 6,317,777 B1 | 11/2001 | Skarbo |
| 6,324,544 B1 | 11/2001 | Alam et al. |
| 6,327,584 B1 | 12/2001 | Xian |
| 6,327,611 B1 | 12/2001 | Everingham |
| 6,341,291 B1 | 1/2002 | Bentley |
| 6,342,906 B1 | 1/2002 | Kumar |
| 6,351,271 B1 | 2/2002 | Mainwaring et al. |
| 6,363,352 B1 | 3/2002 | Dailey |
| 6,411,965 B2 | 6/2002 | Klug |
| 6,430,576 B1 | 8/2002 | Gates et al. |
| 6,437,778 B1 | 8/2002 | Matsui et al. |
| 6,438,548 B1 | 8/2002 | Grim, III |
| 6,438,563 B1 | 8/2002 | Kawagoe |
| 6,438,564 B1 | 8/2002 | Morton et al. |
| 6,446,093 B2 | 9/2002 | Tabuchi |
| 6,502,113 B1 | 12/2002 | Crawford et al. |
| 6,507,865 B1 | 1/2003 | Hanson et al. |
| 6,526,434 B1 | 2/2003 | Carlson et al. |
| 6,529,905 B1 | 3/2003 | Bray |
| 6,560,614 B1 | 5/2003 | Barboy |
| 6,560,620 B1 | 5/2003 | Ching |
| 6,564,246 B1 | 5/2003 | Varma et al. |
| 6,574,377 B1 | 6/2003 | Cahill |
| 6,587,870 B2 | 7/2003 | Takagi et al. |
| 6,594,664 B1 | 7/2003 | Estrada et al. |
| 6,610,104 B1 | 8/2003 | Lin |
| 6,629,129 B1 | 9/2003 | Bookspan et al. |
| 6,662,209 B2 | 12/2003 | Potts, Jr. |
| 6,678,882 B1 | 1/2004 | Hurley et al. |
| 6,681,371 B1 | 1/2004 | Devanbu |
| 6,681,382 B1 | 1/2004 | Kakumani et al. |
| 6,687,878 B1 * | 2/2004 | Eintracht et al. ............. 715/201 |
| 6,711,718 B2 | 3/2004 | Pfeil |
| 6,751,618 B1 | 6/2004 | Germscheid |
| 6,757,678 B2 | 6/2004 | Myllymaki |
| 6,757,696 B2 | 6/2004 | Multer et al. |
| 6,757,767 B1 | 6/2004 | Kelleher |
| 6,757,871 B1 | 6/2004 | Sato |
| 6,760,840 B1 | 7/2004 | Shimbo |
| 6,772,165 B2 | 8/2004 | O'Carroll |
| 6,842,768 B1 | 1/2005 | Shaffer et al. |
| 6,854,087 B1 | 2/2005 | Takeo |
| 6,925,476 B1 | 8/2005 | Multer |
| 6,976,213 B1 | 12/2005 | Letourneau et al. |
| 6,983,416 B1 | 1/2006 | Bae |
| 6,993,522 B2 | 1/2006 | Chen et al. |
| 7,007,235 B1 | 2/2006 | Hussein |
| 7,024,429 B2 | 4/2006 | Ngo et al. |
| 7,024,430 B1 | 4/2006 | Ingraham et al. |
| 7,035,839 B2 | 4/2006 | Gillespie et al. |
| 7,039,679 B2 | 5/2006 | Mendez |
| 7,047,407 B2 | 5/2006 | Itoh et al. |
| 7,053,839 B2 | 5/2006 | Cassel et al. |
| 7,058,663 B2 | 6/2006 | Johnson |
| 7,065,633 B1 | 6/2006 | Yates et al. |
| 7,069,505 B2 | 6/2006 | Tamano |
| 7,086,005 B1 | 8/2006 | Matsuda |
| 7,089,278 B1 | 8/2006 | Churchill et al. |
| 7,099,919 B2 | 8/2006 | Kusumoto et al. |
| 7,110,936 B2 | 9/2006 | Hiew |
| 7,111,237 B2 | 9/2006 | Chan |
| 7,117,278 B2 | 10/2006 | Avery |
| 7,124,151 B1 | 10/2006 | Choi |
| 7,124,164 B1 | 10/2006 | Chemtob |
| 7,124,362 B2 | 10/2006 | Tischer |
| 7,127,501 B1 | 10/2006 | Beir |
| 7,149,776 B1 * | 12/2006 | Roy et al. .................... 709/205 |
| 7,155,465 B2 | 12/2006 | Lee et al. |
| 7,185,277 B1 | 2/2007 | Bernstein |
| 7,200,668 B2 | 4/2007 | Mak |
| 7,203,708 B2 | 4/2007 | Liu et al. |
| 7,209,948 B2 | 4/2007 | Srinivasa |
| 7,225,189 B1 | 5/2007 | McCormack |
| 7,240,091 B1 | 7/2007 | Hopmann et al. |
| 7,242,389 B1 | 7/2007 | Stern |
| 7,249,314 B2 | 7/2007 | Walker |
| 7,293,049 B2 | 11/2007 | Kadyk et al. |
| 7,310,657 B2 | 12/2007 | Nakamura |
| 7,315,978 B2 | 1/2008 | Giles et al. |
| 7,328,243 B2 | 2/2008 | Yeager |
| 7,346,705 B2 | 3/2008 | Hullot et al. |
| 7,356,393 B1 | 4/2008 | Schlatre et al. |
| 7,401,291 B2 | 7/2008 | Ramaley |
| 7,478,129 B1 | 1/2009 | Chemtob |
| 7,487,471 B2 | 2/2009 | Wu |
| 7,496,577 B2 | 2/2009 | Williamson |
| 7,529,780 B1 | 5/2009 | Braginsky et al. |
| 7,536,641 B2 | 5/2009 | Rosenstein et al. |
| 7,565,603 B1 | 7/2009 | Jones et al. |
| 7,577,906 B2 | 8/2009 | Friedrichowitz |
| 7,594,163 B2 | 9/2009 | Slack-Smith |
| 7,603,357 B1 * | 10/2009 | Gourdol et al. |
| 7,610,287 B1 | 10/2009 | Dean et al. |
| 7,647,292 B2 | 1/2010 | Hayashi |
| 7,650,336 B1 | 1/2010 | Herrmann |
| 7,664,750 B2 | 2/2010 | Frees |
| 7,694,217 B2 | 4/2010 | Croft |
| 7,698,660 B2 | 4/2010 | Sanchez et al. |
| 7,714,222 B2 | 5/2010 | Taub |
| 7,761,784 B2 | 7/2010 | Parks |
| 7,769,810 B1 * | 8/2010 | Kaufman ..................... 709/205 |
| 7,779,347 B2 | 8/2010 | Christiansen et al. |
| 7,788,326 B2 | 8/2010 | Buchheit et al. |
| 7,792,788 B2 | 9/2010 | Melmon |
| 7,797,274 B2 | 9/2010 | Strathearn et al. |
| 7,801,951 B2 | 9/2010 | Fishkin et al. |
| 7,818,678 B2 | 10/2010 | Massand |
| 7,831,679 B2 | 11/2010 | Apacible et al. |
| 7,839,532 B2 | 11/2010 | Brawn et al. |

(56) References Cited

U.S. PATENT DOCUMENTS

| | | |
|---|---|---|
| 7,912,811 B2 | 3/2011 | Hodel-Widmer |
| 7,933,952 B2 | 4/2011 | Parker et al. |
| 7,941,399 B2 | 5/2011 | Bailor |
| 7,949,633 B1 | 5/2011 | Shaver et al. |
| 7,962,853 B2 | 6/2011 | Bedi et al. |
| 7,966,556 B1 | 6/2011 | Bourdev |
| 8,019,780 B1 | 9/2011 | Pinkerton et al. |
| 8,028,229 B2 | 9/2011 | Bailor et al. |
| 8,082,277 B1 | 12/2011 | O'Brien et al. |
| 8,352,870 B2 | 1/2013 | Bailor et al. |
| 8,453,052 B1 | 5/2013 | Newman et al. |
| 9,071,615 B2 | 6/2015 | Sanchez et al. |
| 2001/0018697 A1 | 8/2001 | Kunitake |
| 2001/0042075 A1 | 11/2001 | Tabuchi |
| 2002/0007287 A1 | 1/2002 | Straube |
| 2002/0022122 A1 | 2/2002 | Hirata |
| 2002/0059325 A1 | 5/2002 | Beizer et al. |
| 2002/0065848 A1 | 5/2002 | Walker |
| 2002/0069192 A1 | 6/2002 | Aegerter |
| 2002/0083183 A1 | 6/2002 | Pujare et al. |
| 2002/0188598 A1 | 12/2002 | Myllymaki |
| 2003/0028600 A1 | 2/2003 | Parker |
| 2003/0093760 A1 | 5/2003 | Suzuki |
| 2003/0097410 A1 | 5/2003 | Atkins |
| 2003/0097638 A1 | 5/2003 | Tamano |
| 2003/0105979 A1 | 6/2003 | Itoh et al. |
| 2003/0115481 A1 | 6/2003 | Baird |
| 2003/0140067 A1 | 7/2003 | Sesek et al. |
| 2003/0159105 A1 | 8/2003 | Hiebert |
| 2003/0167281 A1 | 9/2003 | Cohen et al. |
| 2003/0172113 A1 | 9/2003 | Cameron |
| 2003/0172168 A1 | 9/2003 | Mak et al. |
| 2003/0208534 A1 | 11/2003 | Carmichael |
| 2004/0003090 A1 | 1/2004 | Deeds |
| 2004/0039829 A1* | 2/2004 | Bucher .................. 709/229 |
| 2004/0068505 A1 | 4/2004 | Lee |
| 2004/0085354 A1 | 5/2004 | Massand |
| 2004/0107224 A1 | 6/2004 | Bera |
| 2004/0122870 A1 | 6/2004 | Park et al. |
| 2004/0122898 A1 | 6/2004 | Srinivasa |
| 2004/0122912 A1 | 6/2004 | Kim et al. |
| 2004/0133858 A1 | 7/2004 | Barnett |
| 2004/0143630 A1 | 7/2004 | Kaufmann et al. |
| 2004/0161150 A1 | 8/2004 | Cukierman et al. |
| 2004/0172395 A1 | 9/2004 | Edelstein |
| 2004/0177343 A1 | 9/2004 | McVoy et al. |
| 2004/0199550 A1 | 10/2004 | Ito |
| 2004/0205539 A1 | 10/2004 | Mak |
| 2004/0205653 A1 | 10/2004 | Hadfield |
| 2004/0225715 A1 | 11/2004 | Gottfried |
| 2004/0230903 A1 | 11/2004 | Elza |
| 2004/0237033 A1 | 11/2004 | Woolf et al. |
| 2004/0239700 A1 | 12/2004 | Baschy |
| 2004/0243644 A1 | 12/2004 | Steere et al. |
| 2004/0250201 A1 | 12/2004 | Caspi |
| 2005/0004985 A1 | 1/2005 | Stochosky |
| 2005/0004990 A1 | 1/2005 | Durazo |
| 2005/0022122 A1 | 1/2005 | Barrus et al. |
| 2005/0033811 A1 | 2/2005 | Bhogal et al. |
| 2005/0039116 A1 | 2/2005 | Slack-Smith |
| 2005/0044492 A1 | 2/2005 | Ramalay et al. |
| 2005/0064858 A1 | 3/2005 | Makela et al. |
| 2005/0071386 A1 | 3/2005 | Wolfgang |
| 2005/0083907 A1 | 4/2005 | Fishler |
| 2005/0097440 A1 | 5/2005 | Lusk |
| 2005/0132288 A1 | 6/2005 | Kim et al. |
| 2005/0138110 A1 | 6/2005 | Redlich et al. |
| 2005/0177617 A1 | 8/2005 | Banginwar et al. |
| 2005/0198132 A1 | 9/2005 | Vellante et al. |
| 2005/0198385 A1* | 9/2005 | Aust ............... G06F 17/30233 709/245 |
| 2005/0203962 A1 | 9/2005 | Zhou et al. |
| 2005/0210392 A1 | 9/2005 | Koide |
| 2005/0216524 A1 | 9/2005 | Gomes et al. |
| 2005/0223012 A1 | 10/2005 | Ohkohchi |
| 2005/0223066 A1 | 10/2005 | Buchheit et al. |
| 2005/0234943 A1 | 10/2005 | Clarke |
| 2005/0240858 A1 | 10/2005 | Croft |
| 2005/0251738 A1 | 11/2005 | Hirano et al. |
| 2005/0256907 A1 | 11/2005 | Novik et al. |
| 2005/0262203 A1 | 11/2005 | Buchheit et al. |
| 2005/0289512 A1 | 12/2005 | Matsusaka |
| 2006/0010240 A1 | 1/2006 | Chuah |
| 2006/0015539 A1 | 1/2006 | Wolf et al. |
| 2006/0015811 A1 | 1/2006 | Tanaka et al. |
| 2006/0020360 A1 | 1/2006 | Wu |
| 2006/0026502 A1 | 2/2006 | Dutta |
| 2006/0031264 A1 | 2/2006 | Bosworth et al. |
| 2006/0041579 A1 | 2/2006 | Miyashita et al. |
| 2006/0041596 A1 | 2/2006 | Stirbu et al. |
| 2006/0047656 A1 | 3/2006 | Dehlinger et al. |
| 2006/0053194 A1 | 3/2006 | Schneider |
| 2006/0053195 A1 | 3/2006 | Schneider |
| 2006/0053380 A1* | 3/2006 | Spataro ............ G06F 17/30011 715/753 |
| 2006/0080432 A1 | 4/2006 | Spataro |
| 2006/0085402 A1 | 4/2006 | Brown |
| 2006/0095514 A1 | 5/2006 | Wang et al. |
| 2006/0101328 A1 | 5/2006 | Albornoz |
| 2006/0106879 A1 | 5/2006 | Zondervan et al. |
| 2006/0112343 A1 | 5/2006 | Ducheneaut et al. |
| 2006/0123010 A1 | 6/2006 | Landry et al. |
| 2006/0123033 A1 | 6/2006 | Livshits |
| 2006/0136511 A1 | 6/2006 | Ngo et al. |
| 2006/0136809 A1 | 6/2006 | Fernstrom |
| 2006/0174207 A1 | 8/2006 | Deshpande |
| 2006/0200755 A1 | 9/2006 | Melmon |
| 2006/0218476 A1 | 9/2006 | Gombert |
| 2006/0242549 A1 | 10/2006 | Schwier |
| 2006/0248038 A1 | 11/2006 | Kaplan |
| 2006/0259524 A1 | 11/2006 | Horton |
| 2006/0265377 A1 | 11/2006 | Raman et al. |
| 2007/0016650 A1 | 1/2007 | Gilbert et al. |
| 2007/0050720 A1 | 3/2007 | Sharp et al. |
| 2007/0055926 A1 | 3/2007 | Christiansen et al. |
| 2007/0066293 A1* | 3/2007 | Peng et al. .................. 455/418 |
| 2007/0118598 A1 | 5/2007 | Bedi |
| 2007/0118794 A1 | 5/2007 | Hollander et al. |
| 2007/0130334 A1 | 6/2007 | Carley |
| 2007/0136662 A1 | 6/2007 | Khaba |
| 2007/0156672 A1 | 7/2007 | Wolff et al. |
| 2007/0186157 A1 | 8/2007 | Walker |
| 2007/0186171 A1 | 8/2007 | Junuzovic |
| 2007/0198952 A1 | 8/2007 | Pittenger |
| 2007/0203917 A1 | 8/2007 | Du |
| 2007/0226320 A1 | 9/2007 | Hager |
| 2007/0226604 A1 | 9/2007 | Chalasani |
| 2007/0271502 A1 | 11/2007 | Bedi |
| 2007/0283321 A1 | 12/2007 | Hedge |
| 2008/0028300 A1 | 1/2008 | Krieger |
| 2008/0052634 A1 | 2/2008 | Fishkin et al. |
| 2008/0059187 A1 | 3/2008 | Roitblat et al. |
| 2008/0059539 A1 | 3/2008 | Chin |
| 2008/0072141 A1 | 3/2008 | Hodel-Widmer |
| 2008/0086718 A1 | 4/2008 | Bostic |
| 2008/0097993 A1 | 4/2008 | Nanba |
| 2008/0098294 A1 | 4/2008 | Le |
| 2008/0114740 A1 | 5/2008 | Vergottini |
| 2008/0114884 A1 | 5/2008 | Hewes et al. |
| 2008/0126953 A1 | 5/2008 | Davidson et al. |
| 2008/0147590 A1 | 6/2008 | Bechtel |
| 2008/0177782 A1 | 7/2008 | Poston |
| 2008/0180740 A1 | 7/2008 | Kimura et al. |
| 2008/0195800 A1 | 8/2008 | Lee |
| 2008/0222159 A1 | 9/2008 | Aranha et al. |
| 2008/0235579 A1 | 9/2008 | Champion et al. |
| 2008/0256113 A1 | 10/2008 | Rasmussen et al. |
| 2008/0256114 A1 | 10/2008 | Rasmussen et al. |
| 2008/0263032 A1 | 10/2008 | Vailaya et al. |
| 2008/0270386 A1 | 10/2008 | Ohi et al. |
| 2008/0294895 A1 | 11/2008 | Bodner |
| 2008/0320384 A1 | 12/2008 | Nagarajan |
| 2009/0006936 A1 | 1/2009 | Parker |
| 2009/0006946 A1 | 1/2009 | Hanson |

(56) References Cited

U.S. PATENT DOCUMENTS

| | | |
|---|---|---|
| 2009/0006948 A1 | 1/2009 | Parker |
| 2009/0063489 A1 | 3/2009 | Neumann |
| 2009/0094231 A1 | 4/2009 | Marvit et al. |
| 2009/0094242 A1 | 4/2009 | Lo et al. |
| 2009/0125518 A1 | 5/2009 | Bailor et al. |
| 2009/0150761 A1 | 6/2009 | Sawicki et al. |
| 2009/0157811 A1 | 6/2009 | Bailor et al. |
| 2009/0171987 A1 | 7/2009 | Coppinger et al. |
| 2009/0193331 A1 | 7/2009 | Croft |
| 2009/0228473 A1 | 9/2009 | Kannan et al. |
| 2009/0235158 A1 | 9/2009 | Rosenstein et al. |
| 2009/0249224 A1 | 10/2009 | Davis et al. |
| 2009/0254572 A1 | 10/2009 | Redlich et al. |
| 2009/0271696 A1 | 10/2009 | Bailor et al. |
| 2009/0282041 A1 | 11/2009 | Skaria et al. |
| 2009/0282462 A1 | 11/2009 | Skaria |
| 2009/0327294 A1 | 12/2009 | Bailor |
| 2010/0023562 A1 | 1/2010 | Kreuch et al. |
| 2010/0070464 A1 | 3/2010 | Aymeloglu et al. |
| 2010/0088676 A1 | 4/2010 | Yuan |
| 2010/0095198 A1 | 4/2010 | Bultrowicz et al. |
| 2010/0131836 A1 | 5/2010 | Dukhon et al. |
| 2010/0153857 A1 | 6/2010 | Sanchez et al. |
| 2010/0169092 A1 | 7/2010 | Backes et al. |
| 2010/0278453 A1 | 11/2010 | King |
| 2010/0281074 A1 | 11/2010 | Bailor et al. |
| 2011/0055702 A1 | 3/2011 | Jakobson |
| 2011/0184906 A1 | 7/2011 | Bailor et al. |
| 2011/0209052 A1* | 8/2011 | Parker et al. ............ 715/255 |
| 2012/0254315 A1 | 10/2012 | Skaria et al. |
| 2012/0278276 A1 | 11/2012 | Bailor et al. |
| 2013/0013997 A1 | 1/2013 | Bailor et al. |
| 2013/0151466 A1 | 6/2013 | Skaria et al. |
| 2013/0297559 A1 | 11/2013 | Bailor et al. |
| 2015/0067467 A1 | 3/2015 | Bailor et al. |
| 2015/0212996 A1 | 7/2015 | Plante et al. |
| 2015/0256574 A1 | 9/2015 | Sanchez et al. |

FOREIGN PATENT DOCUMENTS

| | | |
|---|---|---|
| CN | 1804836 A | 7/2006 |
| CN | 1971553 A | 5/2007 |
| CN | 101042702 A | 9/2007 |
| DE | 19844071 A1 | 4/1999 |
| EP | 1132847 A2 | 9/2001 |
| EP | 1290575 B1 | 6/2005 |
| EP | 1657649 A2 | 5/2006 |
| EP | 1681652 A2 | 7/2006 |
| JP | 1-113849 | 2/1989 |
| JP | 07-085020 | 3/1995 |
| JP | 07085020 A | 3/1995 |
| JP | 11-161535 | 6/1999 |
| JP | 2000-076109 | 3/2000 |
| JP | 2000259623 | 9/2000 |
| JP | 2001-265704 A | 9/2001 |
| JP | 2001-290690 | 10/2001 |
| JP | 2002288029 | 10/2002 |
| JP | 2003-233520 | 8/2003 |
| JP | 2004-078535 | 3/2004 |
| JP | 2004265193 | 9/2004 |
| JP | 2004265193 A | 9/2004 |
| JP | 2004-326176 | 11/2004 |
| JP | 2005-74724 | 3/2005 |
| JP | 2005267021 | 9/2005 |
| JP | 2005-301838 | 10/2005 |
| JP | 2005310158 | 11/2005 |
| JP | 2006-195972 | 7/2006 |
| JP | 2006236350 | 9/2006 |
| JP | 2007115131 | 5/2007 |
| JP | 2007-518146 A | 7/2007 |
| JP | 2007518330 A | 7/2007 |
| JP | 2007257629 | 10/2007 |
| JP | 2008210192 | 9/2008 |
| JP | 2009-009410 | 1/2009 |
| KR | 10-0331685 B1 | 4/2002 |
| KR | 1020060026409 A | 3/2006 |
| KR | 1020060034786 A | 4/2006 |
| KR | 10-2006-0047218 A | 5/2006 |
| KR | 1020070023640 A | 2/2007 |
| KR | 1020080014747 A | 2/2008 |
| RU | 2250492 C2 | 4/2005 |
| RU | 50695 U1 | 1/2006 |
| RU | 2272316 C2 | 3/2006 |
| RU | 2005135951 A | 5/2007 |
| RU | 2304803 C2 | 8/2007 |
| RU | 2327206 C1 | 6/2008 |
| RU | 2344468 C2 | 1/2009 |
| RU | 2359321 C2 | 6/2009 |
| TW | 200424868 | 11/2004 |
| TW | I248002 | 1/2006 |
| TW | 200627221 A | 8/2006 |
| TW | 200627259 A | 8/2006 |
| TW | 200627274 | 8/2006 |
| TW | I276325 B | 3/2007 |
| TW | 200817998 | 4/2008 |
| TW | 200910880 | 3/2009 |
| WO | 01/25986 A2 | 4/2001 |
| WO | 01/33362 A1 | 5/2001 |
| WO | 01/88750 A1 | 11/2001 |
| WO | 2002/033575 A2 | 4/2002 |
| WO | 2003/058374 A2 | 7/2003 |
| WO | 2005/114467 A2 | 12/2005 |
| WO | 2007/034858 A1 | 3/2007 |
| WO | 2007/062949 A1 | 6/2007 |
| WO | 2007/064480 A1 | 6/2007 |
| WO | 2008/063833 A1 | 5/2008 |
| WO | 2009/005922 A1 | 1/2009 |
| WO | 2009/061638 A1 | 5/2009 |
| WO | 2009/076010 A1 | 6/2009 |
| WO | 2009/079116 A2 | 6/2009 |
| WO | 2009/134548 A2 | 11/2009 |
| WO | 2009/154842 A2 | 12/2009 |
| WO | 2009/158108 A2 | 12/2009 |
| WO | 2009/158172 A2 | 12/2009 |

OTHER PUBLICATIONS

European Notice of Appeal in Application 09739350.8, dated Feb. 14, 2014, 2 pgs.

European Submission of Grounds of Appeal in Application 09739350.8, dated Apr. 14, 2014, 4 pgs.

Japanese Notice of Allowance in Application 2010-533160, dated Jan. 14, 2014, 4 pgs.

Japanese Notice of Allowance in Application 2011-507506, dated Nov. 20, 2013, 4 pgs.

Japanese Notice of Allowance in Application 2011-508530, dated Nov. 29, 2013, 4 pgs.

Taiwanese Search Report in Application 097144208, dated Feb. 8, 2014, 13 pgs.

US Final Office Action for U.S. Appl. No. 11/957,010, dated Aug. 18, 2010, 26 pgs.

US Non-Final Office Action for U.S. Appl. No. 11/957,010, dated Mar. 18, 2010, 24 pgs.

U.S. Appl. No. 11/957,010, Amendment and Response dated Apr. 9, 2012, 12 pgs.

U.S. Appl. No. 11/957,010, Notice of Allowance dated Mar. 12, 2014, 9 pgs.

U.S. Appl. No. 11/957,010, Office Action dated Jan. 27, 2012, 25 pgs.

U.S. Appl. No. 11/957,010, Office Action dated Aug. 12, 2013, 28 pgs.

U.S. Appl. No. 11/957,010, Office Action dated Aug. 17, 2011, 26 pgs.

U.S. Appl. No. 12/111,174, Amendment and Response dated Feb. 21, 2012, 9 pgs.

U.S. Appl. No. 12/111,174, Amendment and Response dated Sep. 8, 2011, 11 pgs.

U.S. Appl. No. 12/111,174, Notice of Allowance dated Apr. 12, 2012, 11 pgs.

(56) References Cited

OTHER PUBLICATIONS

U.S. Appl. No. 12/117,025, Amendment and Response dated Oct. 23, 2013, 12 pgs.
U.S. Appl. No. 12/117,040, Amendment and Response dated Jan. 4, 2012, 12 pgs.
U.S. Appl. No. 12/276,874, Amendment and Response dated Jan. 26, 2012, 13 pgs.
U.S. Appl. No. 12/276,874, Amendment and Response dated Dec. 27, 2012, 14 pgs.
U.S. Appl. No. 12/276,874, Amendment and Response dated Feb. 10, 2014, 14 pgs.
U.S. Appl. No. 12/276,874, Amendment and Response dated Jun. 22, 2011, 17 pgs.
U.S. Appl. No. 12/276,874, Amendment and Response dated Jun. 26, 2013, 13 pgs.
U.S. Appl. No. 12/432,817, Amendment and Response dated Dec. 12, 2011, 15 pgs.
U.S. Appl. No. 12/432,817, Amendment and Response dated Apr. 25, 2012, 11 pgs.
U.S. Appl. No. 13/079,605, Amendment and Response dated Feb. 28, 2012, 12 pgs.
U.S. Appl. No. 13/495,659, Amendment and Response dated Jan. 27, 2014, 8 pgs.
U.S. Appl. No. 13/495,659, Amendment and Response dated Oct. 2, 2013, 9 pgs.
U.S. Appl. No. 13/495,659, Amendment and Response dated Mar. 21, 2013, 8 pgs.
U.S. Appl. No. 13/539,473, Amendment and Response dated Jan. 11, 2013, 15 pgs.
U.S. Appl. No. 13/539,473, Amendment and Response dated Apr. 25, 2014, 15 pgs.
U.S. Appl. No. 13/539,473, Amendment and Response dated Sep. 3, 2013, 13 pgs.
U.S. Appl. No. 11/938,082, Amendment and Response dated Aug. 4, 2010, 14 pgs.
U.S. Appl. No. 11/938,082, Amendment and Response dated Mar. 25, 2010, 15 pgs.
U.S. Appl. No. 11/951,973, Amendment and Response dated Apr. 13, 2011, 11 pgs.
U.S. Appl. No. 11/957,010, Amendment and Response dated Jan. 13, 2014, 18 pgs.
U.S. Appl. No. 11/957,010, Amendment and Response dated Nov. 16, 2011, 12 pgs.
U.S. Appl. No. 11/957,010, Amendment and Response dated Nov. 17, 2010, 11 pgs.
U.S. Appl. No. 11/957,010, Amendment and Response dated Jun. 2, 2010, 12 pgs.
U.S. Appl. No. 11/957,010, Notice of Allowance dated Jun. 10, 2014, 6 pgs.
U.S. Appl. No. 12/044,744, Amendment and Response dated Oct. 26, 2010, 11 pgs.
U.S. Appl. No. 12/044,744, Amendment and Response dated Nov. 30, 2011, 12 pgs.
U.S. Appl. No. 12/044,744, Amendment and Response dated Feb. 22, 2011, 11 pgs.
U.S. Appl. No. 12/044,744, Amendment and Response dated Mar. 30, 2012, 11 pgs.
U.S. Appl. No. 12/044,744, Amendment and Response dated Jun. 24, 2011, 11 pgs.
U.S. Appl. No. 12/117,025, Amendment and Response dated Jan. 30, 2013, 13 pgs.
U.S. Appl. No. 12/117,025, Amendment and Response dated Dec. 21, 2010, 17 pgs.
U.S. Appl. No. 12/145,536, Amendment and Response dated Nov. 30, 2011, 20 pgs.
U.S. Appl. No. 12/145,536, Amendment and Response dated Sep. 11, 2012, 22 pgs.
Taiwanese Notice of Allowance in Application 98139984, dated Jan. 27, 2015, 4 pgs.

"Search Report Issued in European Patent Application No. 097706436", dated Mar. 16, 2015, 6 Pages.
"First Office Action Issued in Malaysian Patent Application No. PI 2010004653", dated Jan. 30, 2015, 3 Pages.
Israeli Office Action in Application 212007, dated Jan. 31, 2015, 6 pgs. (partially in English).
"Office Action Issued in Korean Patent Application No. 10-2010-7012783", dated Feb. 5, 2015, 4 Pages. (W/o English Translation).
European Communication in Application 09770643.6, dated Apr. 2, 2015, 1 page.
Malaysian Adverse Report in Application PI 2010005579, dated Mar. 31, 2015, 3 pgs.
Korean Office Action in Application 10-2015-7002346, dated Mar. 31, 2015, 7 pgs.
U.S. Appl. No. 13/859,631, Office Action dated Apr. 29, 2015, 110 pgs.
"Apple Introduces iWork'08", obtained online at: https://www.apple.com/pr/library/2007/08/07Apple-Introduces-iWork-08.html, published Aug. 7, 2007, 2 pgs.
"Codeville," http://codeville.org/, Date Retrieved Oct. 9, 2007, 2 pgs.
"Emerging from a Highly Praised Private Beta, Zoho Notebook is a One-Stop Destination for Accessing and Sharing Content—Creation, Aggregation and Collaboration", obtained online at: http://www.zoho.com/news/zoho_notebook_public_beta.html, published May 22, 2007, 3 pgs.
"File Locks-GNU Emacs Lisp Reference Manual"; www.gnu.org/software/emacs/elisp/html_node/File-Locks.html; Mar. 28, 2006; 2 pages.
"Google, Google Docs & Spreadsheets Tour" downloaded from http://www.google.com/google-d-s/intl/en/tour2.html on Nov. 9, 2007, 1 page.
"Status of Software Reuse 577," http://www.plex86.org/Computer_Folklore/Status-of-Software-Reuse-577.html, Date Retrieved Oct. 9, 2007, 2 pgs.
"How to Track and Manage Changes in a Word 2002 and a Word 2003 Document," Microsoft Corporation, Mar. 8, 2007, 4 pages.
"Perforce software Delivers Improved Performance to its Fast Software Configuration Management System," Perforce Software, Jul. 9, 2007, 2 pages.
"Technical Overview," Apache CouchDB, The Apache Software Foundation, © 2008, 7 pages.
"Track Changes in Word 2007 Tutorial," Florida Gulf Coast University, copyright 2007, 2 pages.
Adkins et al., "GSS Collaboration in Document Development: Using Group Writer to Improve the Process", Proceedings of the 32nd Hawaii International Conference on System Sciences, 1999, 11 pages.
Adler et al., "Evaluating and Implementing a Collaborative Office Document System," 2005, http://www.sce.carleton.ca/faculty/adler/publications/2005/adler-nash-noel-2005-Collab-Office.pdf, pp. 1-18.
Appleton, Brad, "ClearView: Associating Attributes and Notes With a View", ClearCase International User's Group Conference, Sep. 1996, 16 pgs.
Australian First Office Action in Application 2009241535, dated Mar. 13, 2014, 4 pgs.
Australian First Office Action in Application 2009262859, dated Mar. 7, 2014, 3 pgs.
Australian First Office Action in Application 2009318022, dated Mar. 11, 2014, 3 pgs.
Australian Notice of Acceptance in Application 2008324973, dated Aug. 22, 2012. 3 pgs.
Australian Notice of Acceptance in Application 2009262859, dated May 1, 2014, 2 pgs.
Australian Notice of Acceptance in Application 2010241814, dated May 21, 2014, 2 pgs.
Australian Notice of Allowance in Application 2008335565, dated Sep. 18, 2012, 3 pgs.
Australian Notice of Allowance in Application 2008338826, dated Dec. 5, 2012, 2 pgs.
Australian Office Action in Application 2008324973, dated Jul. 4, 2012, 3 pgs.

(56) References Cited

OTHER PUBLICATIONS

Australian Office Action in Application 2008335565, dated Aug. 30, 2012, 3 pgs.
Australian Office Action in Application 2008338826, dated Oct. 24, 2012, 3 pgs.
Australian Office Action in Application 2010241814, dated Apr. 11, 2014, 4 pgs.
Badouel, Eric et al., "Merging Hierarchically-Structured Documents in Workflow Systems", Electronic Notes in Theoretical Computer Science 203, (2008), 3-24.
"Bellagio, David et al., ""Software Configuration Management Strategies and IBM Rational ClearCase A Practical Introduction, Second Edition"" In: ""Software Configuration Management Strategies and IBM Rational ClearCase A Practical Introduction,Second Edition"", May 23, 2005 (May 23, 2005), IBM Press, XP55009093, ISBN: 978-0-32-120019-8pp. 173-178."
Byfield, Bruce, "Ooo Off the Wall: That's Your Version—Document Control in Ooo Writer", published on Linux Journal, Mar. 7, 2006, 6 pgs.
Chinese 1st Office Action in Application 200880121295.0, dated Jan. 18, 2012, 6 pgs.
Chinese 1st Office Action in Application 200980115758.7, dated Mar. 28, 2012, 10 pgs.
Chinese 1st Office Action in Application 200980116872.1, dated Oct. 9, 2012, 14 pgs.
Chinese 1st Office Action in Application 200980124935.8, dated Oct. 30, 2012, 10 pgs.
Chinese 1st Office Action in Application 200980147769.3, dated Jan. 29, 2012, 12 pgs.
Chinese 1st Office Action in Application 201080019470.2, dated Aug. 31, 2012, 8 pgs.
Chinese 2nd Office Action in Application 200880115943.1, dated Jun. 1, 2012, 7 pgs.
Chinese 2nd Office Action in Application 200880119647.9, dated Aug. 13, 2012, 6 pgs.
Chinese 2nd Office Action in Application 200880121295.0, dated Oct. 23, 2012, 10 pgs.
Chinese 2nd Office Action in Application 200980115758.7, dated Dec. 5, 2012, 7 pgs.
Chinese 2nd Office Action in Application 200980116872.1, dated Jun. 18, 2013, 6 pgs.
Chinese 2nd Office Action in Application 200980124935.8, dated Jun. 19, 2013, 7 pgs.
Chinese 2nd Office Action in Application 200980147769.3, dated Jun. 7, 2013, 10 pgs.
Chinese 3rd Office Action in Application 200880115943.1, dated Aug. 30, 2012, 6 pgs.
Chinese 3rd Office Action in Application 200880121295.0, dated Apr. 9, 2013, 9 pgs.
Chinese 3rd Office Action in Application 201080019470.2, dated May 31, 2013, 6 pgs.
Chinese Decision on Rejection in Application 200980147769.3, dated Nov. 7, 2013, 9 pgs.
Chinese Notice of Allowance in Application 200880115943.1, dated Jan. 15, 2013, 4 pgs.
Chinese Notice of Allowance in Application 200880119647.9, dated Feb. 28, 2013, 4 pgs.
Chinese Notice of Allowance in Application 2008801212195.0, dated Sep. 5, 2013, 4 pgs.
Chinese Notice of Allowance in Application 200980115758.7, dated Jun. 6, 2013, 4 pgs.
Chinese Notice of Allowance in Application 200980116872.1, dated Dec. 26, 2013, 4 pgs.
Chinese Notice of Allowance in Application 200980124935.8, dated Nov. 11, 2013, 4 pgs.
Chinese Notice of Allowance in Application 201080019470.2, dated Aug. 7, 2013, 4 pgs.
Chinese Notice on the Second Office Action dated Mar. 1, 2013, in Application No. 201080019470.2, 6 pages.
Chinese Office Action in Application 200880115943.1, dated Oct. 25, 2011, 13 pgs.
Chinese Office Action in Application 200880119647.9, dated Nov. 24, 2011, 7 pgs.
Citro et al., "Conflict Management for Real-Time Collaborative Editing in Mobile Replicated Architectures," School of Computer Science and Information Technology, RMIT University, Melbourne, Victoria, Australia, Australian Computer Society, Inc. © 2007, http://www.crpit.com/confpapers/CRPITV62Citro.pdf, pp. 1-10.
Dekeyser, Stijin, et al., "Path Locks for XML Document Collaboration", University of Antwerp, Dec. 12, 2002, pp. 105-114.
Ellis et al., "Groupware—Some Issues and Experiences", vol. 34, No. 1, Jan. 1, 1991, pp. 38-58.
European Examination Report in Application 09739350.8, dated Sep. 25, 2012, 7 pgs.
European Extended Search Report in Application 10770166.6, dated Jun. 30, 2014, 7 pgs.
European Extended Search Report in EP Application 09739350.8, dated Nov. 9, 2011, 10 pgs.
European Extended Search Report in EP Application 09767155.6, dated Mar. 26, 2012, 10 pgs.
European Oral Hearing Summons in Application 09739350.8, dated Jun. 27, 2013, 6 pgs.
Feise, Joachim; "A Survey of Distributed Hypermedia Systems," ISR Institute for Software Research, University of California, Irvine, Apr. 2005, 39 pages.
Galli, R., "Journal File Systems in Linux," http://bulma.net/impresion.phtml?nldNoticia=1154, Jan. 24, 2002, 15 pgs.
Google, "Share and Collaborate in Real Time," 2008, http://www.google.com/google-d-s/intl/en/tour2.html, 1 pg.
Green, Bob, "Converting Qedit to the Client/Server Model", http://www.robelle.com/library/papers/client-server/, Copyright 2004, 14 pages.
Grover, Chris, "Word 2007: The Missing Manual", Pogue Press, Copyright 2007, pp. 380-388, 11 pgs in entirety.
Haake et al., "Collaborative Authoring of Hypermedia Documents," 1993, http://www/pi6.fernuni-hagen.de/publ/MT-93. pdf, pp. 41-58.
Hebsgarrd, Poul J; Process Driven Document Management™, Version 6.1, Feb. 2007, http://www.brain-technology.com/upload/file_vk306c6tr779p9gntgho_16467.pdf, pp. 1-13.
Heckel, Paul; "A Technique for Isolating Differences between Files" copyright 1978, 5 pages.
Ignat et al., "Extending Real-Time Collaborative Editing Systems with Asynchronous Communication," Institute for Information Systems, ETH Zurich, (at least as early as Oct. 4, 2007), http://www.inf.ethz.ch/personal/ignat/Publications/cscwd_04.pdf, pp. 1-6.
Immedius, Inc., "S1000Dmanager v 3.0", Comprehensive S1000D Project Setup and Management Support, found online on Aug. 22, 2008 at: http://www.immediuss1000d.com/c_manager/S1Dmanager_overview.html, 6 pgs.
International Preliminary Report and Written Opinion for PCT/US/2008/083069 / MS 321999.02 dated Jun. 24, 2010, 6 pages.
International Search Report and Written Opinion for PCT/US2008/081456 / MS 321449.02 dated Mar. 31, 2009, 12 pages.
International Search Report and Written Opinion for PCT/US2008/083862 / MS 321998.02 dated Mar. 31, 2009, 11 pages.
International Search Report and Written Opinion for PCT/US2009/037920 dated Nov. 30, 2009, 11 pages.
International Search Report and Written Opinion for PCT/US2009/039316 / MS 323384.02 dated Jan. 18, 2010, 11 pages.
International Search Report and Written Opinion for PCT/US2009/045558 dated Nov. 30, 2009, 11 pages.
Jalbert, Peter, "Real Time Collaboration with Google Docs and Spreadsheets," Jan. 23, 2008, 5 pages.
Japanese Final Rejection in Application 2010-536967, dated Oct. 9, 2013, 6 pgs.
Japanese Final Rejection in Application 2012-508556, dated May 7, 2014, 6 pgs.
Japanese Notice of Allowance in Application 2010536967, dated Mar. 5, 2014, 4 pgs.
Japanese Notice of Allowance in Application 2010-538018, dated Mar. 15, 2013, 6 pgs.

(56) References Cited

OTHER PUBLICATIONS

Japanese Notice of Rejection in Application 2010-533160, dated Aug. 20, 2013, 4 pgs.
Japanese Notice of Rejection in Application 2010-536967, dated Feb. 8, 2013, 6 pgs.
Japanese Notice of Rejection in Application 2011-507506, dated May 21, 2013, 6 pgs.
Japanese Notice of Rejection in Application 2011508530, dated Jun. 18, 2013, 6 pgs.
Japanese Notice of Rejection in Application 2011516385, dated Jul. 9, 2013, 6 pgs.
Japanese Notice of Rejection in Application 2012-508556, dated Oct. 21, 2013, 7 pgs.
Japanese Notice of Rejection dated Dec. 28, 2012, in Application No. 2010-533160, 8 pages.
Koch, Michael, "Design Issues and Model for a Distributed Multi-User Editor" (pp. 1-21), from Computer Supported Cooperative Work, An International Journal, 3(3-4), 19995, pp. 359-378.
La Fontaine, Robin, Monsell EDM Ltd., Merging XMLFiles: a new approach providing intelligent merge of XML data sets, Presented at XML Europe 2002, http://www.deltaxml.com/dxml/93/version/default/part/AttachmentData/data/merging-xml-files.pdf, 21 pgs.
Lloyd, Zach et al., "Collaboration Goes One Level Deeper", obtained online at: http://googledocs.blogspot.in/2008/03/collaboration-goes-one-level-deeper.html, published Mar. 19, 2008, 2 pgs.
Lu et al., "Merging Retrieval Results in Hierarchical Peer-to-Peer Networks" SIGIR '04, Jul. 25-29, 2004, 2 pages.
McKechan et al., "Design Considerations for Creditor: A Collaborative Report Writing Editor," accessed May 16, 2008, http://userpages.umbc.edu/~jcampbel/Group01/McKechan_paper_iwces3.pdf, 10 pgs.
Mendoza et al., "A Flexible Distribution Service for a Co-authoring Environment on the Web," IEEE Computer Society, Proceedings of Sixth Mexican International Conference on Computer Science (ENC '05) © 2005, 8 pages.
Microsoft Corporation, Compare and Merge Mechanisms, © 2007, http://msdn2.microsoft.com/en-us/library/ek8hk7e2 (VS.80,d=printer).aspx, 1 page.
Miller et al.; "Interactive Simultaneous Editing of Multiple Text Regions"; www.co-ode.org/resources/papers/k-cap2007-seidenberg.pdf; Jun. 2001; 15 pages.
Murray, Katherine et al., "Compare and Combine Documents in Word 2007", Microsoft Office Word 2007 Inside Out, obtained online on Jul. 11, 2012 at: http://office.microsoft.com/en-us/word-help/compare-and-combine-documents-in-word-2 . . . , 2012 Microsoft Corporation, 5 pgs.
Ohst et al., "Difference Tools for Analysis and Design Documents" copyright 2003, 10 pages.
Pacull et al., "Duplex: A Distributed Collaborative Editing Environment in Large Scale" Proceedings of the Conference on Computer Supported Cooperative Work, Oct. 22-26, 1994, Chapel Hill, NC, USA. ACM, 1994; pp. 165-173.
PCT International Search Report and Written Opinion in Application PCT/US2010/032309, dated Dec. 1, 2010, 9 pgs.
PCT International Search Report for PCT/US2009/062364 dated May 31, 2010, 11 pgs.
Preston et al., "Synchronous Editing via Web Services: Combining Heterogeneous Client and Server Technologies," Department of Computer Science, Georgia State University, Atlanta, Georgia, CSCW 2006, Nov. 4-8, 2006, Banff, Alberta, Canada, http://cims.clayton.edu/jpreston/PhD/Research/Preston%20-%20CSCW%20Demo%20Extended%20Abstract.pdf, pp. 1-2.
Russian Notice of Allowance in Application 2010118615, dated Jul. 1, 2013, 6 pgs.
Russian Notice of Allowance in Application 2010122968, dated Nov. 6, 2012, 27 pgs.
Russian Notice of Allowance in Application 2010123793, dated Apr. 13, 2012, 7 pgs.
Russian Notice of Allowance in Application 2010144042, dated Feb. 27, 2013, 7 pgs.
Russian Notice of Allowance in Application 2010145165, dated Jun. 20, 2013, 6 pgs.
Russian Notice of Allowance in Application 2010153320, dated Apr. 17, 2013, 23 pgs.
Russian Notice of Allowance in Application 2011143794, dated Apr. 11, 2014, 21 pgs.
Samiei et al., "EzMail: Using Information Vizualization Techniques to Help Manage Email", Proceedings of the 8th National Conference on Information Vizualization, 2004, 6 pgs.
Seidenberg et al; "A Methodology for Asynchronous MultiUser Editing of Semantic Web Ontologies"; www.xmpp.org/extensions/xep-0058.html; Mar. 28, 2006; 8 pages.
Shchepin, "XEP-0058: Multi-User Text Editing", http://groups.csail.mit.edu/uid/projects/simuledit/usenix01.pdf, Oct. 9, 2007, 5 pages.
Shepler et al., "Network File 1-15 Systems (NFS)," Version 4, Apr. 1, 2003, retrieved from http://rsync.tools.ietf.org/html/rfc3530 on Mar. 7, 2012, 275 pgs.
Shiro Sakata, "Development and Evaluation on an in-house multimedia desktop conference system", Apr. 1990, IEEE Journal on selected areas in communications, vol. 8, Apr. 1990.
Synchronous Collaborative Text Document Editing Online: MoonEdit, reviewed Sep. 13, 2007, http://www.masternewmedia.org/news/2005/02/20/synchronous_collaborative_text_document-editing.htm, pp. 1-4.
Taiwan Notice of Allowance in Application 99108780, dated Oct. 21, 2013, 4 pgs.
Taiwan Search Report and Office Action in Application 97142418, dated Feb. 21, 2012, 13 pgs.
Taiwanese Notice of Allowance in Application 097139413, dated Jun. 27, 2014, 4 pgs.
Taiwanese Notice of Allowance in Application 97142418, dated Aug. 16, 2012, 4 pgs.
Taiwanese Notice of Allowance in Application 98117528, dated Jul. 7, 2014, 4 pgs.
Taiwanese Office Action and Search Report in Application 099108780, dated Jun. 19, 2013, 5 pgs.
Taiwanese Search Report in Application 097139413, dated Mar. 17, 2014, 13 pgs.
Taiwanese Search Report in Application 098117528, dated Mar. 20, 2014, 10 pgs.
Tanebaum, Andrew S., "Moderne Betriebssysteme", 2003 Pearson, pp. 786-787.
Tanenbaum, Andrew S., "Modern Operating Systems", 2nd Edition, Prentice Hall, New Jersey, 2001, pp. 735-737.
Tichy, Walter F., RCS—A System for Version Control, Jan. 3, 1991, http://www.svlug.org/teams/rcs.pdf, 20 pgs.
Tyson, Herb, "Microsoft Word 2007 Bible", Wiley Publishing Company, Inc. 2007, Indianapolis, IN, USA, pp. 807-808, 4 pgs in entirety.
US Final Office Action for U.S. Appl. No. 11/938,082, dated Jun. 29, 2010, 30 pgs.
US Final Office Action for U.S. Appl. No. 12/044,744, dated Nov. 22, 2010, 14 pgs.
US Final Office Action for U.S. Appl. No. 12/145,536, dated Apr. 26, 2011, 32 pgs.
US Non-Final Office Action for U.S. Appl. No. 11/938,082, dated Dec. 28, 2009, 20 pgs.
US Non-Final Office Action for U.S. Appl. No. 11/951,973, dated Jan. 19, 2011, 11 pgs.
US Non-Final Office Action for U.S. Appl. No. 12/044,744, dated Jul. 26, 2010, 15 pgs.
US Non-Final Office Action for U.S. Appl. No. 12/044,744, dated Mar. 25, 2011, 16 pgs.
US Non-Final Office Action for U.S. Appl. No. 12/111,174, dated Jun. 8, 2011, 18 pgs.
US Non-Final Office Action for U.S. Appl. No. 12/117,025, dated Sep. 21, 2010, 13 pgs.
US Non-Final Office Action for U.S. Appl. No. 12/145,536, dated Nov. 8, 2010, 28 pgs.
US Notice of Allowance for U.S. Appl. No. 11/938,082, dated Jan. 4, 2011, 18 pgs.

(56) References Cited

OTHER PUBLICATIONS

US Notice of Allowance for U.S. Appl. No. 12/117,025, dated Dec. 28, 2011, 11 pgs.
US Notice of Allowance for U.S. Appl. No. 12/117,025, dated Apr. 14, 2011, 10 pgs.
U.S. Appl. No. 11/951,973, Notice of Allowance dated Jun. 21, 2011, 9 pgs.
U.S. Appl. No. 12/044,744, Final Office Action dated Aug. 30, 2011, 17 pgs.
U.S. Appl. No. 12/044,744, Notice of Allowance dated May 7, 2012, 12 pgs.
U.S. Appl. No. 12/044,744, Notice of Allowance dated Jun. 21, 2012, 8 pgs.
U.S. Appl. No. 12/044,744, Office Action dated Dec. 30, 2011, 17 pgs.
U.S. Appl. No. 12/111,174, Notice of Allowance dated Nov. 19, 2012, 2 pgs.
U.S. Appl. No. 12/111,174, Notice of Allowance dated Dec. 4, 2012, 2 pgs.
Australian Second Office Action in Application 2009241535, dated May 16, 2014, 4 pgs.
Israeli Office Action in Application 208040, dated Dec. 25, 2013, 8 pgs.
Japanese Notice of Allowance in Application 2011516385, dated Feb. 13, 2014, 7 pgs.
Australian Notice of Allowance in Application 2009318022, dated Jun. 5, 2014, 2 pgs.
European Office Action Communication, in Application EP 10770166.6, dated Jul. 17, 2014, 1 page.
U.S. Appl. No. 13/539,473, Notice of Allowance dated Sep. 4, 2014, 8 pgs.
U.S. Appl. No. 13/760,224, Amendment and Response dated Sep. 8, 2014, 11 pgs.
U.S. Appl. No. 13/539,473, Supplemental Notice of Allowance dated Sep. 30, 2014, 2 pgs.
U.S. Appl. No. 12/276,874, Amendment and Response dated Sep. 30, 2014, 12 pgs.
Taiwanese Notice of Allowance in Application 97144208, dated Sep. 5, 2014, 4 pgs.
Australian Notice of Allowance in Application 2009241535, dated Aug. 7, 2014, 2 pgs.
U.S. Appl. No. 12/111,174, Notice of Allowance dated Aug. 29, 2012, 11 pgs.
U.S. Appl. No. 12/111,174, Office Action dated Nov. 21, 2011, 20 pgs.
U.S. Appl. No. 12/117,025, Notice of Allowance dated Sep. 15, 2011, 9 pgs.
U.S. Appl. No. 12/117,040, Notice of Allowance dated Dec. 6, 2012, 14 pgs.
U.S. Appl. No. 12/117,040, Notice of Allowance dated Mar. 29, 2012, 11 pgs.
U.S. Appl. No. 12/117,040, Notice of Allowance dated Jun. 21, 2012, 9 pgs.
U.S. Appl. No. 12/117,040, Notice of Allowance dated Aug. 20, 2012, 14 pgs.
U.S. Appl. No. 12/117,040, Office Action dated Oct. 4, 2011, 15 pgs.
U.S. Appl. No. 12/145,536, Office Action dated Mar. 12, 2012, 52 pgs.
U.S. Appl. No. 12/276,874, Final Office Action dated Aug. 3, 2011, 15 pgs.
U.S. Appl. No. 12/276,874, Office Action dated Oct. 26, 2011, 18 pgs.
U.S. Appl. No. 12/276,874, Office Action dated Feb. 22, 2011, 15 pgs.
U.S. Appl. No. 12/276,874, Office Action dated Mar. 28, 2013, 24 pgs.
U.S. Appl. No. 12/276,874, Office Action dated Apr. 26, 2012, 20 pgs.
U.S. Appl. No. 12/276,874, Office Action dated May 30, 2014, 25 pgs.
U.S. Appl. No. 12/276,874, Office Action dated Sep. 10, 2013, 24 pgs.
U.S. Appl. No. 12/276,874, Office Action dated Sep. 27, 2012, 22 pgs.
U.S. Appl. No. 12/432,817, Notice of Allowance dated May 2, 2012, 6 pgs.
U.S. Appl. No. 12/432,817, Notice of Allowance dated Aug. 6, 2012, 5 pgs.
U.S. Appl. No. 12/432,817, Office Action dated Jan. 25, 2012, 27 pgs.
U.S. Appl. No. 12/432,817, Office Action dated Sep. 12, 2011, 25 pgs.
U.S. Appl. No. 13/079,605, Notice of Allowance dated Oct. 22, 2012, 9 pgs.
U.S. Appl. No. 13/079,605, Notice of Allowance dated Nov. 19, 2012, 2 pgs.
U.S. Appl. No. 13/079,605, Notice of Allowance dated Dec. 5, 2012, 2 pgs.
U.S. Appl. No. 13/079,605, Notice of Allowance dated Apr. 20, 2012, 9 pgs.
U.S. Appl. No. 13/079,605, Notice of Allowance dated Jun. 28, 2012, 9 pgs.
U.S. Appl. No. 13/079,605, Office Action dated Dec. 5, 2011, 31 pgs.
U.S. Appl. No. 13/495,659, Office Action dated Oct. 25, 2013, 8 pgs.
U.S. Appl. No. 13/495,659, Office Action dated Nov. 21, 2012, 7 pgs.
U.S. Appl. No. 13/495,659, Office Action dated Jul. 5, 2013, 8 pgs.
U.S. Appl. No. 13/495,659, Office Action dated Jul. 9, 2014, 8 pgs.
U.S. Appl. No. 13/539,473, Notice of Allowance dated Jul. 9, 2014, 9 pgs.
U.S. Appl. No. 13/539,473, Office Action dated Oct. 11, 2012, 23 pgs.
U.S. Appl. No. 13/539,473, Office Action dated Oct. 25, 2013, 17 pgs.
U.S. Appl. No. 13/539,473, Office Action dated Apr. 2, 2013, 26 pgs.
U.S. Appl. No. 13/760,224, Office Action dated Jun. 6, 2014, 14 pgs.
U.S. Appl. No. 12/117,025, Notice of Allowance dated Jan. 8, 2014, 11 pgs.
U.S. Appl. No. 12/117,025, Notice of Allowance dated Nov. 22, 2013, 13 pgs.
U.S. Appl. No. 12/117,025, Notice of Allowance dated Feb. 20, 2014, 10 pgs.
U.S. Appl. No. 12/117,025, Notice of Allowance dated Apr. 14, 2014, 11 pgs.
U.S. Appl. No. 12/117,025, Notice of Allowance dated Jul. 21, 2011, 10 pgs.
U.S. Appl. No. 12/117,025, Office Action dated Oct. 31, 2012, 11 pgs.
U.S. Appl. No. 12/117,025, Office Action dated Jul. 23, 2013, 12 pgs.
U.S. Appl. No. 12/145,536, Notice of Allowance dated Nov. 23, 2012, 18 pgs.
U.S. Appl. No. 12/145,536, Office Action dated Aug. 1, 2011, 37 pgs.
Venolia, Gina et al., "Understanding Sequence and Reply Relationships Within Email Conversations: A Mixed-Model Vizualization", Apr. 2003, Proceedings of the SIGCHI Conference on Human Factors in Computing Systems, Ft. Lauderdale, FL, USA, Apr. 5-10, 2003, 8 pgs.
Wilde, Erik, "Multi-User Multimedia Editing with the MultimETH System," Swiss Federal Institute of Technology, CH 8092, Zurich, (at least as early as Oct. 10, 2007), http://dret.net/netdret/docs/wilde-tikrep18.pdf, pp. 1-9.
Willden, Andrew, "Track Changes in Word 2007," Fall 2007, 2 pages.
Williams, Tim, "Version Control on the Cheap: A User-Friendly, Cost-Effective Revision Control System for SAS", 10 pgs., no. date.
Zend Corporation, the PHP Company, "Team Development With Zend Studio for Eclipse", White Paper, Jan. 2008, 17 pgs.

(56) References Cited

OTHER PUBLICATIONS

U.S. Appl. No. 12/145,536, Amendment and Response filed Feb. 8, 2011, 18 pgs.
U.S. Appl. No. 12/145,536, Amendment and Response filed Jul. 26, 2011, 19 pgs.
U.S. Appl. No. 13/495,659, Amendment and Response filed Oct. 9, 2014, 8 pgs.
Taiwanese Office Action and Search Report in Application 98139984, dated Sep. 16, 2014, 12 pages.
U.S. Appl. No. 13/539,473, Notice of Allowance dated Nov. 14, 2014, 8 pgs.
U.S. Appl. No. 13/539,473, Amendment filed Nov. 24, 2014, 8 pgs.
U.S. Appl. No. 13/495,659, Office Action dated Nov. 20, 2014, 7 pgs.
Preston, Jon A, et al., "An efficient synchronous collaborative editing system deploying dynamic locking of varying granularity in generalized document trees", Nov. 17-20, 2006, pp. 1-10.
U.S. Appl. No. 13/760,224, Notice of Allowance dated Dec. 8, 2014, 11 pgs.
U.S. Appl. No. 12/276,874, Office Action dated Dec. 4, 2014, 26 pgs.
U.S. Appl. No. 13/539,473, USPTO Response after Amendment after Allowance dated Dec. 10, 2014, 2 pgs.
Korean Office Action in Application 10-2010-700797, dated Nov. 28, 2014, 5 pgs.
Korean Office Action in Application 10-2010-7012220, dated Nov. 28, 2014, 7 pgs.
Korean Notice of Final Rejection in Application 10-2015-7002346, dated Aug. 19, 2015, 18 pgs.
Taiwanese Search Report in application 103135218, dated Aug. 26, 2015, 1 page.
Israel Office Action in Patent Application 212007, dated Mar. 31, 2015, 3 Pages.
Canadian Office Action in Application 2718106, dated Sep. 14, 2015, 6 pgs.
Korean Notice of Preliminary Rejection in Application 10-2015-7019793, dated Sep. 11, 2015, 11 pgs. (with English translation).
Malaysian Adverse Report in Application PI 2010001575, dated Jul. 31, 2015, 3 pgs.
Malaysian Adverse Report in Application PI 2010001887, dated Jul. 31, 2015, 3 pgs.
Malaysian Adverse Report in Application PI 2010002084, dated Jul. 31, 2015, 3 pgs.
Canadian Office Action in Application 2724679, dated Oct. 14, 2015, 3 pgs.
Korean Office Action in Application 10-2015-7019912, dated Sep. 11, 2015, 6 pgs.
U.S. Appl. No. 14/534,384, Amendment and Response filed Sep. 21, 2015, 12 pgs.
Malaysian Adverse Report in Application PI2011001841, dated Mar. 15, 2016, 3 pgs.
Canadian Notice of Allowance in Application 2756863, dated Mar. 16, 2016, 1 page.
Korean Office Action in Application 1020117025682, dated Mar. 14, 2016, 5 pgs.
Chinese Notice on Reexamination in Application 2009801477693, dated Apr. 5, 2016, 10 pgs.
Canadian Office Action in Application 2,666,340, dated Apr. 21, 2016, 13 pgs.
Korean Final Rejection in Application 10-2010-7019793, dated Mar. 31, 2016, 12 pgs.
U.S. Appl. No. 14/534,384, Notice of Allowance dated May 20, 2016, 11 pgs.
Korean Final Rejection in Application 10-2015-7025970, dated May 23, 2016, 5 pgs.
U.S. Appl. No. 13/544,310, Amendment and Response filed Jun. 4, 2016, 11 pgs.
U.S. Appl. No. 13/859,631, Amendment and Response filed Jun. 3, 2016, 15 pgs.

Korean Notice of Preliminary Rejection in Application 10-2015-7019912, dated Mar. 31, 2016, 10 pgs.
U.S. Appl. No. 13/859,631, Amendment and Response filed Oct. 29, 2015, 15 pgs.
U.S. Appl. No. 14/534,384, Office Action dated Jan. 5, 2016, 20 pgs.
U.S. Appl. No. 13/859,631, Office Action dated Dec. 8, 2015, 34 pgs.
Taiwanese Notice of Allowance in Application 103135218, dated Nov. 30, 2015, 4 pgs.
Malaysian Notice of Allowance in Application PI 2010005579, dated Oct. 30, 2015, 2 pgs.
Korean Notice of Preliminary Rejection in Application 1020157025969, dated Nov. 17, 2015, 7 pgs.
Korean Notice of Preliminary Rejection in Application 1020157025970, dated Nov. 11, 2015, 11 pgs.
Brinck et al., "A Collaborative Medium for the Support if Conversational Props", Nov. 1992 CSCW 92 Proceedings, pp. 171-178.
Farella et al., "Multi-Client Cooperation and Wireless Pda Interaction in Immersive Virtual Environment", http://www-micrel.deis.unibo.it/~farella/doc/Farella115def.pdf—(Publicly known at least as early as Aug. 2006).
Geyer et al., "A Team Collaboration Space Supporting Capture and Access of Virtual Meetings", Proceedings of the 2001 International ACM Siggroup Conference on Supporting Group Work, ACM, pp. 188-196.
http://www.geimaginationcubed.com, 5 pages (Publicly known at least as early as Mar. 2005).
Kolland et al., "Information Sharing in Collaborative Environments, Enabling Technologies: Infrastructure for Collaborative Enterprises", 1994, pp. 140-154.
Leung et al., "Creating a multiuser 3-D virtual environment", Date: May 2001, On pp. 9-16, vol. 18, Issue: 3, http://ieeexplore.ieee.org/xpl/abs_free.jsp?arNumber=924884.
Roseman et al., "TeamRooms: Network Places for Collaboration, Proceeding of the 1996 ACM Conference on Computer Supported Cooperative Work", pp. 325-333.
Roussel, Nicolas, "Mediascape: a Web-based Mediaspace", http://citeseer.ist.psu.edu/cache/papers/cs/25847/http:zSzzSzwww-ihm.lri.frzSzzCz7erousselzSzpublicationszSzmultimedia.pdf/roussel99mediascape.pdf—(Publicly known at least as early as Aug. 2006).
PCT International Search Report in International Application No. PCT/US2007/083024, dated Apr. 29, 2008, 11 pgs.
Chinese First Office Action for Application No. 200780042038.3 dated Jun. 23, 2010, 20 pgs.
Chinese Second Office Action for Application No. 200780042038.3 dated Apr. 28, 2011, 10 pgs.
Australian Office Action for Application No. 2007324103 dated May 27, 2011, 2 pgs.
Chinese Notice of Allowance for Application No. 200780042038.3 dated Aug. 25, 2011, 4 pgs.
Australian Notice of Acceptance in Application No. 2007324103 dated Sep. 14, 2011, 3 pgs.
Russian Notice of Allowance for Application No. 2009117840/08 dated Feb. 7, 2012, 22 pgs.
Japanese Office Action for Application No. 2009-537263 dated Feb. 21, 2012, 8 pgs.
Japanese Notice of Allowance for Application No. 2009-537263 dated Jun. 22, 2012, 6 pgs.
European Search Report for Application No. PCT/US2007083024 dated Mar. 28, 2013, 8 pgs.
Korean Notice of Preliminary Rejection for Application No. 10-2009-7010393 dated Feb. 28, 2014, 16 pgs.
Korean Notice of Allowance received for Patent Application No. 10-2009-7010393, dated May 20, 2014, 2 pages. (w/o English Translation).
Canadian Office Action Issued in Patent Application No. 2666340, dated Nov. 28, 2014, 5 pages.
Canadian Office Action Issued in Patent Application No. 2666340, dated Sep. 14, 2015, 6 pages.
U.S. Appl. No. 11/599,599, Office Action dated Jun. 11, 2009, 15 pgs.

(56) References Cited

OTHER PUBLICATIONS

U.S. Appl. No. 11/599,599, Amendment and Response filed Aug. 27, 2009, 10 pgs.
U.S. Appl. No. 11/599,599, Notice of Allowance dated Dec. 17, 2009, 13 pgs.
U.S. Appl. No. 12/713,582, Office Action dated Dec. 24, 2013, 17 pgs.
U.S. Appl. No. 12/713,582, Amendment and Response dated Mar. 24, 2014, 10 pgs.
U.S. Appl. No. 12/713,582, Notice of Allowance dated Feb. 13, 2015, 17 pgs.
European Communication in Application 07863665.1, dated Apr. 16, 2013, 1 page.
Malaysian Notice of Allowance in Application PI 20091514, dated Oct. 30, 2007, 3 pgs.
Notice of Allowance Issued in Korean Patent Application No. 10-2010-7029113, dated Dec. 31, 2015, 2 Pages. (W/O English Translation).
U.S. Appl. No. 13/544,310, Office Action dated Jan. 15, 2016, 10 pgs.
European extended Search Report in Application 08848473.8, dated Feb. 18, 2016, 11 pgs.
Ruixuan Li et al., "P2P-based Locking in Real-Time Collaborative Editing Systems", Computer Supported Cooperative Work in Design, 2007, CSCWD, 11th Int'l. Conf. on IEEE, PI, Apr. 1, 2007, pp. 24-29.
Malaysian Notice of Allowance in Application PI 2010001887, dated Jan. 15, 2016, 2 pgs.
Korean Office Action in Application 10-2011-7011228, dated Dec. 31, 2015, 4 pgs.
U.S. Appl. No. 14/534,384, Amendment and Response filed Apr. 5, 2016, 14 pgs.
European Communication in Application 08848473.8, dated Mar. 8, 2016, 1 page.
Taiwan Office Action and Search Report in Application 103126243, dated Mar. 1, 2016, 5 pgs.
Canadian Office Action in Application 2718106, dated Mar. 17, 2016, 5 pgs.
Malaysian Notice of Allowance in Application PI2010004653, dated Nov. 30, 2015, 2 pgs.
Canadian Office Action in Application 2724679, dated Mar. 23, 2016, 5 pgs.
European Notice of Allowance in Application 09770643.6, dated Feb. 22, 2016, 8 pgs.
U.S. Appl. No. 14/534,384, Amendment after Allowance filed Aug. 4, 2016, 8 pgs.
European Office Action in Application 08848473.8, dated Sep. 2, 2016, 9 pgs.
Taiwan Notice of Allowance in Application 103126243, dated Jul. 7, 2016, 4 pgs.
Korean Office Action in Application 1020107012220, dated Sep. 13, 2016, 4 pgs.
Chinese Decision on Reexamination in Application 200980147769.3, dated Sep. 30, 2016, 18 pgs.
U.S. Appl. No. 13/544,310, Amendment and Response filed Nov. 23, 2016, 10 pgs.
U.S. Appl. No. 13/859,631, Amendment and Response filed Nov. 30, 2016, 14 pgs.
European Extended Search Report in Application 09827960.7, dated Dec. 13, 2016, 8 pgs.
Anonymous, "A.nnotate: Annotate PDF, Word, Excel and Web Pages Online", May 20, 2008, retrieved from the Internet at: http://www.makeuseof.com/tag/annotate/, retrieved on Nov. 14, 2016, 4 pgs.
Murray, Katherine et al., "Microsoft Office Word 2007 inside out", Jun. 20, 2007, retrieved from the Internet at: https://www.microsoftpressstore.com/, retrieved on Nov. 14, 2016, 40 pgs.
Norwegian Office Action and Search Report in Application 20091461, dated Nov. 30, 2016, 5 pgs.
Korean Office Action in Application 10-2015-7025969, dated Jan. 31, 2017, 8 pgs.
Korean Notice of Allowance in Application 10-2010-7012220, dated Jan. 9, 2017, 2 pgs. (No English translation).
Canadian Office Action in Application 2739621, dated Jan. 5, 2017, 7 pgs.
U.S. Appl. No. 13/544,310, Office Action dated Dec. 30, 2016, 14 pgs.
Antonovich, Michael, "Office and Share Point 2007 User's Guide: Integrating Share Point with Excel, Outlook, and Word," Feb. 2009, Apress, Section 6.5 , 20 pgs.
Korean Notice of Preliminary Rejection in Application 10-2015-7019912, dated Oct. 20, 2016, 24 pgs.
U.S. Appl. No. 13/544,310, Office Action dated Jun. 23, 2016, 13 pgs.
U.S. Appl. No. 13/859,631, Office Action dated Jun. 30, 2016, 24 pgs.
Korean Office Action in Application 10-2015-7025969, dated Jun. 29, 2016, 8 pgs.
Israel Office Action in Patent Application 212007, dated Nov. 15, 2016, 6 Pages, (with English translation).
Canadian Office Action in Application 2718106, dated Mar. 3, 2017, 4 pgs.
Korean Office Action in Application 10-2015-7019912, dated Feb. 20, 2017, 6 pgs.
Indian Office Action in Application 02868/CHENP/2009, dated Feb. 27, 2017, 8 pgs.
Canadian Office Action in Application 2724679, dated Mar. 7, 2017, 5 pages.
Indian Office Action in Application 3034/CHENP/2010, dated Mar. 31, 2017, 7 pgs.
Malaysian Notice of Allowance in Application PI 2010002084, dated Feb. 15, 2017, 2 pgs.
U.S. Appl. No. 13/544,310, Amendment and Response filed Mar. 30, 2017, 12 pgs.
U.S. Appl. No. 13/859,631, Office Action dated Apr. 7, 2017, 27 pgs.
Canadian Notice of Allowance Issued in Patent Application No. 2666340, dated Mar. 28, 2017, 1 page.
European Notice of Allowance in Application 08848473.8, dated Jun. 6, 2017, 8 pgs.
Korean Office Action in Application 10-2015-7025969, dated May 8, 2017, 8 pgs.
U.S. Appl. No. 15/248,158, Office Action dated Jun. 6, 2017, 20 pages.
U.S. Appl. No. 13/544,310, Notice of Allowance dated May 1, 2017, 8 pgs.
U.S. Appl. No. 13/544,310, Notice of Allowance dated May 26, 2017, 2 pgs.
Korean Office Action in Application 10-2017-7006064, dated May 19, 2017, 18 pgs.
U.S. Appl. No. 14/683,394, Office Action dated Jul. 21, 2017, 13 pgs.
U.S. Appl. No. 14/711,300, Office Action dated Jun. 26, 2017, 25 pgs.
Korean Notice of Final Rejection in Application 10-2015-7019912, dated Jun. 20, 2017, 5 pages.
U.S. Appl. No. 15/248,158, Amendment and Response filed Sep. 6, 2017, 14 pages.
U.S. Appl. No. 13/544,310, Notice of Allowance dated Jul. 24, 2017, 2 pgs.
U.S. Appl. No. 13/544,310, Notice of Allowance dated Aug. 16, 2017, 2 pgs.
Canadian Office Action in Application 2739621, dated Aug. 13, 2017, 4 pgs.
Malaysian Notice of Allowance in Application PI 201001575, dated Aug. 15, 2017, 2 pages.

\* cited by examiner

COLLABORATIVE AUTHORING MODES

CROSS REFERENCE TO RELATED APPLICATIONS

This application is a continuation of application Ser. No. 11/957,010, filed Dec. 14, 2007, and now assigned U.S. Pat. No. 8,825,758 which is incorporated herein by reference in its entirety.

BACKGROUND

Traditional collaborative editing tends to be performed serially. Users take turns accessing a document, editing the document, and storing their edits. The accessing user may place a lock on the file to inhibit other users from editing the document when the accessing user is editing the document. Such iterative editing processes can cause delays since each user may wait for a turn at editing the document. In addition, iterative editing processes may be difficult to manage. For example, each user may need to keep track of who is editing which portions of the document, which version of the document is the most recent, and when the user will have a turn.

In other types of traditional collaborative editing, users can edit a shared copy of the same document. For example, in the ONENOTE® note-taking program offered by MICROSOFT CORPORATION of Redmond, Wash., multiple users may add, move, and delete objects concurrently within a shared notebook-style document. In such products, changes to the document tend to be available to users in real-time or a close-approximation thereof.

It is with respect to these and other considerations that the present disclosure has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

In general, a collaborative authoring application provides an authoring environment in which two or more users can edit a document concurrently. The authoring application is adapted to be selectively configured into a public mode of operation, in which each user's edits are freely shared, or a private mode of operation, in which each user's edits may be kept private.

According to aspects, metadata updates are synchronized automatically between each user copy and the master copy of the document regardless of the selected operating mode. The availability of content updates, however, depends on the operating mode into which the authoring application is configured.

In one embodiment, an authoring application configured in a public operating mode periodically shares with the master copy both content and metadata updates generated by the authoring application. In another embodiment, an authoring application configured in a private operating mode periodically shares with the master copy only metadata updates generated by the authoring application.

According to other aspects, an authoring application may edit a user copy of a document even when the authoring application cannot synchronize content or metadata with a master copy of the document (e.g., when the authoring application is offline). In one embodiment, the authoring application may be configured into a public or private mode of operation when the authoring application is offline.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

In the following detailed description, references are made to the accompanying drawings that form a part hereof, and in which are shown by way of illustrations specific embodiments or examples. While the disclosure will be described in the general context of program modules that execute in conjunction with an application program that runs on an operating system on a computer system, those skilled in the art will recognize that the disclosure also may be implemented in combination with other program modules. The embodiments described herein may be combined and other embodiments may be utilized without departing from the spirit or scope of the present disclosure. The following detailed description is therefore not to be taken in a limiting sense, and the scope of the invention is defined by the appended claims and their equivalents.

Figure 1:
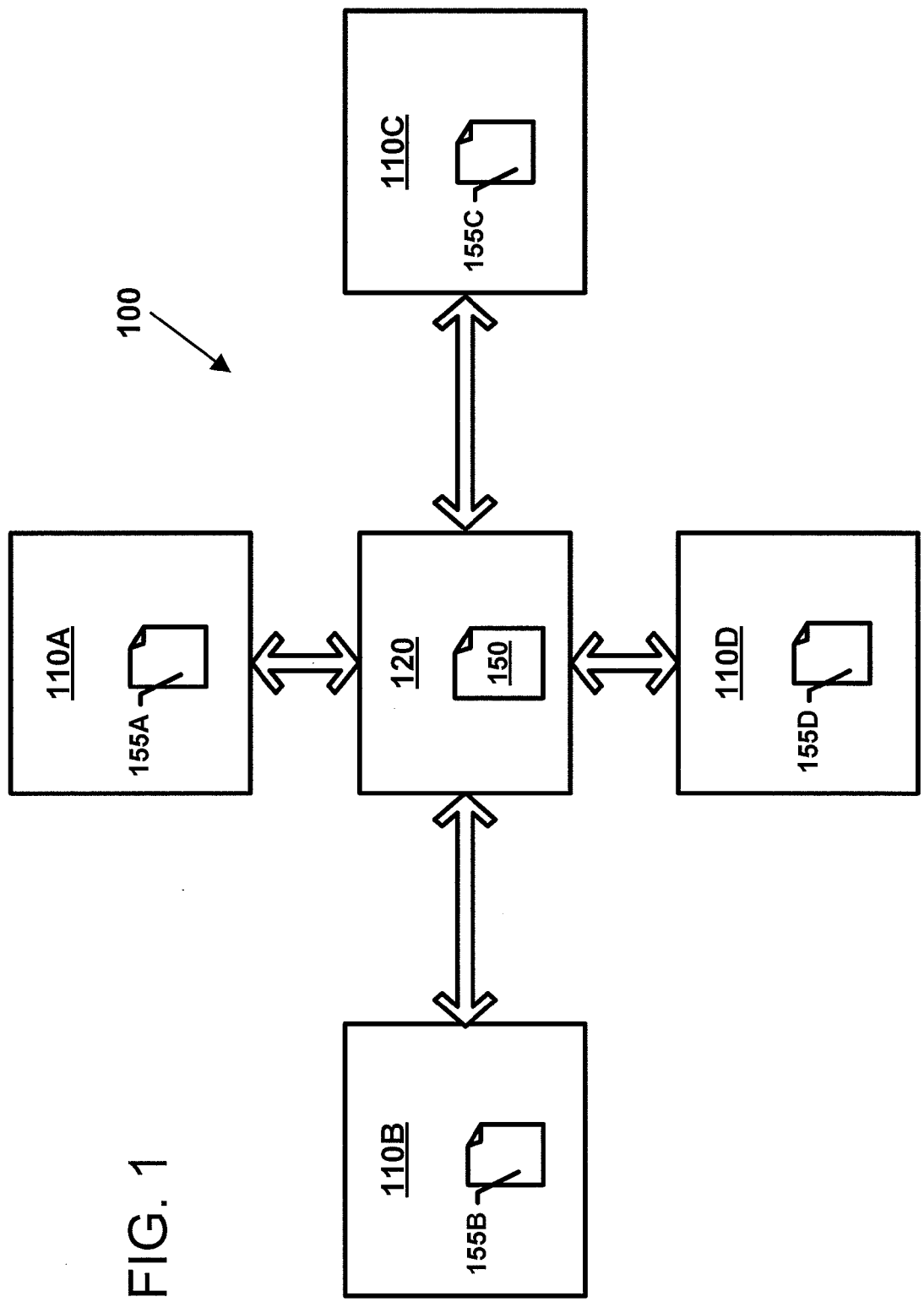
FIG. 1 is a schematic block diagram illustrating an example authoring system having features that are examples of inventive aspects of the disclosure.

Embodiments of the present disclosure provide an environment in which multiple users may collaboratively author a document. FIG. 1 illustrates an example authoring system 100 having features that are examples of inventive aspects of the present disclosure. The authoring system 100 includes a storage device 120 storing a master copy of a document 150. In one embodiment, the storage device 120 may include a computing device. In another embodiment, the storage device 120 can include one or more storage devices (e.g., a network of server computing devices).

The authoring system 100 also includes at least one user computing device 110 that may communicatively couple to the storage device 120. Each of the user computing devices 110 may edit the document 150 by creating a user copy 155 of the document 150 and editing the user copy 155. The user copies 155 of the document 150 are synchronized when the user computing devices 110 periodically send to the storage device 120 updates to be shared with the other user computing devices and periodically obtain from the storage device 120 updates from the other user computing devices.

As the term is used herein, a user computing device 110 includes any computing device that is configured to obtain a user copy of a document to be authored from a master copy of the document. The user computing device 110 can be different from the storage device 120 or can include a different user account implemented on the storage device 120. In one embodiment, a computing device that acts as a storage device 120 for one document may act as a user computing device 110 for a different document and vice versa.

In the example shown in FIG. 1, four user computing devices 110A, 110B, 110C, and 110D are communicatively coupled to the storage device 120. In other embodiments, however, any number of computing devices 110 may be coupled to the storage device 120. In the example shown, each user computing device 110A, 110B, 110C, 110D can send to the storage device 120 updates generated by the user of the user computing device and can request from the storage device 120 updates generated by the users of the other user computing devices. In one embodiment, the storage device 120 can be a server computing device and the user computing devices 110A, 110B, 110C, 110D can be client computing devices.

Figure 2:
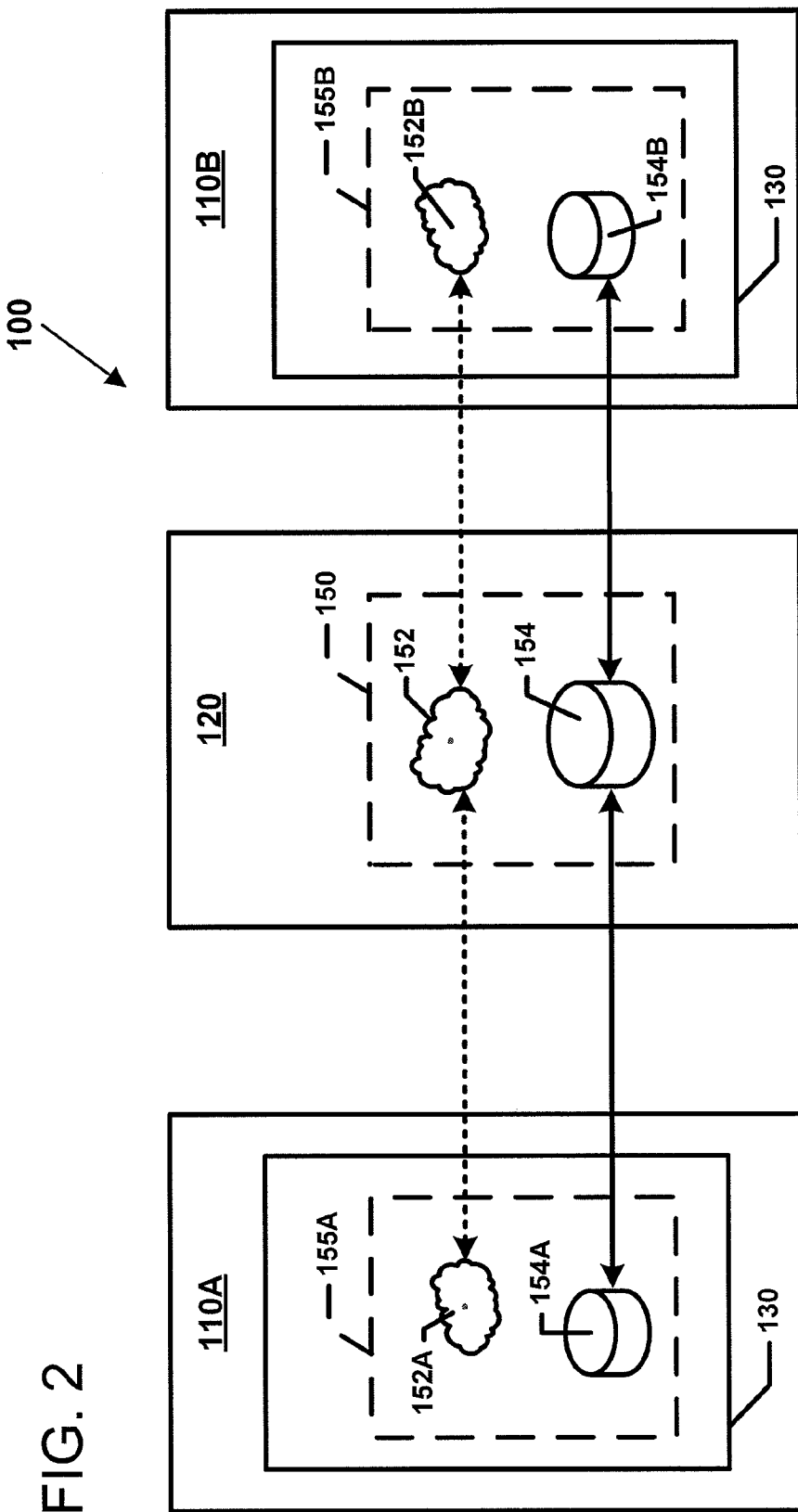
FIG. 2 is a schematic block diagram illustrating the authoring system of FIG. 1 in which a document stored on first computing device may include content and metadata in accordance with the principles of the present disclosure.

As shown in FIG. 2, the master copy of the document 150 stored on the storage device 120 can include content 152 and metadata 154. In some embodiments, metadata 154 can be stored separately from content 152. For example, content 152 can be stored in the document 150 and metadata 154 can be stored in a table (not shown) separate from the document 150. In other embodiments, however, the metadata 154 can be stored within the document 150.

Authoring applications 130 on the user computing devices 110 process and manipulate corresponding content and metadata of the user copies 155 of the document 150. In general, the authoring applications 130 can synchronize updates to the content 152 separately from updates to the metadata 154. For example, metadata updates 154 may be synchronized automatically among the storage device 120 and user computing devices 110, whereas content updates 152 from each user computing device 110 may be synchronized at the request of the respective user.

As the term is used herein, metadata updates refer to any addition, deletion, and/or revision made to metadata 154 of the document to be authored. Non-limiting examples of document metadata include content locks, presence information, and other such data. As will be discussed herein, content locks inhibit editing of content within the lock by users that do not own the lock. Presence information indicates which users have indicated an intention to edit the document to be authored.

In some embodiments, metadata may be exchanged between the storage device 120 and the user computing device 110 at periodic time intervals. In one embodiment, metadata may be exchanged every few seconds. However, metadata exchanges may occur at shorter or longer time intervals. In other embodiments, metadata may be exchanged when a user performs a finalization act (e.g., saving the document).

As the term is used herein, content updates refer to any addition, deletion, and/or revision made to the substantive content 152 of the document to be authored. For example, content updates for a word processing document may include added paragraphs (i.e., or sections thereof), deleted paragraphs (i.e., or section thereof), and/or revised paragraphs (i.e., or sections thereof). In another embodiment, content updates for a presentation document can include added, deleted, and/or revised pictures, text, animations, sounds, and other such data objects.

In some embodiments, content is exchanged only at the request of a user. For example, in one embodiment, a user of one of the user computing devices 110 may request to share content changes with other users. In another embodiment, a user of one of the user computing devices 110 may request to view content changes made by other users. In other embodiments, however, content may be exchanged automatically.

Figure 3:
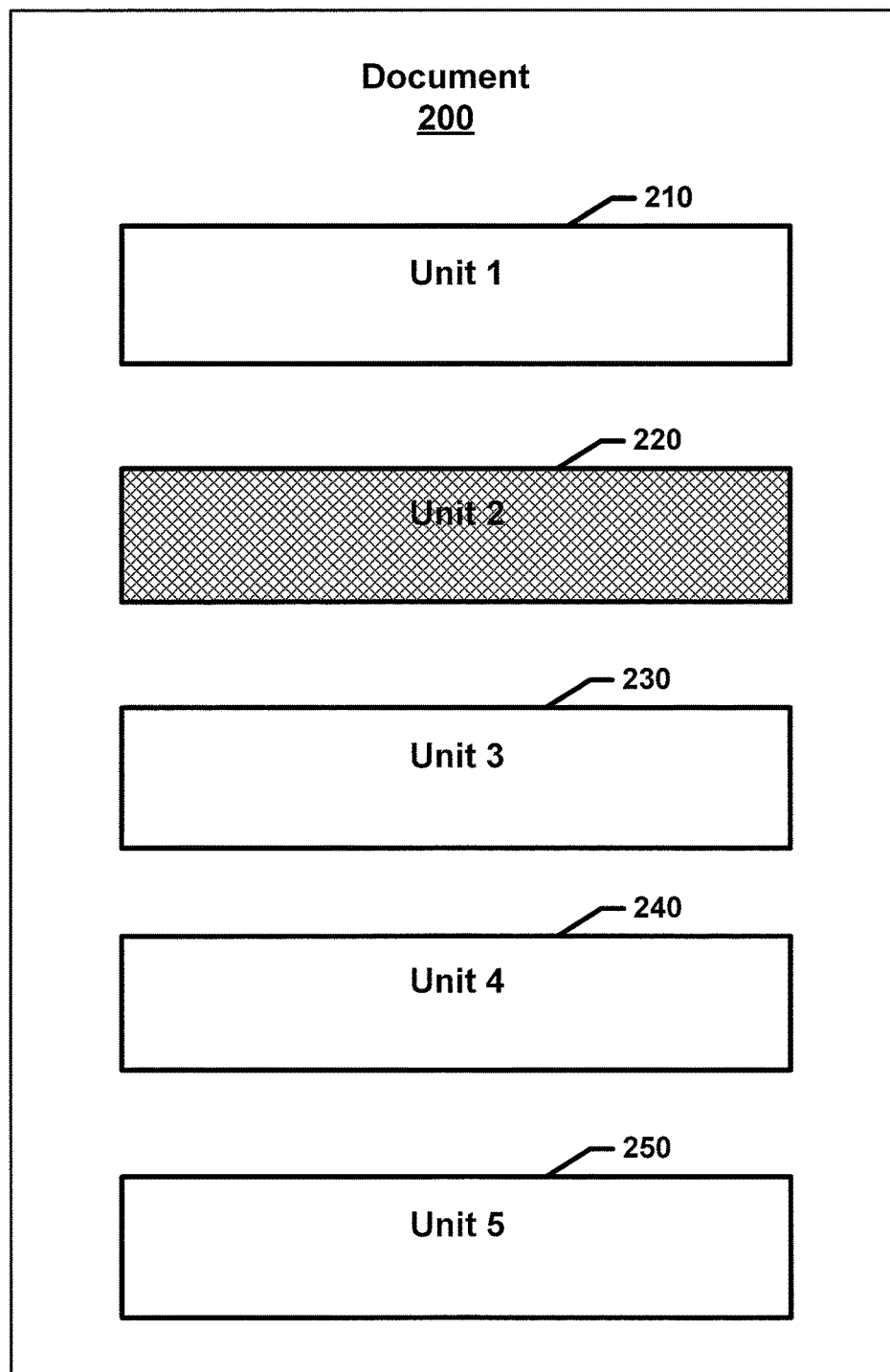
FIG. 3 is a schematic block diagram of a document having five units of data, the second of which is locked, in accordance with the principles of the present disclosure.

Referring to FIG. 3, content locks inhibit editing conflicts by indicating which portions of a document have been claimed by another user. In some embodiments, the content locks can prevent a user from editing a portion of a document that has been claimed by another user. In other embodiments, however, the user can choose to break the content lock and edit the portion of the document. In such cases, the lock can warn the user that conflicts may arise when editing the locked section.

FIG. 3 is a schematic block diagram of a document 200 having five units of data 210, 220, 230, 240, 250. In one embodiment, the document 200 is a word processing document and the units of data 210-250 are paragraphs of text. In another embodiment, the document 200 is a presentation document and the first unit of data 210 is a title or subject heading, the second unit of data 220 is a picture or other data object, and the remaining units of data 230, 240, 250 are blocks of text.

A first user can generate a lock around one or more of the units of data 210-250 of the document 200. In the example shown in FIG. 3, the first user has locked the second unit of data 220, as indicated by the cross-hatching. By generating the content lock, the first user has indicated the first user intends to edit the second unit of data 220. For example, the first user can generate the lock when the first user is actively editing the unit of data 220. In another embodiment, the first user can generate the lock and then edit the unit of data 220 at a later time. In other embodiments, the lock is generated automatically when the first user edits the document. As noted above, the authoring application managing the document 200 may prevent a user other than the first user from editing the locked data unit 220.

In general, a content lock generated by a first user is displayed to all other users who access the document during the life of the lock. In one embodiment, the first user also can view the content lock. Locks can be displayed using different types of indicia. For example, in one embodiment, the background of a locked unit of data may be colored, shaded, or patterned (e.g., see data unit 220 of FIG. 3). In another embodiment, the content (e.g., text, picture, shape, or other data object) of the locked unit may be colored, shaded, or patterned. In yet another embodiment, a box, bracket, or symbol can be displayed adjacent the locked unit of data to indicate the lock.

Lock metadata can be stored in a variety of different formats. For example, lock metadata may be stored in a table format. Presence metadata also can be stored in a variety of formats. For example, presence metadata can be stored in a table. In another embodiment, however, lock and presence metadata can be stored in a different format.

In general, an authoring environment having features that are examples of inventive aspects in accordance with the principles of the disclosure can be implemented on a user computing device (e.g., a personal computer, a server computer, a notebook computer, a PDA, a Smartphone, or any other such computing device). A non-limiting embodiment of a user computing system 400 configured to implement an authoring environment is described herein with reference to FIG. 4.

Figure 4:
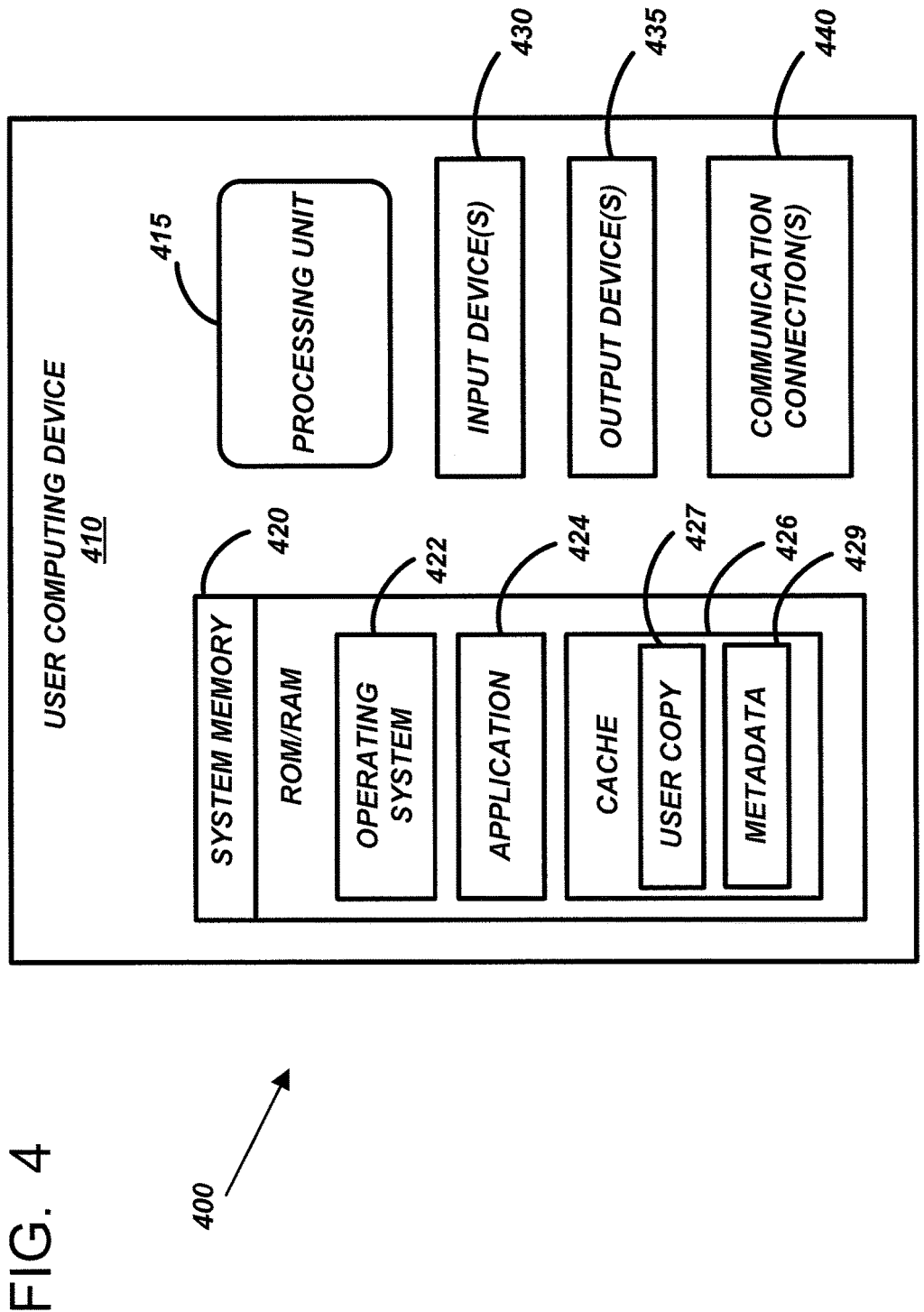
FIG. 4 is a schematic block diagram of a user computing system configured to implement an authoring environment in accordance with the principles of the present disclosure.

In FIG. 4, the exemplary computing system 400 for implementing the principles of the disclosure includes a user computing device, such as user computing device 410. In a basic configuration, the user computing device 410 typically includes at least one processing unit 415 for executing applications and programs stored in system memory 420. Depending on the exact configuration and type of computing device 410, the system memory 420 may include, but is not limited to, RAM, ROM, EEPROM, flash memory, CD-ROM, digital versatile disks (DVD) or other optical storage devices, magnetic cassettes, magnetic tape, magnetic disk storage or other magnetic storage devices, or other memory technology.

System memory 420 typically stores an operating system 422, such as the WINDOWS® operating systems from MICROSOFT CORPORATION of Redmond, Wash., suitable for controlling the operation of the computing device 410. System memory 420 also may include a document cache 426 in which a user copy 427 of a document can be stored. Metadata 429 of the document also can be stored within the user cache 426.

The system memory 420 also may store one or more software applications, such as authoring applications 424 for creating and editing documents. One non-limiting example of an authoring application 424 suitable for authoring documents in accordance with the principles of the present disclosure is MICROSOFT® OFFICE WORD authoring software from MICROSOFT CORPORATION of Redmond, Wash. Other non-limiting examples of authoring applications include POWERPOINT® presentation software and VISIO® drawing and diagramming software, both also from MICROSOFT CORPORATION of Redmond, Wash.

Computing device 410 also may have input device(s) 430, such as a keyboard, mouse, pen, voice input device, touch input device, etc., for entering and manipulating data. Output device(s) 435, such as a display screen, speakers, printer, etc., also may be included. These output devices 435 are well known in the art and need not be discussed at length herein.

The computing device 410 also may contain communication connections 440 that allow the device 410 to communicate with other computing devices, for example, the storage device 120 of FIG. 1, over a network in a distributed computing environment (e.g., an intranet or the Internet). By way of example, and not limitation, communication device media 440 includes wired media such as a wired network or direct-wired connection, and wireless media, such as acoustic, RF, infrared and other wireless media.

Figure 5:
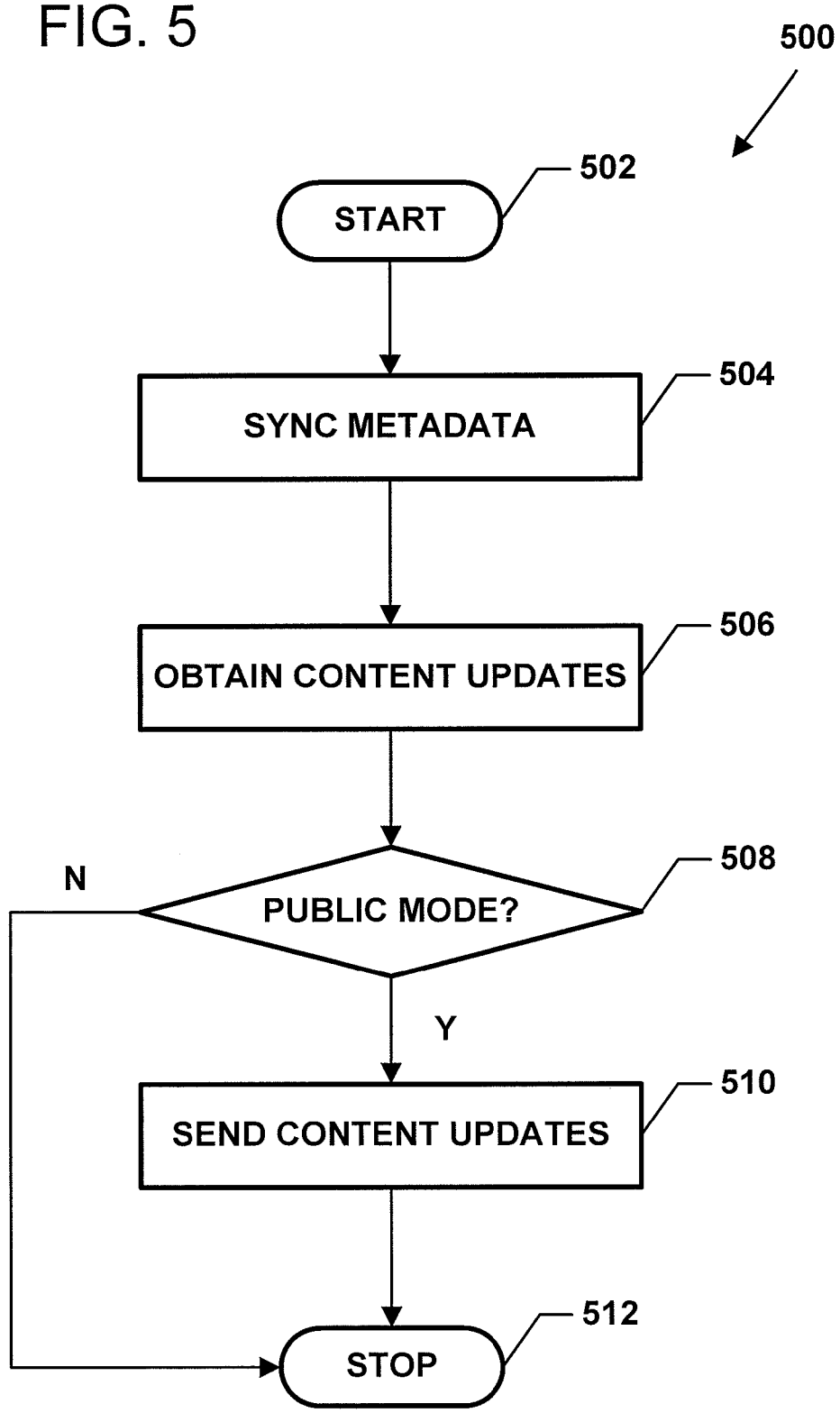
FIG. 5 is a flowchart illustrating an operational flow for an example synchronization process by which a user copy of a document may be synchronized with a master copy of the document in accordance with the principles of the present disclosure.

Referring to FIGS. 5-19, the synchronization process by which an authoring application exchanges content and metadata with the storage device may differ depending on a privacy mode selected by the user of the authoring application. FIG. 5 is a flowchart illustrating an exemplary synchronization process 500 by which an authoring system 100 implemented on a user computing device 110 can synchronize a user copy 155 of a document to be authored with a master copy 150 of the document stored on the storage device 120. The synchronization process 500 initializes and begins at a start module 502 and proceeds to a first update operation 504.

The first update operation 504 synchronizes the metadata of the user copy 155 with the metadata of the master copy 150. In some embodiments, the first update operation 504 synchronizes the metadata without requiring interaction with the user. For example, the first update operation 504 may provide an exchange of metadata between the storage device 120 and the user computing device 110 at periodic time intervals. In one embodiment, the first update operation 504 provides for an exchange of metadata every few seconds. In other embodiments, however, the first update operation 504 may provide for the exchange of metadata to occur in shorter or longer time intervals.

An obtain operation 506 periodically checks the storage cache 125 of the storage device 120 to determine whether any content updates from other users are available. If such content updates are available, the obtain operation 506 obtains the content updates. In one embodiment, the obtain operation 506 causes the user device 110 to poll the storage device 120 and to pull any content updates from the storage cache 125. In another embodiment, the obtain operation 506 causes the storage device 120 to send the content updates to the user device 110 upon request. In other embodiments, however, the storage device 120 sends any available content updates to the user device 110 without prompting from the user device 110.

A determination module 508 determines a mode of operation (e.g., public or private) in which the authoring application 130 is configured. For example, the determination module 508 may determine the authoring application is configured in a public mode of operation. In general, when the authoring applications 130 operates in a public mode, the authoring application 130 generally share content updates with the storage device 120. In one embodiment, authoring applications 130 operating in public mode transmit content updates to the storage device 120 upon performance of a finalization action (e.g., the user saves the document, an auto-save feature activates, etc.).

In another embodiment, the determination module 508 may determine the authoring application 130 is configured in a private mode of operation. In general, authoring applications 130 operating in a private mode generally do not share content updates with the storage device 120. In one embodiment, authoring applications 130 operating in private mode do not transmit content updates to the storage device 120, even upon performance of a finalization action (e.g., the user saves the document, an auto-save feature activates, etc.). In such embodiments, content updates generated by the authoring application 130 are only sent to the storage device 120 only when the user toggles to a public mode of operation.

Accordingly, if the determination module 508 determines the authoring application 130 is configured into a public mode of operation, then a transmit operation 510 sends content updates generated by the authoring application 130 to the storage device 120. The synchronization process 500 completes and ends at a stop module 512. However, if the determination module 508 determines the authoring application 130 is configured in a private mode of operation, then the synchronization process 500 proceeds to the stop module 512 without implementing the transmit operation 510.

Figure 6:
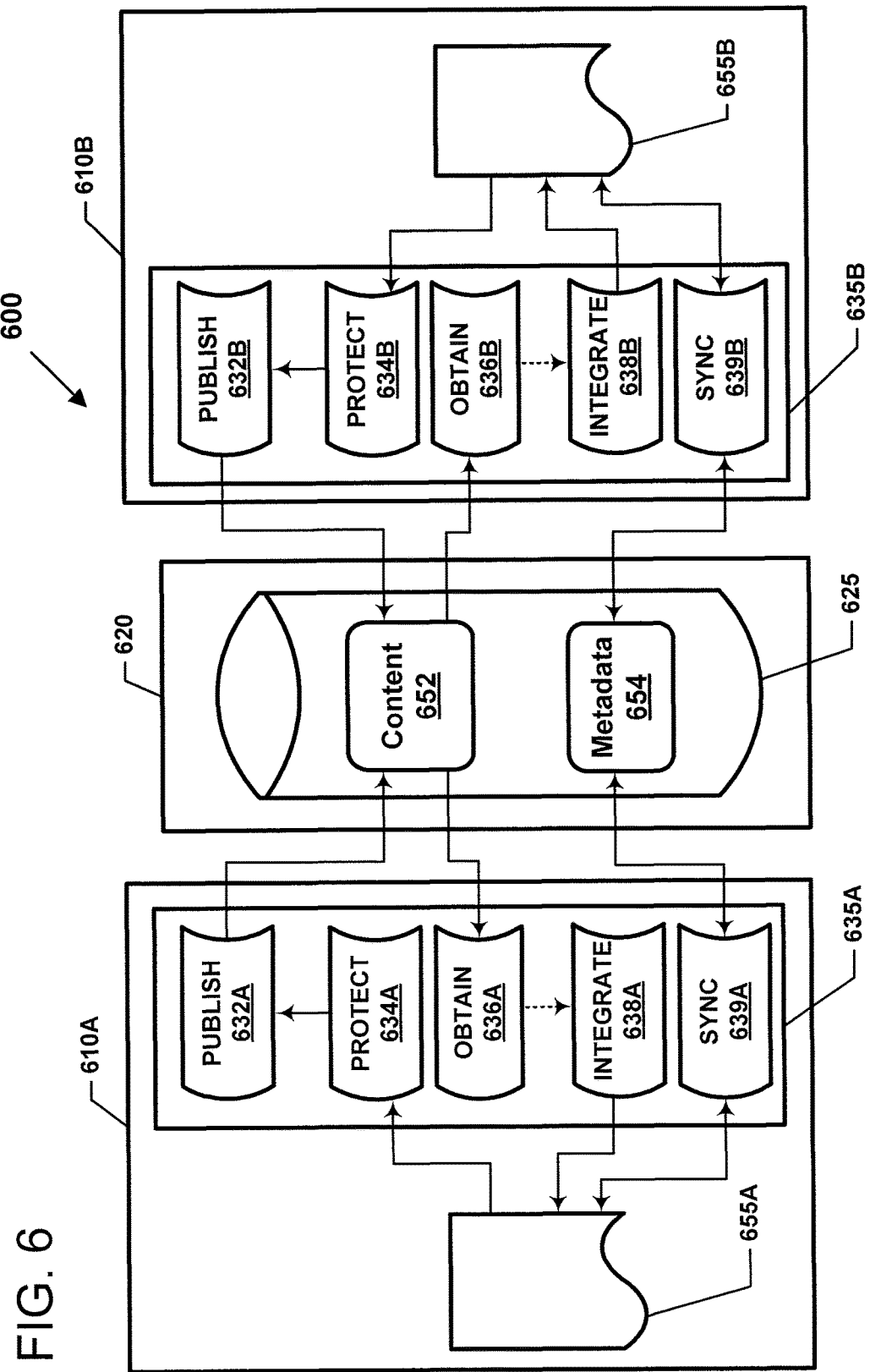
FIG. 6 is a schematic block diagram of an authoring system in which authoring applications are configured into public modes of operation in accordance with the principles of the present disclosure.

FIG. 6 is a schematic block diagram of an authoring system 600 configured to implement a public mode synchronization cycle. The authoring system 600 generally includes a storage device 620 and one or more user devices 610. Content 652 and metadata 654 of a document to be authored are stored within memory 625 on the storage device 620. In the example shown in FIG. 6, a first user device 610A and a second user device 610B both access the content 652 and metadata 654 stored on the storage device 620. The user computing devices 610A, 610B each include a local cache 635A, 635B, respectively, and a user copy 655A, 655B, respectively, of the document to be authored.

The local cache 635 of each user computing device 610 is configured to store a publish module 632, a protect module 634, an obtain module 636, an integrate module 638, and a metadata sync module 639. The protect module 634 is configured to store content changes to the local cache 635. In one embodiment, the protect module 634 triggers activation of the publish module 632. The publish module 632 is configured to provide (e.g., push, transmit, etc.) content updates from the local cache 635 to the storage memory 625 of the storage device 620. In one embodiment, the publish module 632 is configured to queue the content updates generated by the user copy 655 within the local cache 635 for transmission to the storage device 620.

The obtain module 636 is configured to obtain (e.g., pull, receive, etc.) content updates from the storage memory 625 of the storage device 620. In one embodiment, the obtain module 636 is configured to queue the content updates obtained from the storage memory 625 within the local cache 635 of the user device 610. The integrate module 638 is configured to instantiate the content changes into the user copy 655 of the document. In one embodiment, the integrate module 638 is configured to indicate the availability of content updates and to receive a user selection to review, ignore, or instantiate the changes.

The metadata sync module 639 synchronizes metadata updates between the user copy 655 of the document to be authored and a master copy stored on the storage device 620. In one embodiment, the metadata sync module 639 transmits metadata updates between the storage device 620 and the user device 610 at regular time intervals. In another embodiment, the metadata sync module 639 transmits metadata updates as the metadata updates become available. Because metadata updates are regularly shared amongst the storage device 620 and the user devices 610, the metadata stored in the local cache 635 of the user device 610 typically reflects a current state of the metadata of the master copy of the document to be authored.

Figure 7:
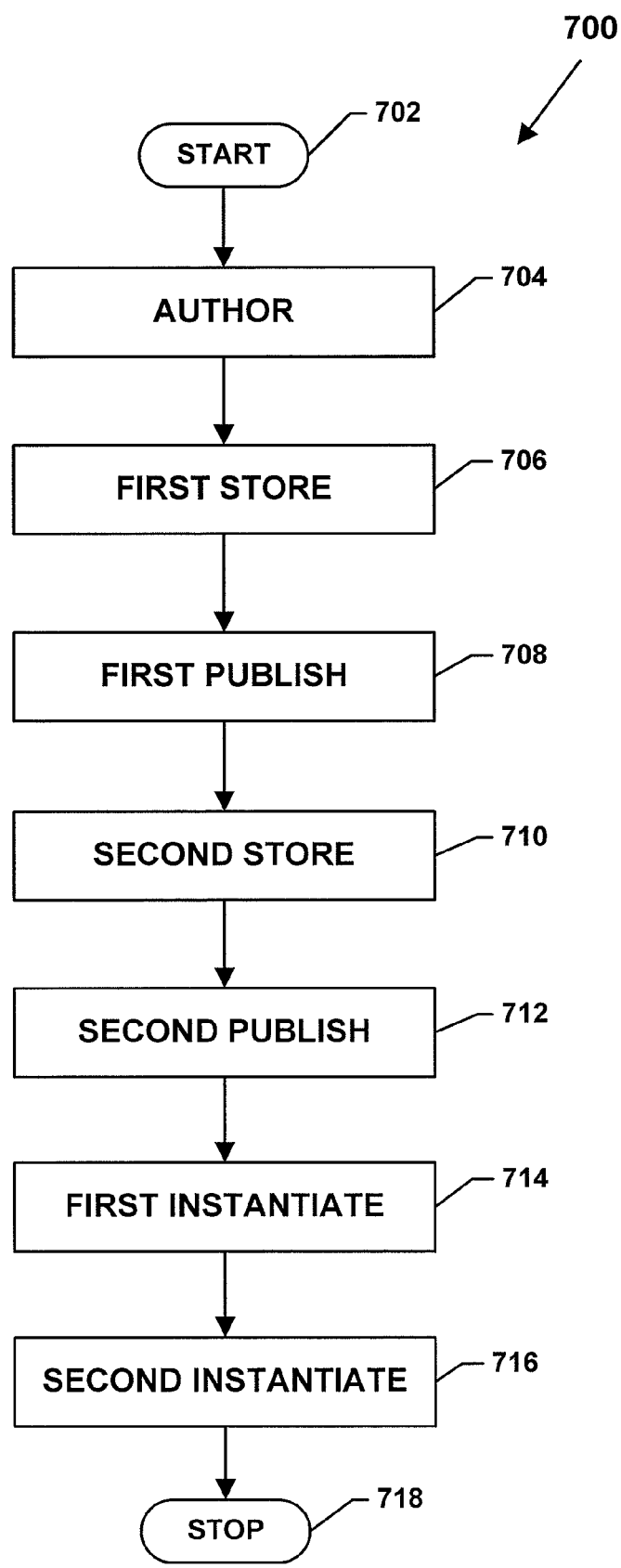
FIG. 7 is a flowchart illustrating an operational flow for an exemplary public mode synchronization process by which an authoring application may synchronize a user copy of a document with a master copy of the document when the authoring application is configured into a public operating mode in accordance with the principles of the disclosure.

FIG. 7 is a flowchart illustrating an example operational flow for a public mode synchronization process 700 by which an authoring application can synchronize a document being edited by the authoring application with a master copy of the document. The public mode synchronization process 700 initializes and begins at a start module 702 and proceeds to an author operation 704, which edits the document according to user instructions. For example, the author operation 704 may ascertain keyboard strokes performed by a user and implement the corresponding editing instructions. In another embodiment, the author operation 704 may ascertain a mouse click performed by the user and implement the corresponding editing instructions.

A first store operation 706 periodically collects any metadata updates and saves them to the local cache of the user device. Accordingly, the metadata updates are protected in case the authoring application crashes or otherwise malfunctions. In one embodiment, the first store operation 706 saves the metadata when the user provides instructions to save changes to the document. In another embodiment, the first store operation 706 stores the metadata when an automatic save feature activates. In another embodiment, the first store operation 706 saves the metadata at regular time intervals (e.g., every few milliseconds, seconds, minutes, etc.) regardless of user interaction.

A first publish operation 708 periodically sends to a storage device any metadata updates stored in the local cache. In general, the first publish operation 708 sends the metadata updates automatically without requiring any interaction with the user. For example, the first publish operation 708 may transmit changes to the metadata (e.g., software deltas) at regular time intervals (e.g., every few milliseconds, seconds, minutes, etc.). In another embodiment, the first publish operation 708 transmits the metadata updates to the storage device when such metadata updates are available in the local cache. In another embodiment, the first publish operation 708 transmits metadata updates at a request of the storage device.

A second store operation 710 periodically saves any content updates to the local cache of the user device. Accordingly, the content updates are protected in case the authoring application crashes or otherwise malfunctions. In one embodiment, the second store operation 710 saves the content updates when the first store operation 706 stores the metadata updates. In other embodiments, however, the second store operation 710 may save the content changes to the local cache at different times than the first store operation 706 stores the metadata updates. In one embodiment, the second store operation 710 may save changes to the content in a queue or other ordered listing to enable the content updates to be subsequently transmitted in the order in which they were generated.

A second publish operation 712 sends the content updates to the storage device. In one embodiment, the second publish operation 712 transmits content updates to the storage device when instructions to share are provided by the user (e.g., the user explicitly performs a publication action, an auto-save feature of the authoring application is implemented, etc.). In another embodiment, the second publish operation 712 transmits content updates when such content updates are available from the authoring application. In another embodiment, the second publish operation 712 sends the content updates automatically without requiring any interaction from the user. In yet another embodiment, the second publish operation 712 may send content updates at a request of the storage device.

A first instantiate operation 714 periodically obtains metadata updates from the storage device and automatically instantiates the metadata updates into the document being authored by the authoring application. For example, the first instantiate operation 714 may obtain metadata updates generated by other users at regular time intervals (e.g., every few milliseconds, seconds, minutes, etc.). In another embodiment, the first instantiate operation 714 obtains the metadata updates when such metadata updates are available. Typically, no interaction with the user is required to instantiate the metadata updates. For example, any newly generated locks will be displayed to the user automatically when the metadata updates are obtained.

A second instantiate operation 716 periodically obtains content updates from the storage device and makes the content updates available to the user for viewing and/or instantiation. For example, the second instantiate operation 716 may obtain at regular time intervals (e.g., every few milliseconds, seconds, minutes, etc.) content updates generated by other users. In another embodiment, the second instantiate operation 716 obtains the content updates when such content updates are available. Typically, the authoring application indicates to the user that content updates are available and enables the user to select whether to review, instantiate, or ignore the content updates. The public mode synchronization process 700 completes and ends at a stop module 718.

Figure 8:
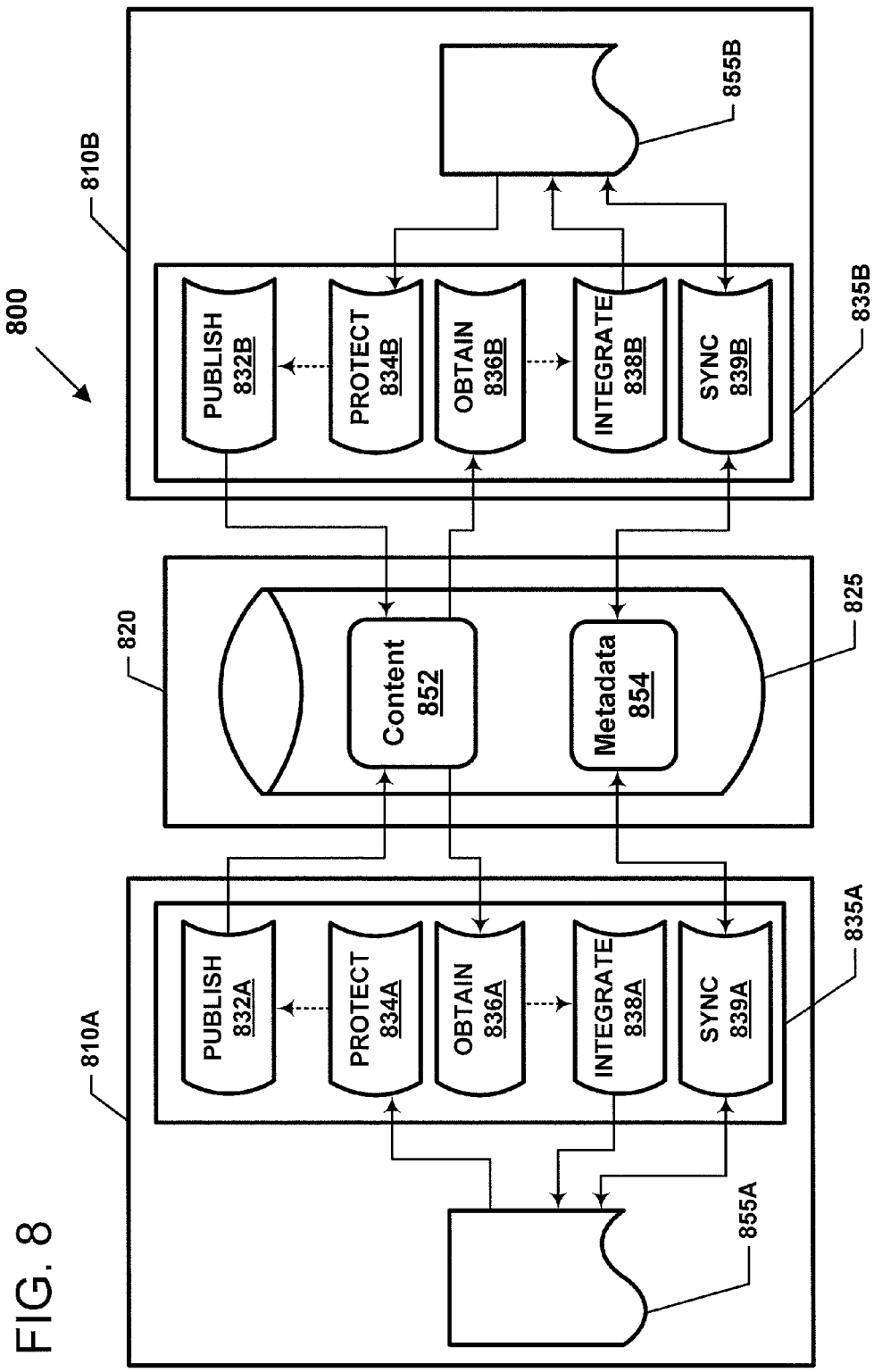
FIG. 8 is a schematic block diagram of an authoring system in which authoring applications are configured into private modes of operation in accordance with the principles of the present disclosure.

FIG. 8 is a schematic block diagram of an authoring system 800 configured to implement a private mode synchronization cycle. The authoring system 800 generally includes a storage device 820 and one or more user devices 810. Content 852 and metadata 854 of a document to be authored are stored within memory 825 on the storage device 820. In the example shown in FIG. 8, a first user device 810A and a second user device 810B are concurrently accessing the content 852 and metadata 854 stored on the storage device 820. The user computing devices 810A, 810B each include a local cache 835A, 835B and a user copy 855A, 855B of the document to be authored.

The local cache 835 of each user computing device 810 is configured to store a publish module 832, a protect module 834, an obtain module 836, an integrate module 838, and a metadata sync module 839. The protect module 834 is configured to store content updates from the user copy 855 to the local cache 835 for later transmission to the storage memory 825 of the storage device 820. In one embodiment, the protect module 834 is configured to store the content updates according to the order in which the updates are generated. For example, the protect module 834 may be configured to queue the content updates generated by the user copy 855 within the local cache 835 for transmission to the storage device 820.

The publish module 832 is configured to send the content changes stored in the local cache to the storage device 820. In general, the publish module 832 shares the content changes when it receives instructions to publish the content changes. For example, the publish module 832 may send content changes to the storage device 820 if the user selects a publish option via a user interface of the authoring application. The protect module 834 does not trigger the publish module 832 automatically.

The obtain module 836 may be configured to obtain (e.g., pull, receive, etc.) content updates from the storage memory 825 of the storage device 820. In one embodiment, the obtain module 836 is configured to queue the content updates obtained from the storage memory 825 within the local cache 835 for later instantiation into the user copy 855 of the document to be authored. The integrate module 838 is configured to facilitate instantiation of the content changes into the user copy 855 of the document. For example, the integrate module 838 may be configured to indicate to the user that new content updates are available for instantiation. In another embodiment, the integrate module 838 may be configured to instantiate the content updates automatically into the user copy 855 of the document to be authored.

The metadata sync module 839 synchronizes metadata updates between the user copy 855 of the document to be authored and the master copy stored on the storage device 820. In one embodiment, the metadata sync module 839 is the same as the metadata sync module 639 described above with reference to FIG. 6. In other embodiments, however, the metadata sync module 839 may be otherwise configured to synchronize metadata between the user device 810 and the storage device 820.

Figure 9:
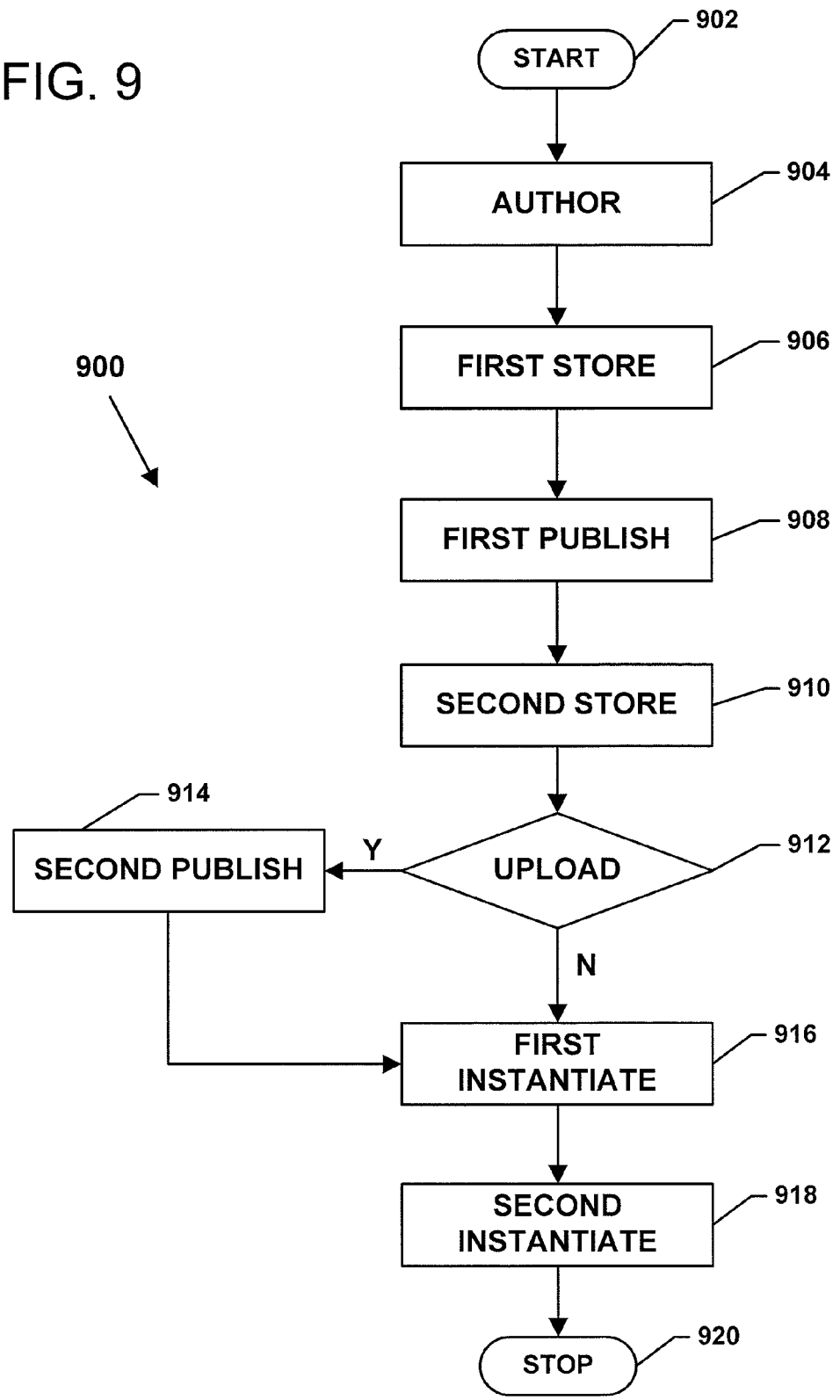
FIG. 9 is a flowchart illustrating an operational flow for an example private mode synchronization process by which an authoring application may synchronize a user copy of a document with a master copy of the document when the authoring application is configured into a private operating mode in accordance with the principles of the disclosure.

FIG. 9 is a flowchart illustrating an example operational flow for a private mode synchronization process 900 by which an authoring application can synchronize a document being edited by the authoring application with a master copy of the document. The private mode synchronization process 900 initializes and begins at a start module 902 and proceeds to an author operation 904, which edits the document to be authored according to user instructions. For example, the author operation 904 can be the same as the authoring application 704 described above with reference to FIG. 7.

A first store operation 906 periodically saves to the local cache any metadata updates generated when the authoring operation 904 is implemented. In one embodiment, the first store operation 906 is the same as the first store operation 706 of the public mode synchronization process 700 described above with respect to FIG. 7. In other embodiments, however, different processes may be used to store metadata updates. A first publish operation 908 periodically sends the metadata updates from the local cache to a storage device. In one embodiment, the first publish operation 908 is the same as the first publish operation 708 of the public mode synchronization process 700 described above with respect to FIG. 7. In other embodiments, however, different processes may be used to share metadata updates.

A second store operation 910 periodically saves to the local cache of a user device any content updates generated when the authoring operation 904 is implemented on the user device. In general, the second store operation 910 occurs when the user performs a data protection action (e.g., choosing to save the document). In one embodiment, the second store operation 910 is the same as the second store operation 710 of the public mode synchronization process 700 described above with respect to FIG. 7. In other embodiments, however, different processes may be used to store content updates.

A determination module 912 determines whether to upload the content updates to the storage device. In one embodiment, the determination module 912 determines whether the user has provided any instructions to share the content changes. For example, the determination module 912 may determine whether the user has selected a "Publish" button on a user interface of the authoring application. If the determination module 912 determines the user has provided instructions to share the content changes, a second publish operation 914 sends the content changes to the storage device. If the determination module 912 determines the user has provided instructions to share content, however, then the private sync process 900 skips the second publish operation 914 and proceeds to a first instantiate operation 916.

The first instantiate operation 916 periodically obtains metadata updates from a storage device and automatically instantiates the metadata updates into the document being authored by the authoring application. For example, the first instantiate operation 916 may be the same as the first instantiate operation 714 of the public mode synchronization process 700 described above with respect to FIG. 7. In other embodiments, however, other processes may be utilized to obtain metadata from the storage device.

A second instantiate operation 918 obtains content updates from the storage device periodically and makes the content updates available to the user for viewing and/or instantiation. For example, the second instantiate operation 918 may be the same as the second instantiate operation 716 of the public mode synchronization process 700 described above with respect to FIG. 7. In other embodiments, however, other processes may be utilized to obtain content from the storage device. The private mode synchronization process 900 completes and ends at a stop module 920.

Figure 10:
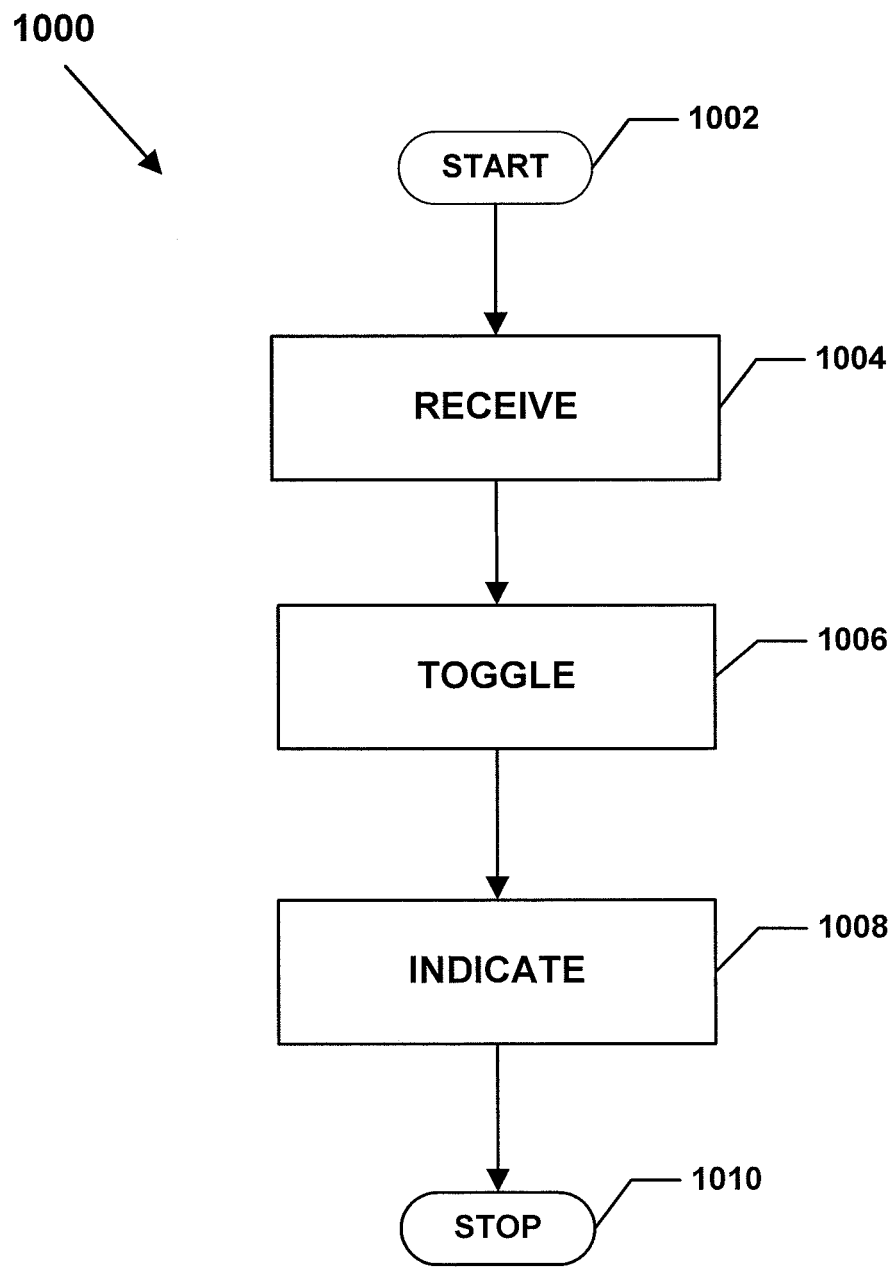
FIG. 10 is a flowchart illustrating an operational flow for an exemplary toggle process by which an authoring application may be configured into a different operating mode in accordance with the principles of the present disclosure.

FIG. 10 is a flowchart illustrating an operational flow for a toggle process 1000 by which an authoring application may be selectively configured into a public mode of operation or a private mode of operation. The toggle process 1000 initializes and begins at a start module 1002 and proceeds to a receive operation 1004. The receive operation 1004 obtains a selection of a particular modes of operation. In one embodiment, the receive operation 1004 may ascertain a mode selection via a user interface tool. For example, the receive operation 1004 may determine the user has clicked on a toggle button of a user interface of the authoring application user interface.

A toggle operation 1006 configures the authoring application into the selected operation mode. For example, the toggle operation 1006 may configure an authoring application that is currently configured in a private operating mode into a public operation mode. In such embodiments, stored content changes may be shared automatically with the master copy of the document. In other embodiment, the toggle operation 1006 may configure an authoring application that is currently configured in a private operating mode into a public operation mode. In such embodiments, the authoring application begins withholding content changes from the master copy. In one embodiment, the authoring application begins storing the content changes in a local cache memory.

An indicate operation 1008 configures the user interface of the authoring application to indicate to the user the selected operation mode. For example, if the user chose to have the authoring application run in public mode, then the indicate operation 1008 may indicate to the user that content changes are being shared with other users. If the user chose to have the authoring application run in private mode, then the indicate operation 1008 may indicate to the user that content changes are not being shared with other users. The toggle process 1000 completes and ends at a stop module 1010.

Referring to FIGS. 11-19, the principles of the present disclosure can be better understood by walking through an example application. FIGS. 11-19 represent changes made during a collaborative authoring session to a master copy of a document stored on a storage device 1120, a first user copy of the document being edited by a first authoring application 1130A, and a second user copy being edited by a second authoring application 1130B. Content and metadata updates stored in respective local caches 1135A, 1135B of the user computing devices also are shown. In one embodiment, the first authoring application 1130A and the second authoring application 1130B edit the document concurrently. In other embodiments, however, the first and second authoring applications 1130A, 1130B can edit (i.e., access) the document at different times using the same processes.

Figure 11:
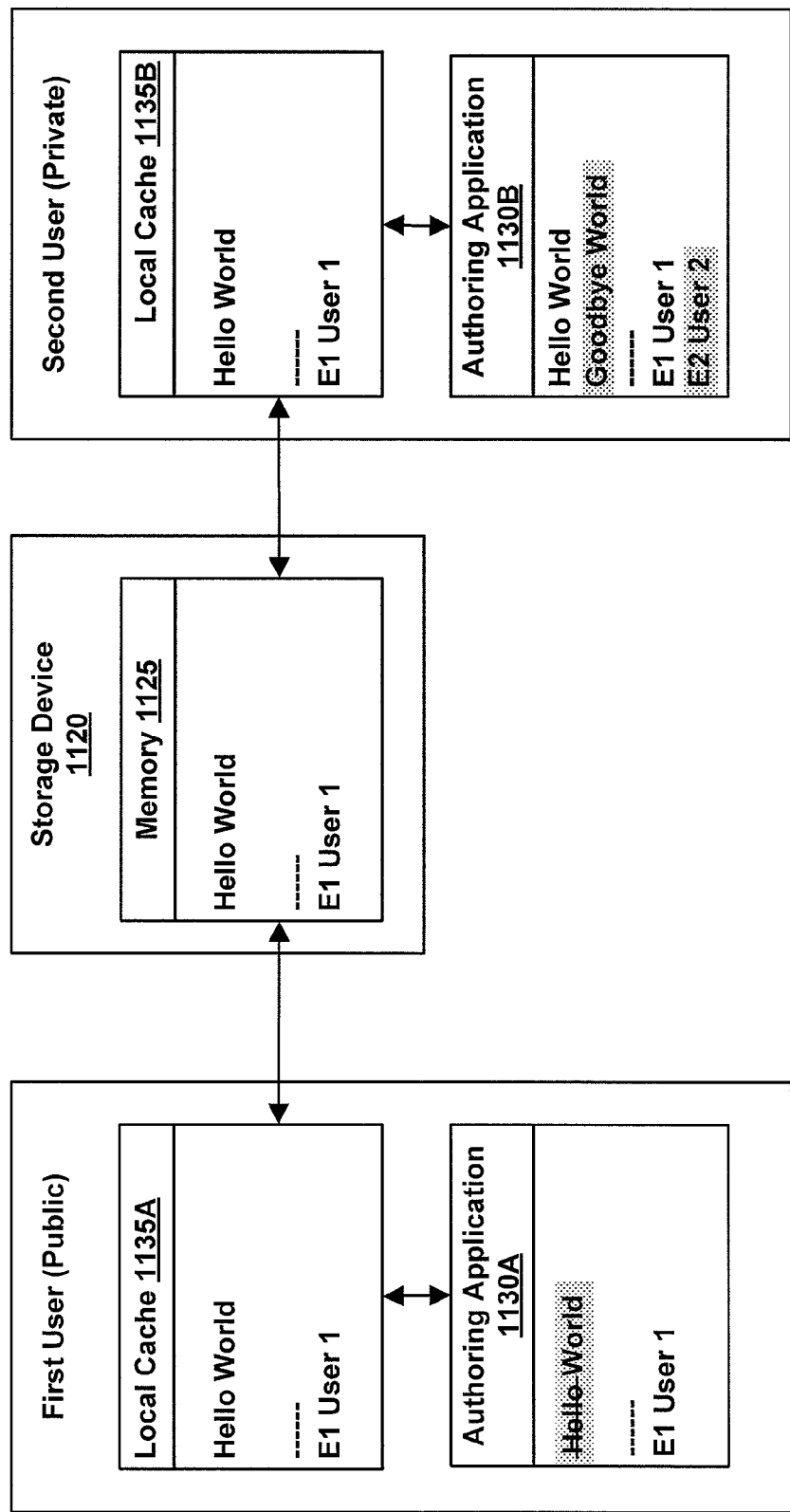
FIGS. 11-19 are schematic block diagrams of the caches stored on a storage device, a first user computing device, and a second user computing device at different points in time during a collaborative authoring session in which a first user and a second user of the first and second user computing devices, respectively, edit a document concurrently in accordance with the principles of the present disclosure.

In FIG. 11, the first authoring application 1130A is configured in a public mode of operation and the second authoring application 1130B is configured in a private mode of operation. In other embodiments, however, each authoring application 1130 can be configured into any desired mode of operation. Because the first authoring application 1130A is operating in public mode, the first authoring application 1130A generally follows the public mode synchronization process 700 described above with respect to FIG. 7. Because the second authoring application 1130B is operating in private mode, the second authoring application 1130B generally follows the private mode synchronization process 900 described above with respect to FIG. 9.

The master copy of the document has a corresponding master lock table. For the sake of convenience, in the example shown in FIGS. 11-19, the master lock table is displayed as part of the master copy of the document. In other embodiments, however, the master lock table can be stored separately from the master copy of the document. Similarly, for ease in understanding, locks associated with each user copy of the document are shown in FIGS. 11-19 as part of the user copy. In other embodiments, however, metadata may be separately stored from each user copy.

In the example shown, the content of the master copy includes a first data unit containing the text "Hello World" and the metadata of the master copy includes a first lock E1 around the first data unit. The first lock E1 is assigned to a first user of the first authoring application 1130A. Accordingly, the first authoring application 1130A may edit the first data unit. Other authoring applications, such as the second authoring application 1130B, are inhibited from editing the first data unit. The content and metadata of the master copy are reflected in the local caches 1135A, 1135B of the user devices.

In FIG. 11, the first authoring application 1130A and the second authoring application 1130B each access and begin editing the master copy of the document. The first authoring application 1130A edits the first user copy of the document to delete the word "Hello" as indicated by the strikethrough annotation (see authoring operation 704 of FIG. 7). The second authoring application 1130B edits the second user copy of the document to add a second data unit containing the text "Goodbye World" (see authoring operation 904 of FIG. 9). A second lock E2, assigned to the second user, is generated around the second data unit.

Figure 12:
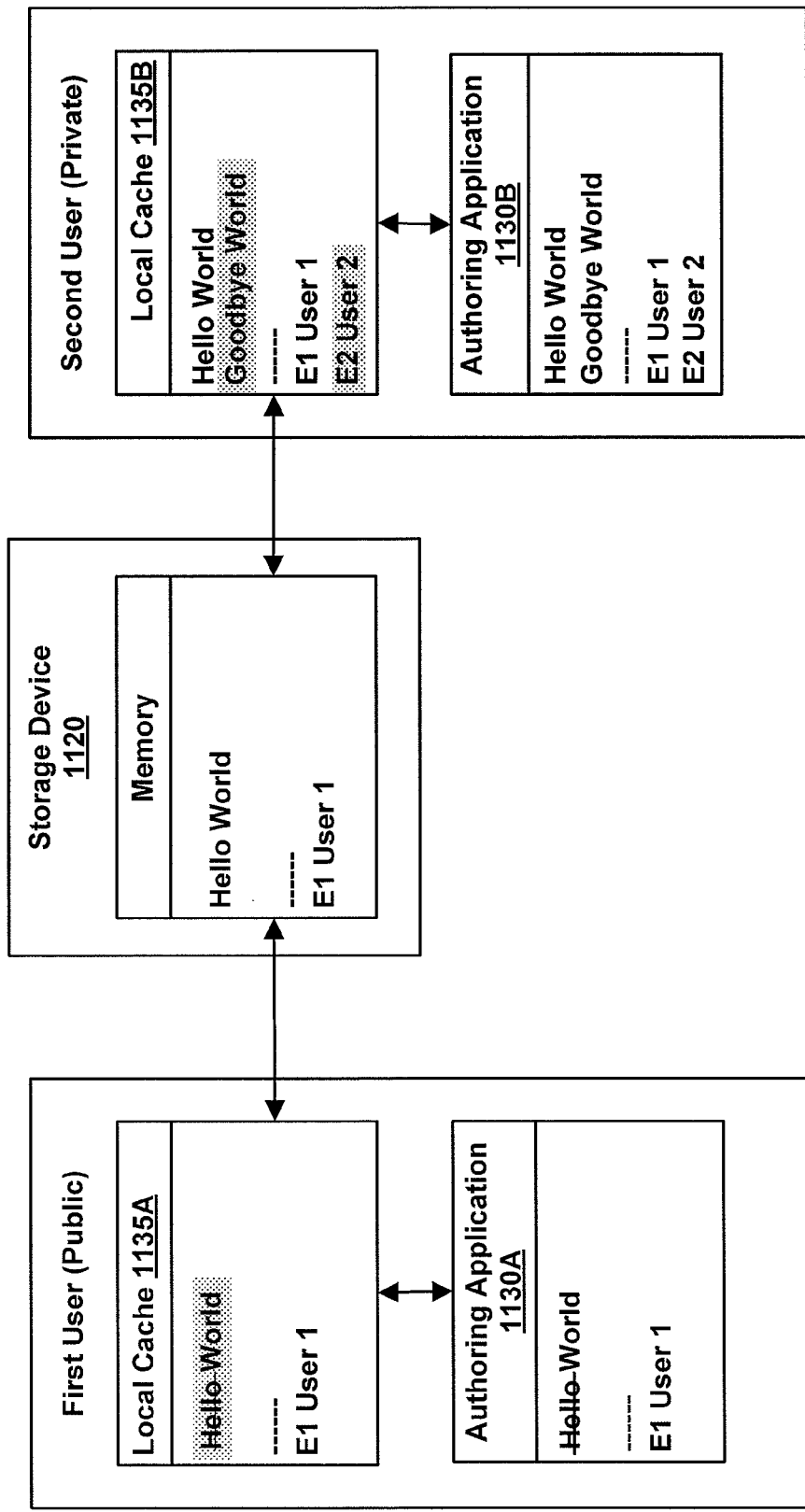

FIG. 12 illustrates the effects of the first store operations 706, 906 of the public mode sync process 700 and the private mode sync process 900, respectively. Each of the authoring applications 1130A, 1130B saves any metadata changes generated in the respective user copy of the document to the respective local cache 1135A, 1135B for transmission to the storage device 1120. In the example shown, the first authoring application 1130A has not added any new locks or released the first lock E1. Accordingly, no changes to the metadata are stored to the local cache 1135A in FIG. 12. The second authoring application 1130B, however, has added the second lock E2 around a new data unit. Accordingly, the second lock E2 is stored in a metadata table of the local cache 1135B.

Figure 13:
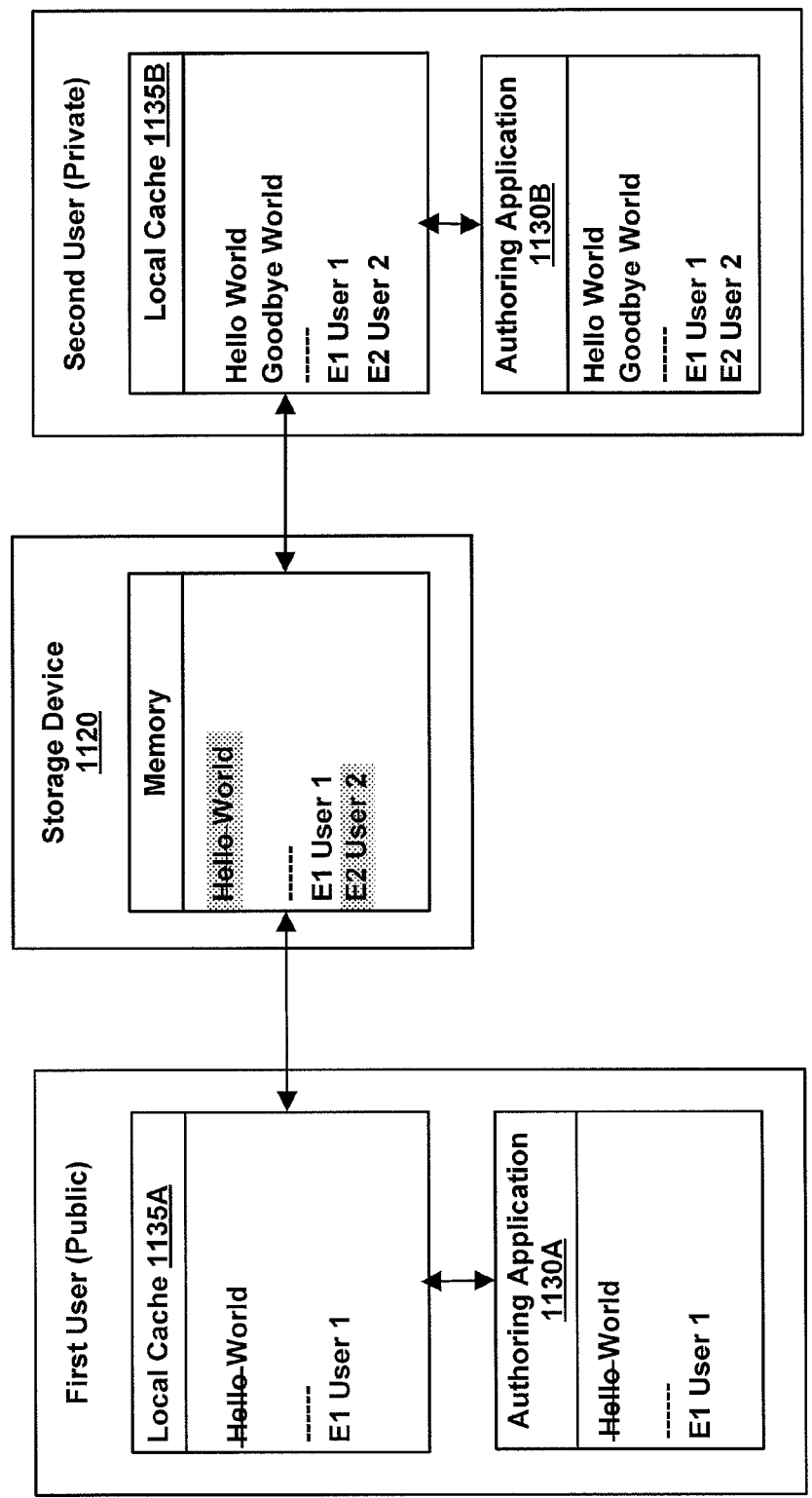

FIG. 13 illustrates the effects of the first publish operations 708, 908 of the public mode sync process 700 and the private mode sync process 900, respectively. The respective local caches 1135A, 1135B each transmit the stored metadata to the storage device 1120. In the example shown, the second local cache 1135B sends the new lock E2 to the storage device 1120. The first local cache 1135A, however, does not have any metadata changes to send to the storage device 1120.

In accordance with the second store operation 710 of the public mode sync process 700, the first authoring application 1130A saves any content changes to the local cache 1135A for transmission to the storage device 1120 when instructions to store the content are provided (i.e., explicitly or implicitly) by the user. In accordance with the second publish operation 712 of the public mode sync process 700, the instructions to store the content trigger the local cache 1135A to publish the content updates to the storage device 1120. In the example shown, the removal of the word "Hello" from the first data unit is stored to the local cache 1135A in FIG. 12 and transmitted to the storage device 1120 in FIG. 13.

In contrast, in accordance with the second store operation 910 of the private mode sync process 900, the second authoring application 1130B saves any content changes to the local cache 1135B. In the example shown in FIG. 12, the addition of the second data unit ("Goodbye World") is reflected in the local cache 1135B. In accordance with the determination module 912 of the private mode sync process 900, however, the local cache 1135B will only send the updated content to the storage device 1120 when a publication instruction is provided by the user. In the example shown in FIG. 13, publication instructions are not provided and the second data unit is not transmitted to the storage device 1120.

Figure 14:
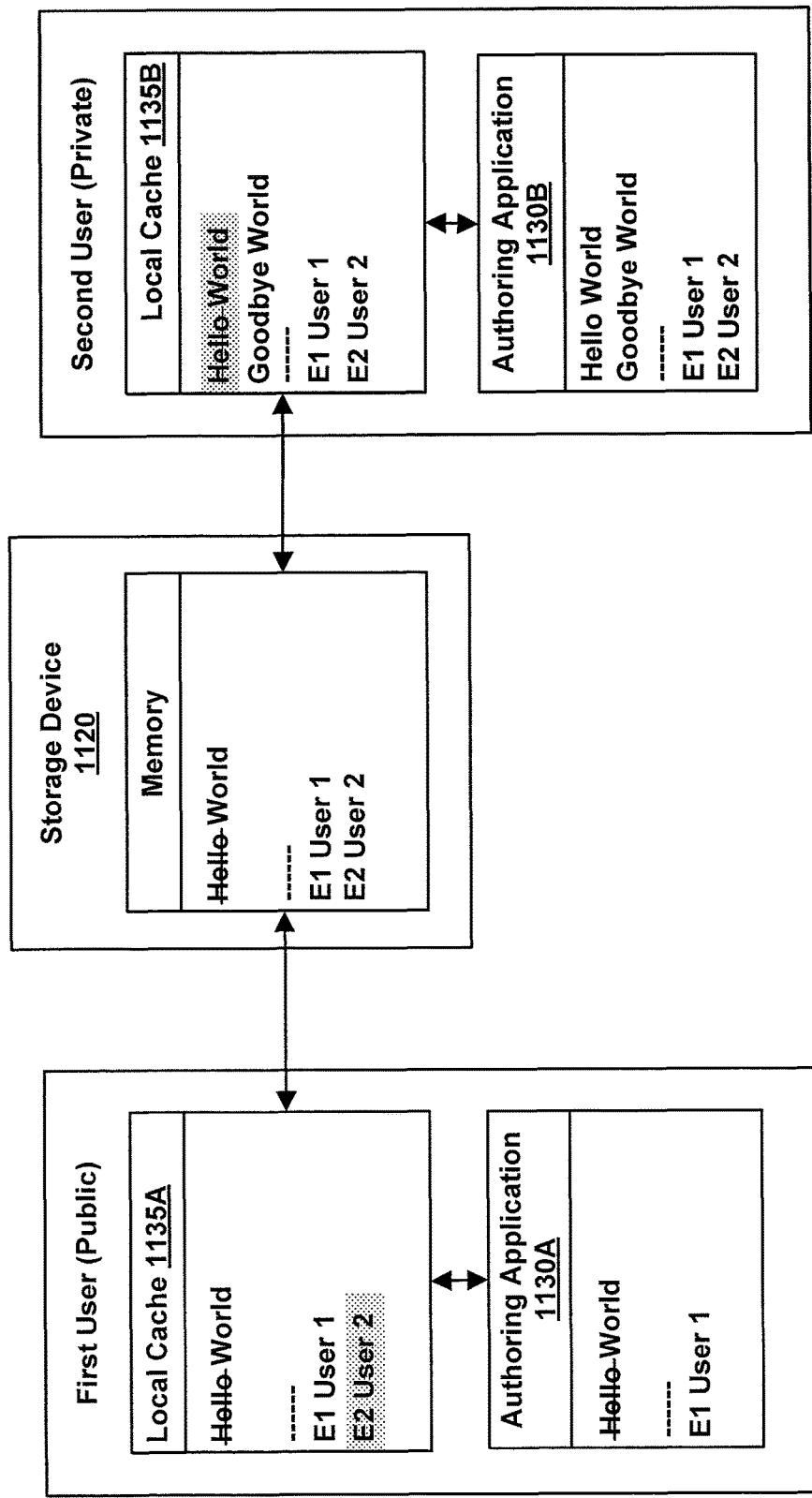
Figure 15:
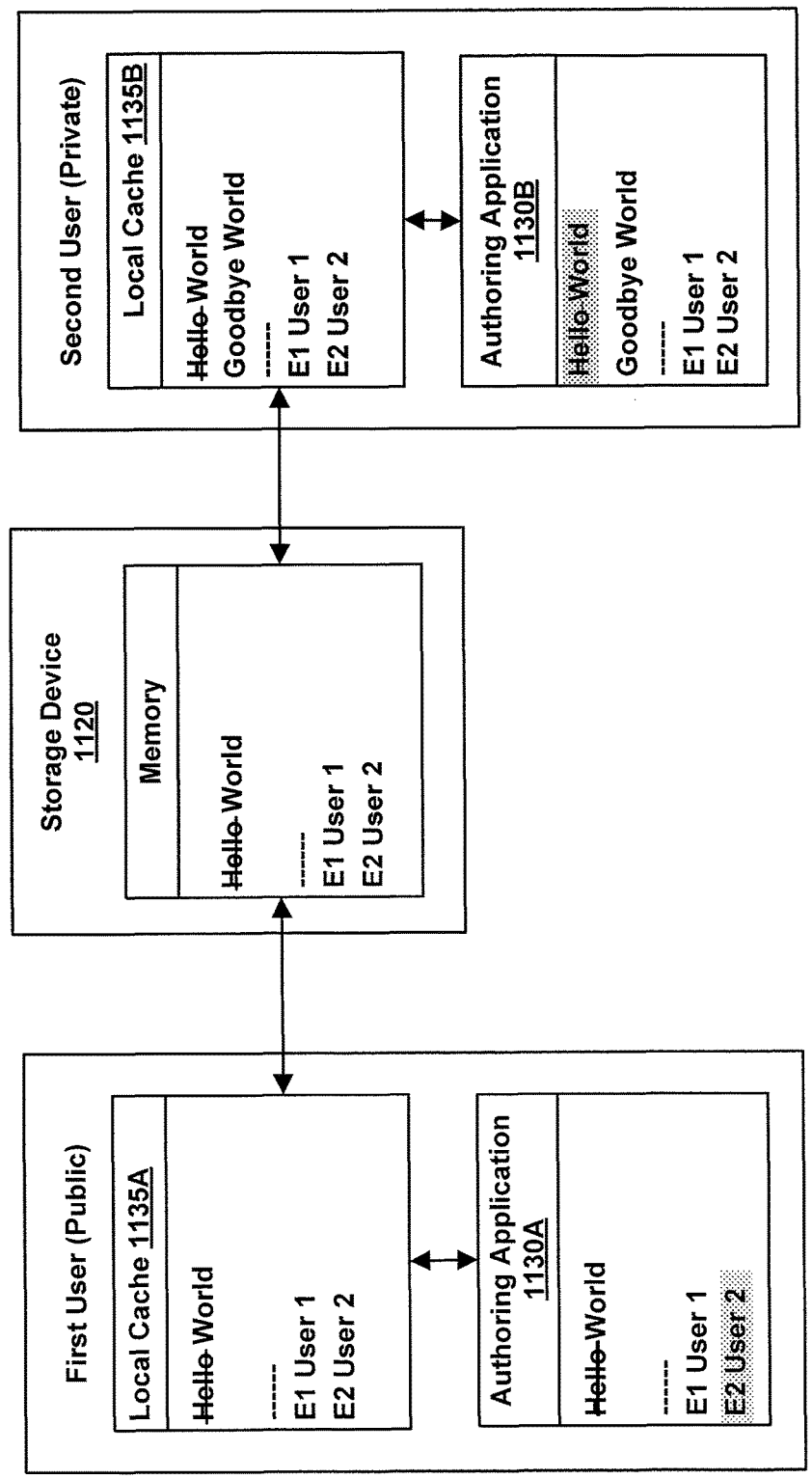

FIGS. 14 and 15 illustrate the effects of the first instantiate operations 714, 916 of the public mode sync process 700 and the private mode sync process 900, respectively. Each authoring application 1130A, 1130B obtains metadata updates from the storage device 1120 and automatically instantiates the metadata updates into the respective user copy of the document. In the example shown, the second lock E2 is pulled from the master copy of the document on the storage device 1120 and saved in the first local cache 1135A of the first user device as shown in FIG. 14. The first authoring application 1130A automatically instantiates the second lock E2 into the first user copy of the document in FIG. 15. Since the first authoring application 1130A did not make any changes to the metadata of the first user copy, however, no changes are made to the metadata associated with the second user copy and the second local cache 1135B as the metadata already reflects the metadata associated with the master copy of the document.

In addition, the effects of the second instantiate operations 716, 918 of the public mode sync process 700 and the private mode sync process 900, respectively, are shown in FIGS. 14 and 15. Each authoring application 1130A, 1130B obtains content updates from the storage device 1120 and makes the content updates available to the user for viewing and/or instantiation. In the example shown, the second local cache 1135B did not forward any content changes to the storage device 1120. Accordingly, the first local cache 1135A and the first authoring application 1130A do not obtain any content updates from the storage device 1120 in FIGS. 14 and 15.

Since the first authoring application 1130A has shared content changes, however, the second local cache 1135B obtains from the storage device 1120 the content update deleting the word "Hello" from the first data unit (see FIG. 14). The second authoring application 1130B instantiates the content update from the local cache 1135B into the user copy of the document in FIG. 15. In one embodiment, the user interface of the second authoring application 1130B automatically instantiates the content update into the second user copy of the document (see FIG. 15). In another embodiment, however, the second authoring application 1130B indicates to the second user that a content update is available. In such an embodiment, the second authoring application 1130B instantiates the content update when the second user provides instructions to instantiate.

Figure 16:
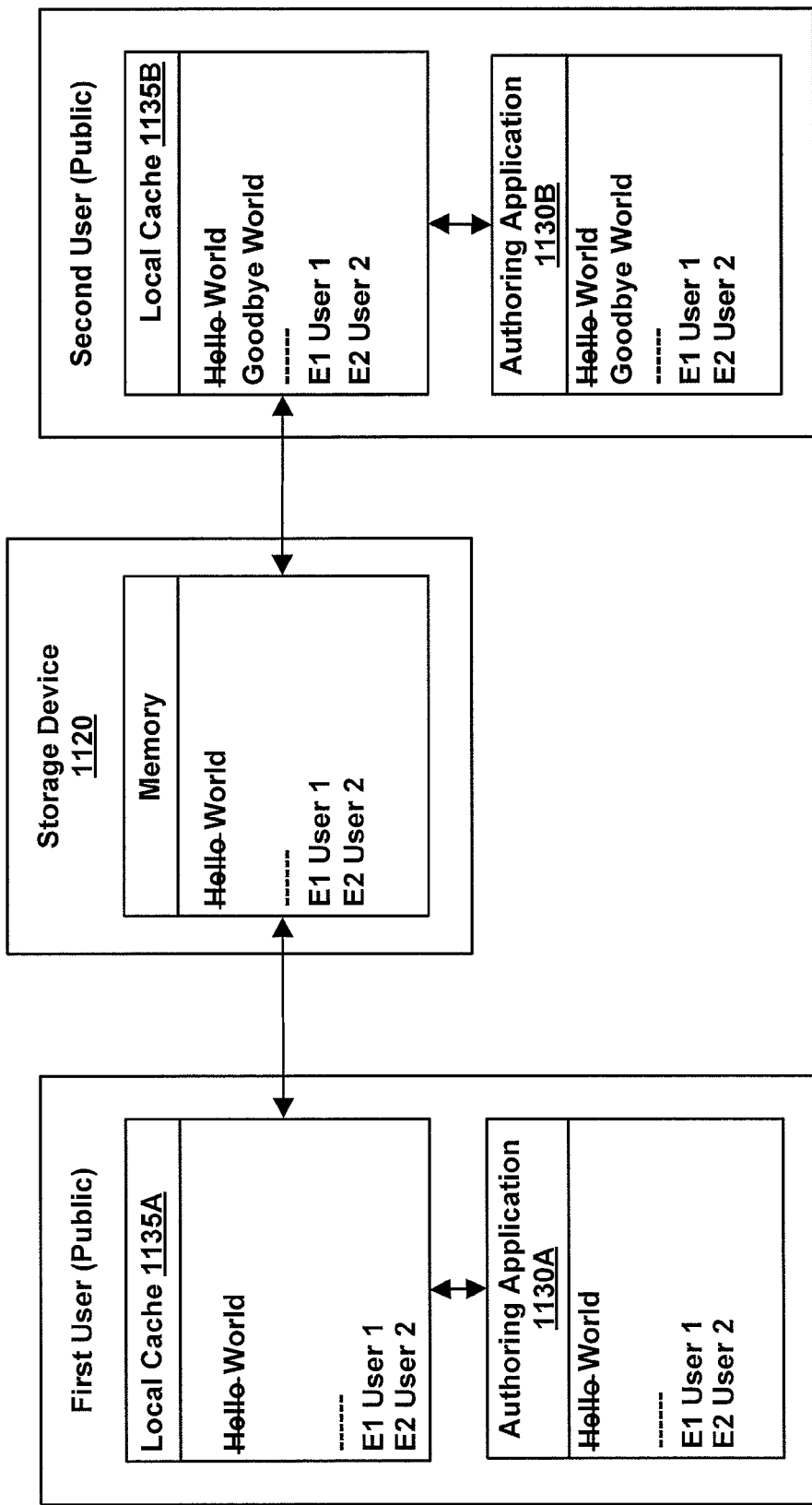
Figure 17:
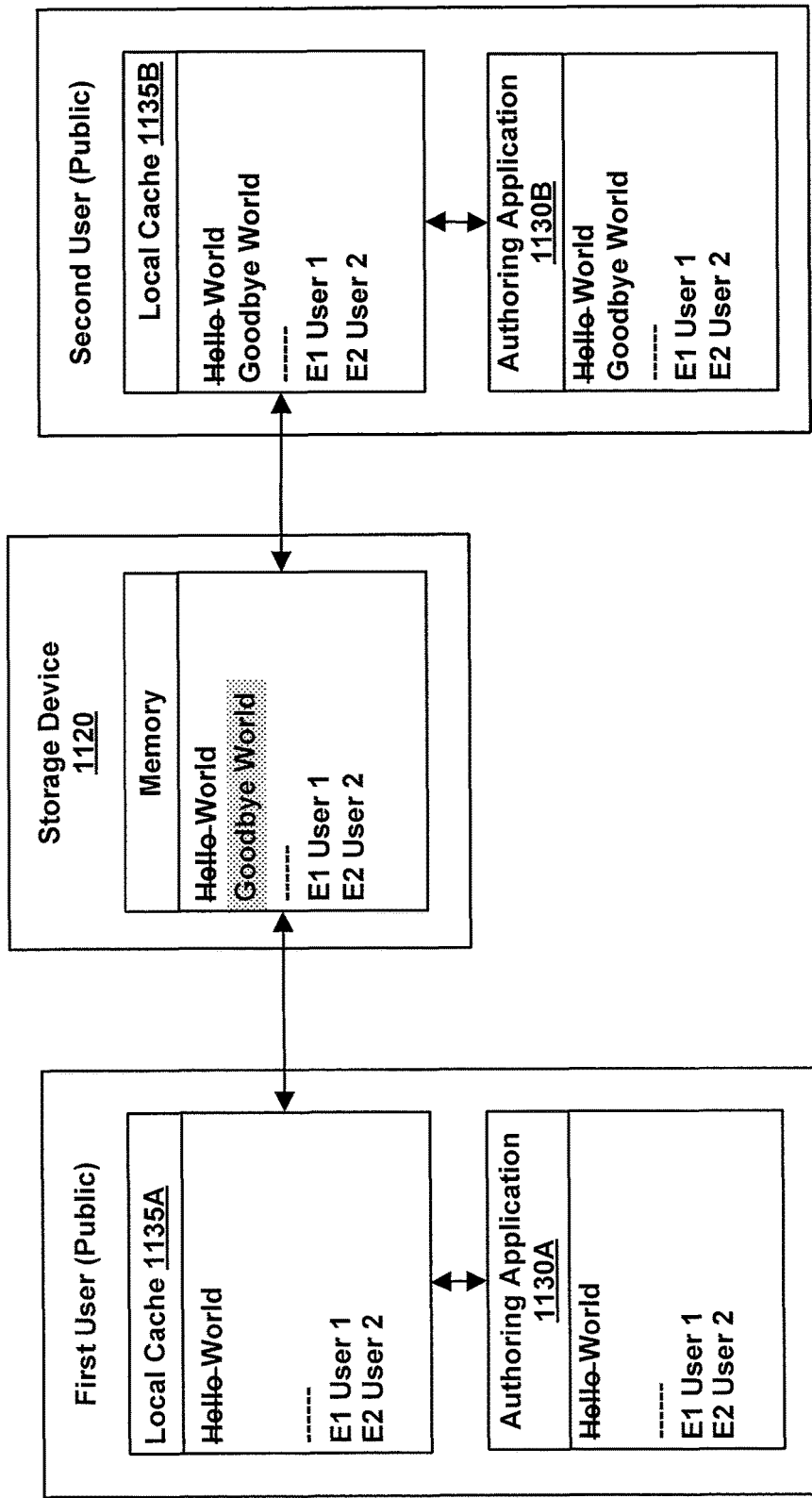
Figure 18:
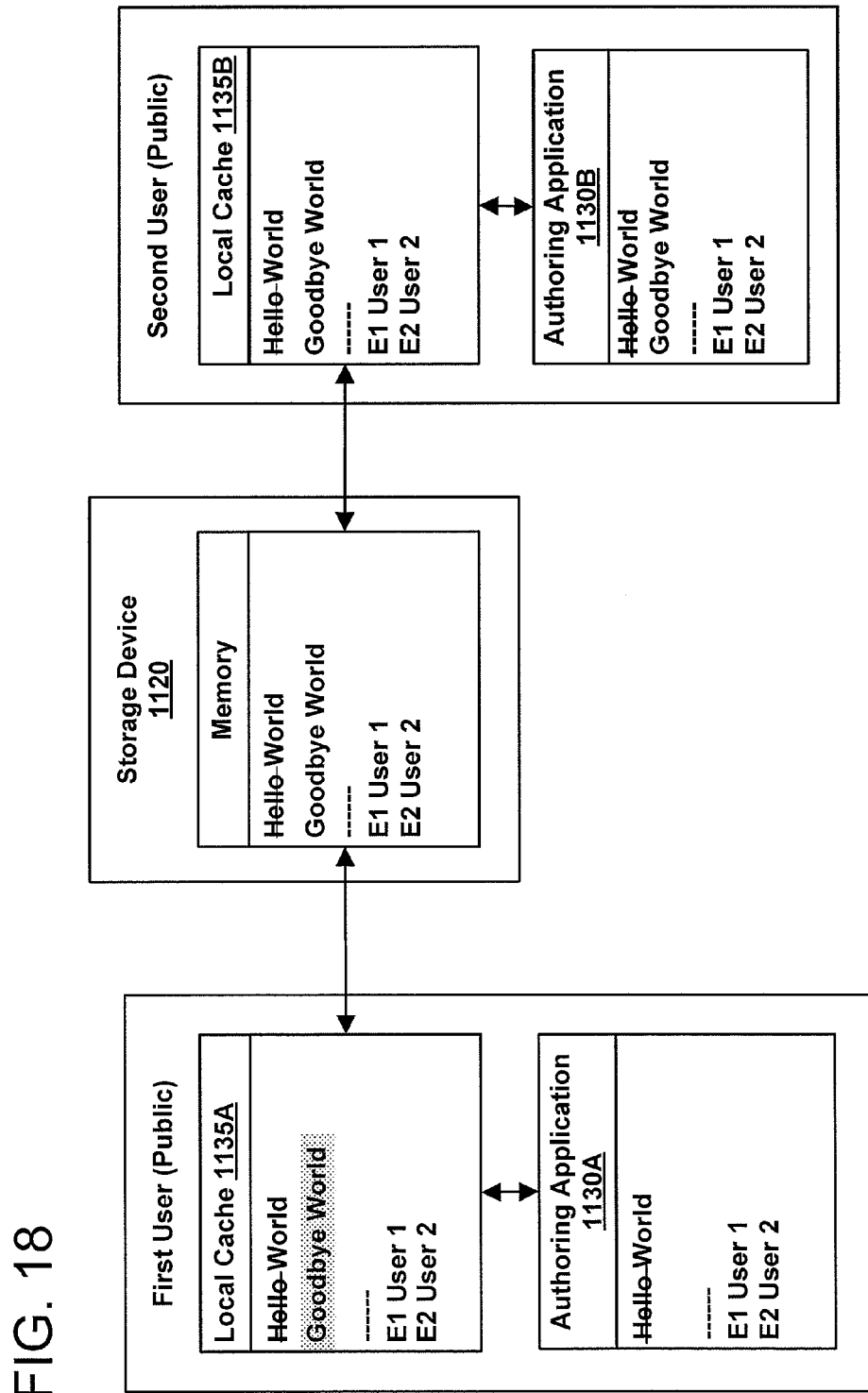
Figure 19:
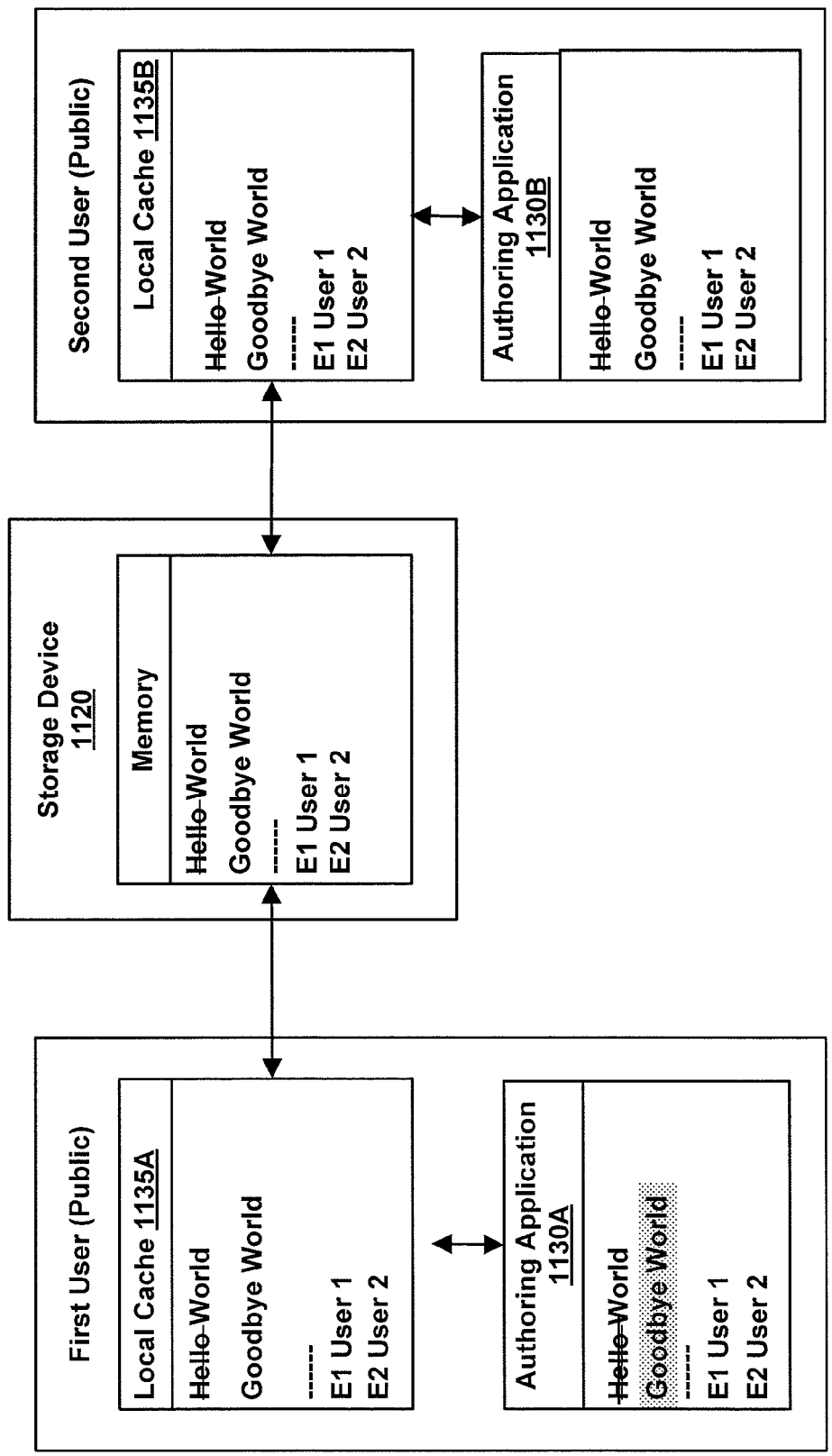

In FIG. 16, the second user toggles the second authoring application 1130B into a public mode configuration. In one embodiment, the second user selects a button on the user interface of the second authoring application 1130B to toggle the operating mode of second authoring device 1130B. In other embodiments, however, the second user may otherwise prompt the second authoring application 1130B to toggle into a public mode of operation. After toggling operating modes, the second authoring application 1130B may begin following the public mode sync process 700 described above with respect to FIG. 7. For example, the second authoring application 1130B may begin sharing content updates as well as metadata updates. In one embodiment, previously stored content updates also are shared.

In some embodiments, toggling an authoring application from a private operating mode to a public operating mode does not cause previously stored content to be shared automatically with the storage device. Rather, toggling the mode of the authoring application 1130 changes the behavior of the local cache 1135 going forward. For example, when the user chooses to "save" the document while the authoring application 1130 is configured into the public mode, the content changes will be sent to the storage device 1120 automatically. In one embodiment, any previously stored changes also will be sent with the new content changes. In other embodiments, however, previously stored changes may be sent to the storage device 1120 automatically when the authoring application 1130 is toggled into a public operating mode without requiring additional user interaction.

In the example shown in FIG. 16, the second authoring application 1130B has been toggled into a public mode. The user has not yet chosen to store content changes after toggling the authoring application 1130B. Accordingly, the second data unit has not been sent yet to the storage device 1120. In the example shown in FIG. 17, the second local cache 1135B receives a storage instruction from the user and transmits the second data containing the text ("Goodbye World") to the storage device 1120 in accordance with the second publish operation 712 of the public mode sync process 700 of FIG. 7. The first local cache 1135A obtains the content update from the storage device 1120 in FIG. 18 and the authoring application 1130A instantiates the content update in the first user copy of the document in FIG. 19.

Figure 20:
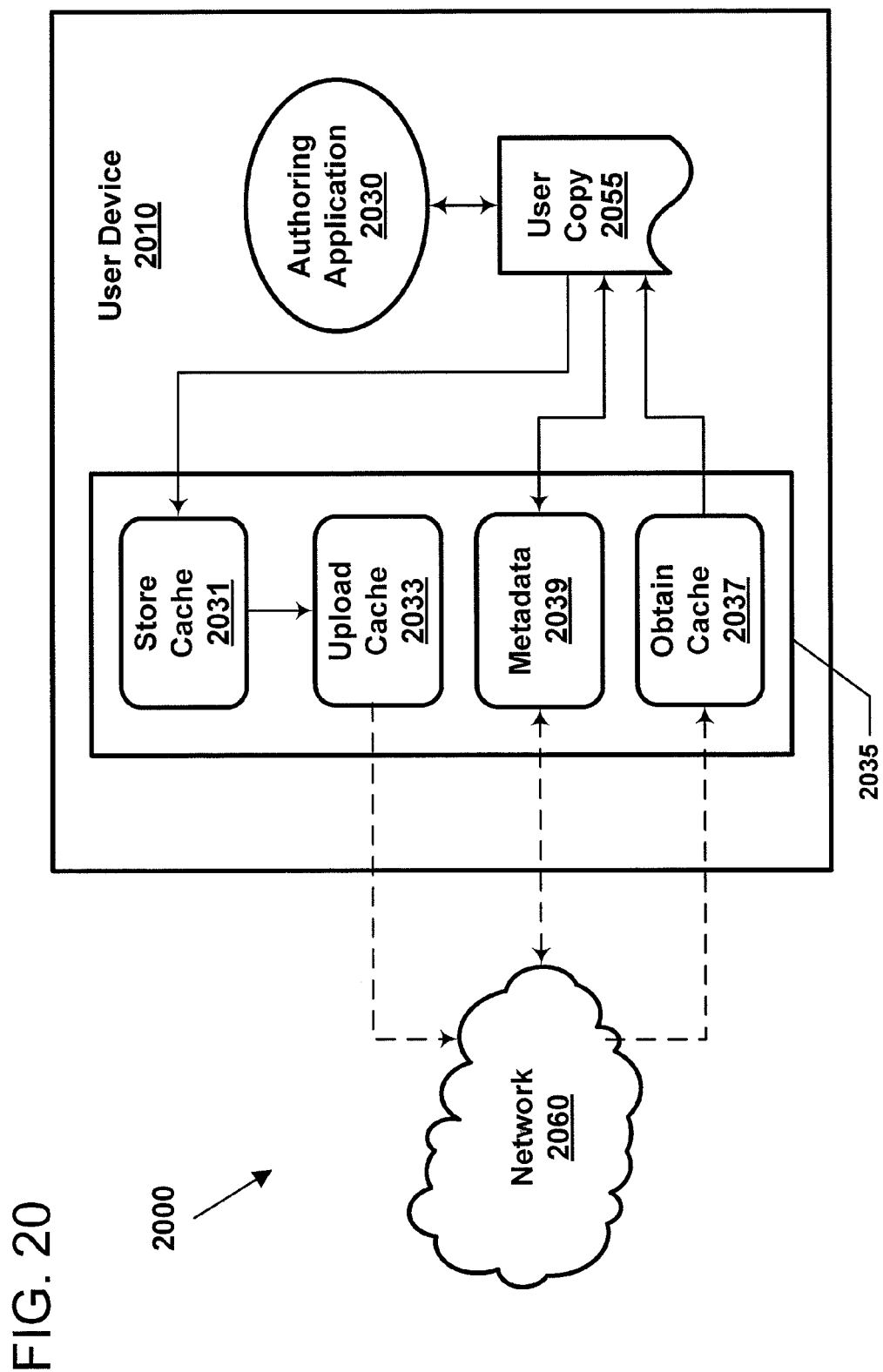
FIG. 20 is a schematic block diagram of an authoring system illustrating a user computing device having features that are examples of inventive aspects in accordance with the principles of the present disclosure.
Figure 21:
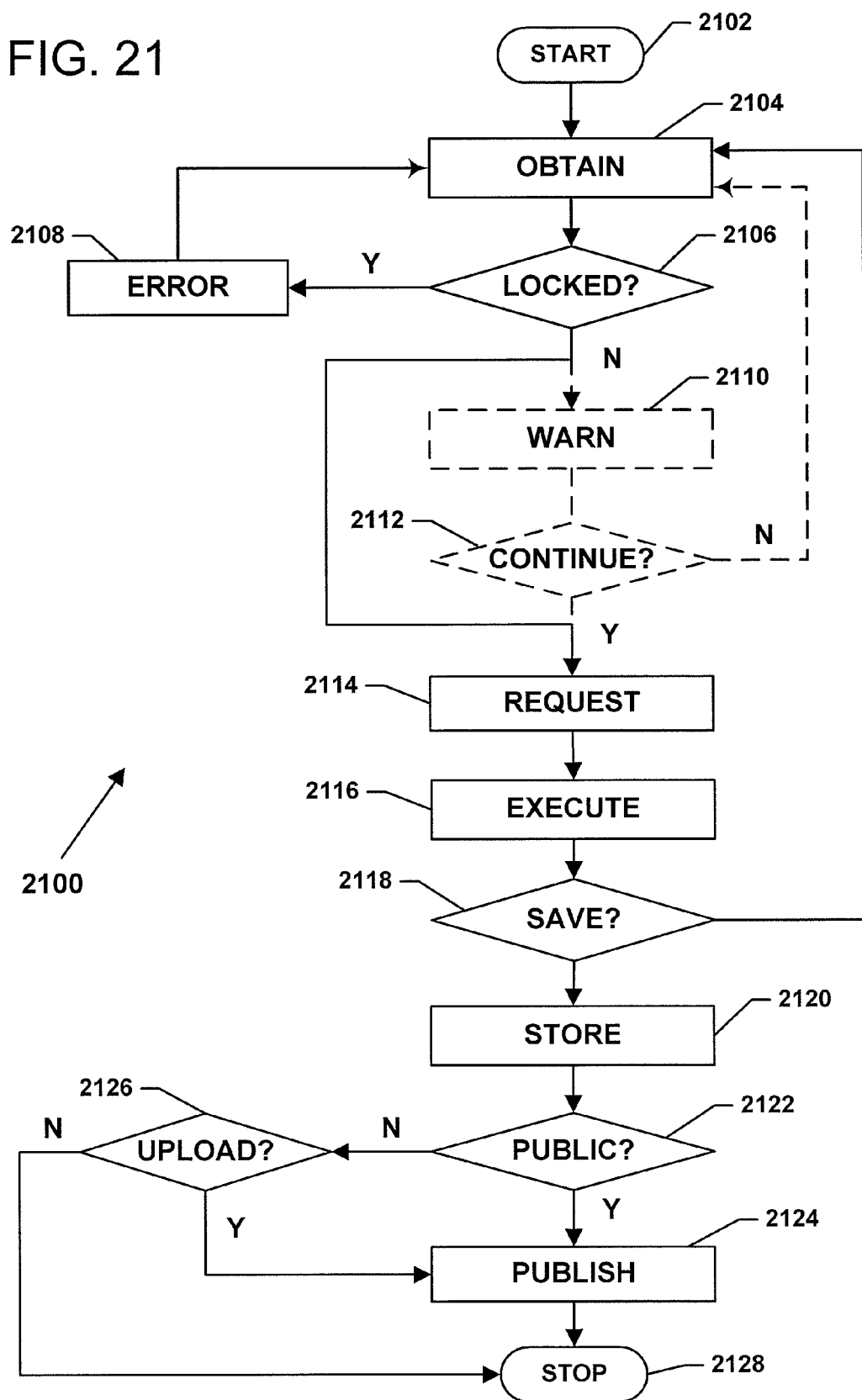
FIG. 21 is a flowchart illustrating an operational flow for an exemplary authoring process by which a user computing device can synchronize a user copy of a document with a master copy of the document in accordance with the principles of the present disclosure.
Figure 22:
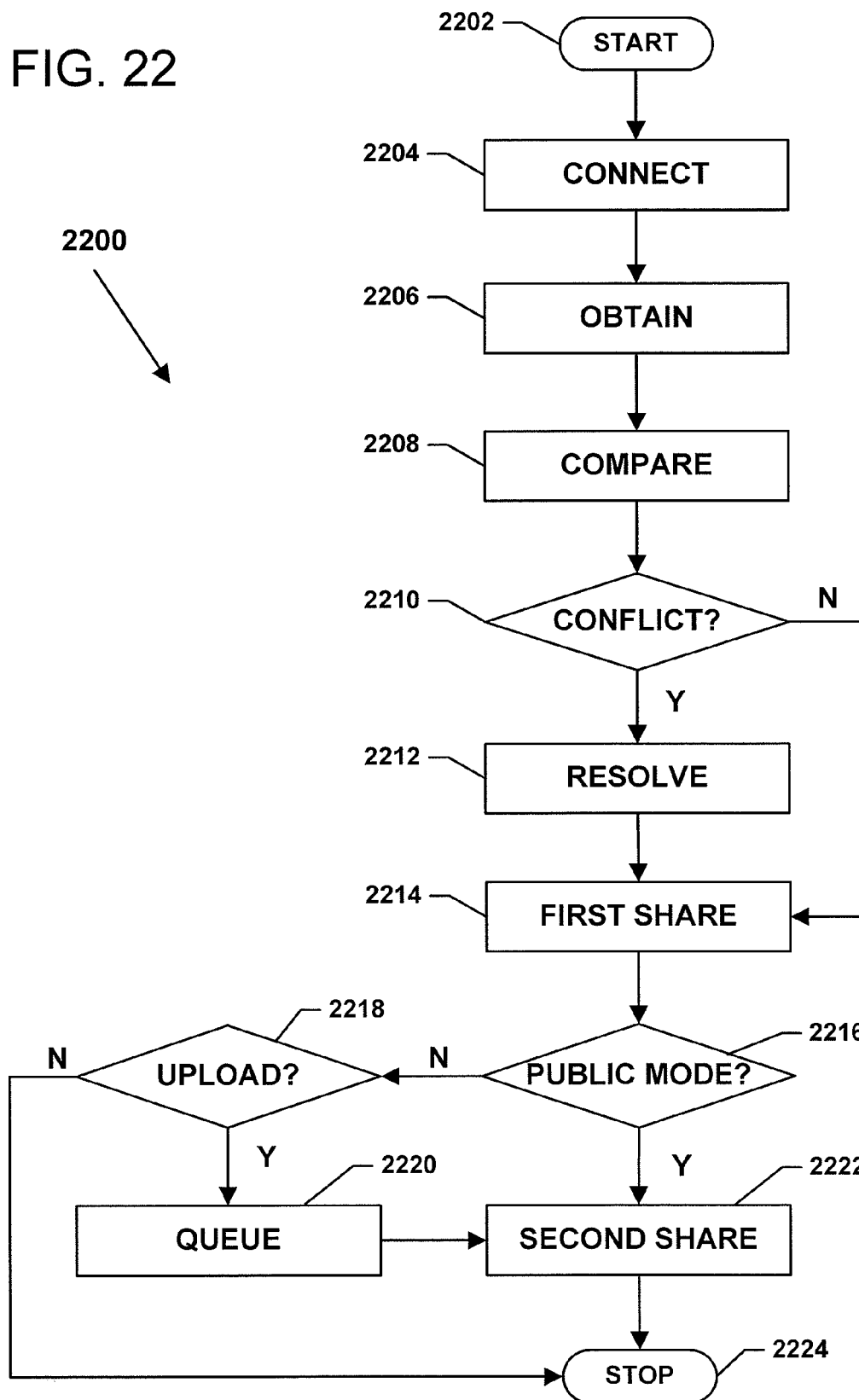
FIG. 22 is a flowchart illustrating an operational flow for an exemplary transitioning process by which a user computing device can synchronize a user copy of a document with a master copy of the document after editing the user copy offline in accordance with the principles of the present disclosure.

Referring now to FIGS. 20-22, an authoring system 2000 having features that are examples of inventive aspects in accordance with the principles of the present disclosure may enable users to author user copies of documents even when the authoring application is disconnected from any storage device storing a master copy of the document. The authoring system 2000 includes a user device 2010 executing an authoring application 2030 to author a user copy 2055 of a document. In the example shown, the user device 2010 is offline (e.g., disconnected from a network 2060). Accordingly, the user device 2010 does not share either content or metadata changes generated when authoring the user copy 2055 of the document until connected to the network 2060.

The user device 2010 also includes a local cache 2035 in which metadata 2039 pertaining to the user copy 2055 of the document is stored. In one embodiment, the metadata 2039 may be updated periodically to reflect changes made to the local copy 2055 of the document. In another embodiment, the metadata 2039 is updated at the end of each authoring session. The local cache 2035 also includes a store cache 2031, an upload cache 2033, and an obtain cache 2037.

The authoring application 2030 periodically saves content changes into the store cache 2031. In some embodiments, content updates are stored in the store cache 2031 at intervals throughout the authoring process (e.g., via an automatic save feature). In other embodiments, the authoring application 2030 may store the content changes when the user provides instructions to save the document. In one embodiment, the store cache 2031 stores multiple content updates according to an order in which the updates were generated. In another embodiment, however, content updates are stored in the store cache 2031 at the end of an authoring session. For example, a comparison may be made between the user copy 2055 of the document and an initial copy (not shown) of the document and the differences may be stored in the store cache 2031.

The local cache 2035 sends any content changes stored within the upload cache 2033 to a storage device (not shown) via the network 2060 when the user device 2010 is connected to the network 2060. For example, the local cache 2035 may share content updates stored in the upload cache 2033 as soon as the user device 2010 is connected to the network 2060. In one embodiment, the local cache 2035 may share the content updates stored in the upload cache 2033 even if the authoring application ceased executing before the user device 2010 was connected to the network 2060.

In general, the operating mode into which the authoring application 2030 is configured determines when content updates are arranged in the upload cache 2033. If the authoring application 2030 is configured into a public mode of operation, then the local cache 2035 may store the content changes in the upload cache 2033 automatically for later transmission to the network 2060. In one embodiment, the local cache 2035 copies the content updates from the store cache 2031 to the upload cache 2033.

If the authoring application 2030 is configured into a private mode of operation, however, then the local cache 2035 does not automatically save the content changes into the upload cache 2033. For example, in one embodiment, the content changes may be stored in the upload cache 2033 when the authoring application 2030 is toggled into a public mode. In another embodiment, the content changes may be stored into the upload cache 2033 when the user provides instructions to share the content changes regardless of the operating mode of the authoring application 2030.

Previously obtained content updates that have not yet been instantiated into the first user copy 2055 may be stored in the obtain cache 2037. These content updates may be instantiated into the user copy 2055 at any time regardless of whether the user device 2010 is connected to the network 2060. In one embodiment, the obtain cache 2037 stores an ordered list of content updates to be integrated with the user copy 2055. Content updates may be removed from the obtain cache 2037 as they are instantiated into the user copy 2055 of the document. In some embodiments, a user may choose to "undo" instantiation of content updates from the obtain cache 2037. In one such embodiment, the content update may be added back into the obtain cache 2037 when the user undoes the instantiation.

FIG. 21 illustrates an operational flow for an authoring process 2100 by which an authoring application, such as authoring application 2030, may edit a user copy of a document, such as user copy 2055, when the authoring application 2030 is offline. The authoring process 2100 initializes and begins at a start module 2102 and proceeds to an obtain operation 2104. The obtain operation 2104 receives editing instructions to be implemented on the user copy 2055 of the document. Typically, the obtain operation 2104 receives editing instructions to be implemented on one or more data units within the user copy 2055.

A first determine module 2106 checks whether the data unit to be edited is locked. For example, the first determine module 2106 may check the metadata 2039 stored in the local cache 2035 of the first user device 2010 to determine whether an external lock (i.e., a lock associated with another user) is associated with the data unit to be edited. If the first determine module 2106 determines the data unit to be edited is locked by another user, then an error operation 2108 inhibits editing of the data unit. For example, in one embodiment, the error operation 2108 may inform the user of the authoring application 2030 that the data unit should not be edited. In another embodiment, the error operation 2108 may inform the user of the authoring application 2030 that the data unit cannot be edited. The authoring process 2100 cycles back to the obtain operation 2104 to begin again.

If the first determine module 2106 determines the data unit to be edited is not locked, however, then a request operation 2114 adds a request for a lock to the metadata 2039 stored in the local cache 2035. Because the request cannot be synchronized with a master copy of the document, however, the request operation 2114 does not actually assign a lock to the data unit. Before requesting the lock, an optional warn operation 2110 may issue a warning to the user of the authoring application 2030. For example, the warn operation 2110 may indicate to the user that the authoring application 2030 is offline and, accordingly, changes made to the user copy 2055 cannot be synchronized with a master copy of the document. The warn operation 2110 also may remind the user that conflicts may result from editing the user copy 2055 of the document when changes cannot be synchronized.

If the warn operation 2110 is implemented, then a second determine module 2112 determines whether or not the authoring application 2030 should continue implementing the editing instructions. For example, the second determine module 2112 may receive a selection from the user of the authoring application 2030 through a user interface tool presented to the user. If the second determine module 2112 determines the editing instructions should not be implemented, then the authoring process 2100 is directed back to the obtain operation 2104 to begin again.

If the second determine module 2112 determines the editing instruction should be implemented, however, then the authoring process 2100 proceeds to the request operation 2114 described above. An execute operation 2116 edits the user copy 2055 in accordance with the editing instruction. A third determine module 2118 determines whether the document should be stored in the local cache 2035. In one embodiment, the third determine module 2118 determines whether an instruction to save the document has been received from the user. In another embodiment, the third determine document determines whether an auto-save feature has been activated.

If the third determine module 2118 determines the document should not be saved, then the authoring process 2100 cycles back to the obtain operation 2104 and begins again. If the third determine module 2118 determines the document should be saved, however, then a store operation 2120 adds an indication of the change in the document resulting from implementing the editing instruction to the store cache 2031 of the local cache 2035. For example, the store operation 2120 may add the editing instruction itself to the store cache 2031. In another embodiment, the store operation 2120 may add a content delta (e.g., an indication of the difference in the user copy caused by implementing the editing instruction) to the store cache 2031.

A fourth determine module 2122 determines whether the authoring application 2030 is configured in a public mode of operation or a private mode of operation. If the third determine module 2120 determines the authoring application 2030 is configured in a public mode of operation, then a publish operation 2124 shares the content updates with a storage device. For example, the local cache 2035 may copy the content updates saved in the store cache 2031 into an upload cache 2033 and transmit the upload cache 2033 to the storage device. In one embodiment, the publish operation 2124 indicates an order in which the changes and/or the editing instructions should be instantiated into the master copy of the document when the first user device is connected to the network 2060. The authoring process 2100 completes and ends at a stop module 2128.

If the fourth determine module 2122 determines the authoring application 2030 is configured in a private mode of operation, however, then a fifth determine module 2126 determines whether instructions to upload the content changes have been expressly provided by the user. If instructions to upload the content changes have been expressly provided, then the authoring process 2100 proceeds to the publish operation 2124. If, however, instructions to upload the content changes have not been provided, then the authoring process 2100 completes and ends at stop module 2122 as described above.

In general, a user device, such as user device 2010, synchronizes at least metadata when connected to a storage device via a network, such as network 2060. In one embodiment, the user device synchronizes metadata even when an authoring application is not executing. Whether or not the user device synchronizes content may depend on whether the authoring application is configured into a public mode of operation or a private mode of operation. The mode of operation into which the authoring application is configured may be relevant even if the authoring application is not executing when the user device is connected to the network.

FIG. 22 illustrates an operational flow for a transition process 2200 that may be implemented by a user device, such as user device 2010, when the user device is connected to a storage device via a network, such as network 2060. The transition process 2200 initializes and begins at a start module 2202 and proceeds to a connect operation 2204, which communicatively couples the user device 2010 to the network 2060. The user device 2010 may communicatively connect to a storage device storing a master copy of the document via the network 2060.

An obtain operation 2206 retrieves an updated version of the master copy of the document including content and metadata in order to begin synchronizing the user copy 2055 with the master copy. In one embodiment, the obtain operation 2206 polls the storage device for the most recent version of the master copy. In another embodiment, the obtain operation 2206 receives the most recent version from the storage device automatically when the connection is made. In one embodiment, the obtain operation 2206 is implemented even when the authoring application 2030 is not executing.

A compare operation 2208 determines any differences between the obtained master copy and the user copy 2055. For example, the compare operation 2208 determines any differences in metadata and/or any differences in content. A first determine module 2210 determines whether any conflicts exist between the user copy 2055 and the obtained master copy based on the comparison. For example, the first determine module 2210 may determine whether the authoring application 2030 edited any data units that were locked and/or edited on the master copy subsequent to when the user device 2010 went offline. In one embodiment, the compare operation 2208 and first determine module 2210 are implemented when the user device 2010 connects to the network 2060 regardless of whether the authoring application 2030 is executing.

If the first determine module 2210 determines that no conflicts exist, then the transition process 2200 proceeds to a first share operation 2214 that transmits metadata updates from the user copy of the document to the master copy. For example, the first share operation 2214 may transmit to the master copy lock requests for data units edited by the authoring application 2030. If the first determine module 2210 determines that conflicts exist, however, then a resolution operation 2212 inhibits further editing until the conflicts are resolved.

In general, the resolution operation 2212 provides notification to the user of the authoring application 2030 that conflicts exist. In one embodiment, the resolution operation 2212 provides the notification when the authoring application 2030 is accessed. In another embodiment, the resolution operation 2212 provides the notification when the authoring application 2030 accesses the user copy 2055 of the document. In one embodiment, the resolution operation 2212 displays the conflicts to the user and enables the user to fix the conflicts. In another embodiment, the resolution operation 2212 provides to the user a set of possible solutions to each conflict. When the conflicts have been resolved, the transition process 2200 proceeds to and executes the first share operation 2214 as described above.

A second determine operation 2216 ascertains the operating mode (e.g., public mode or private mode) of the authoring application 2030. If the second determine operation 2216 determines the authoring application 2030 is operating in public mode, then a second share operation 2222 transmits content updates to the storage device for integration into the master copy of the document. In one embodiment, the second share operation 2222 transmits all content changes stored in an upload cache 2033 (FIG. 21) in the local cache 2035. The transition process 2200 completes and ends at a stop module 2224.

If the second determine operation 2216 determines the authoring application 2030 is operating in private mode, however, then a third determine module 2220 determines whether the user has provided instructions to share the content updates. For example, the third determine module 2218 may receive instructions via a user interface of the authoring application 2030 to share changes despite the authoring application 2030 being configured into a private operating mode. In one embodiment, the third determine module 2218 ascertains a user command provided via a user interface of the authoring application 2030.

If the third determine module 2218 determines instructions to share content have been provided, then the transition process 2200 proceeds to a queue operation 2220 in which the content updates are prepared for transmission to the storage device. For example, the content updates may be stored in an update cache, such as update cache 2033 (FIG. 20). The transition process 2200 proceeds to and executes the second share operation 2222 as described above.

Embodiments of the disclosure may be implemented as a computer process (method), a computing system, or as an article of manufacture, such as a computer program product or computer readable media. The processes (programs) can be implemented in any number of ways, including the structures described in this document. One such way is by machine operations, of devices of the type described in this document. Another optional way is for one or more of the individual operations of the methods to be performed on a computing device in conjunction with one or more human operators performing some of the operations. These human operators need not be collocated with each other, but each can be only with a machine that performs a portion of the program.

The computer program product may be a computer storage media readable by a computer system and encoding a computer program of instructions for executing a computer process. The computer program product may also be a propagated signal on a carrier readable by a computing system and encoding a computer program of instructions for executing a computer process. The term computer readable media as used herein includes both storage media and communication media.

Those skilled in the art will appreciate that the disclosure may be practiced with other computer system configurations, including hand-held devices, multiprocessor systems, microprocessor-based or programmable consumer electronics, minicomputers, mainframe computers, and the like. The disclosure may also be practiced in distributed computing environments where tasks are performed by remote processing devices that are linked through a communications network. In a distributed computing environment, program modules may be located in both local and remote memory storage devices. Generally, program modules include routines, programs, components, data structures, and other types of structures that perform particular tasks or implement particular abstract data types.

We claim:

1. An authoring system for editing a user copy of a document on a user device, the user copy being generated based on a master copy of the document, the authoring system comprising:
   a processor in communication with a memory storing instructions, the processor executing the instructions to:
   provide a local cache stored on the user device, the local cache including a single store cache, a single obtain cache and a single upload cache;
   provide an authoring application configured to execute on the user device, the authoring application being configured to edit the user copy of a document, the authoring application being adapted to be selectively configured into an operating mode selected from the group consisting of a public operating mode and a private operating mode, the authoring application being configured to generate metadata updates based on edits made to the user copy of the document by a local user and to generate content updates based on edits made to the user copy of the document by the local user;
   synchronize the metadata updates between the user copy of the document and the master copy of the document regardless of the mode of operation into which the authoring application is configured;
   store the generated content updates into the store cache of the local cache;
   store the generated content updates into the upload cache when the authoring application is configured into the public operating mode; and
   share the content updates stored in the upload cache with the master copy of the document, wherein sharing the content updates with the master copy of the document signals a computing device hosting the master copy of the document to integrate the content updates into the master copy.

2. The authoring system of claim 1, wherein the authoring system is further operable to:
   obtain external content updates from the master copy of the document regardless of the operating mode into which the authoring application is configured, the external content updates being generated by one or more other authoring applications; and
   store the external content updates obtained from the master copy in the obtain cache.

3. The authoring system of claim 2, wherein the authoring application is configured to provide an indication that external content updates are available when the external content updates are stored in the obtain cache, and wherein the authoring application is configured to instantiate the external content updates into the user copy of the document.

4. The authoring system of claim 1, wherein the authoring system is further operable to: store the generated content updates into the upload cache when the authoring application is configured in the private operating mode and the authoring system received instructions to share the content updates.

5. The authoring system of claim 1, wherein the authoring application is configured to access the master copy of the document via a connection to a network.

6. The authoring system of claim 5, wherein the authoring application is configured to enable editing of the user copy of the document when the authoring application is not connected to the network.

7. The authoring system of claim 5, wherein the authoring application is configured to provide a warning when the authoring application is not connected to the network, the warning indicating the authoring application cannot synchronize the user copy with the master copy.

8. The authoring system of claim 1, wherein the metadata updates include at least one lock generated by the authoring application around at least one data unit of the document that is being edited, the lock inhibiting other authoring applications from editing the data unit on a respective user copy of the document.

9. A computer-implemented method of synchronizing a user copy of a document with a master copy of the document, the user copy of the document being stored on a user device and the master copy of the document being stored on a storage device that is configured to be communicatively coupled to the user device, the method comprising:
   connecting the user device to the storage device;
   selecting a private mode of operation for an authoring application;
   receiving, at the user device, edits made by a local user to the user copy of the document with the authoring application to generate a local content update;
   storing in a single local cache of the user device the local content update and a local metadata update related to the local content update;
   transmitting periodically from the single local cache of the user device to the storage device the local metadata update without transmitting the local content update, wherein the local metadata update is instantiated into the master copy stored on the storage device;
   receiving periodically at the single local cache of the user device external metadata updates from the master copy of the document based on metadata edits made by coauthors to coauthor copies of the document when the master copy has been updated to include the external metadata updates;
   instantiating the external metadata updates received from the master copy of the document into the user copy of the document;
   receiving periodically at the single local cache of the user device, external content updates from the master copy of the document based on content edits made by the coauthors to the coauthor copies of the document when the master copy has been updated to include the external content updates.

10. The computer-implemented method of claim 9, further comprising:
    receiving instantiation instructions; and
    instantiating the external content updates into the user copy of the document in accordance with instantiation instructions.

11. The computer-implemented method of claim 9, further comprising:
    providing an indication of availability of the external content updates within the authoring application;
    receiving instructions to view the external content updates within the authoring application;
    providing options for instantiating the external content updates within the user copy of the document; and
    implementing selected options for instantiating the external content updates within the user copy of the document.

12. The computer-implemented method of claim 9, further comprising:
    receiving instructions to configure the authoring application into a public mode of operation;
    toggling the authoring application into the public mode of operation; and
    sharing with the master copy of the document the local content update stored in the local cache at the user device.

13. The computer-implemented method of claim 12, further comprising:
    disconnecting the user device from the storage device;
    continuing to edit the user copy of the document with the authoring application;
    storing at the user device any content updates generated by the authoring application after disconnecting the user device from the storage device; and
    sharing the content updates stored at the user device when the user device is reconnected to the storage device.

14. The computer-implemented method of claim 9, further comprising:
    disconnecting the user device from the storage device;
    continuing to edit the user copy of the document with the authoring application; and
    storing at the user device any content updates generated by the authoring application after disconnecting the user device from the storage device;
    wherein the content updates stored at the user device are not shared with the storage device when the user device is reconnected to the storage device until the authoring application is toggled into the public mode of operation.

15. The authoring system of claim 1, wherein the generated content updates stored in the store cache of the local cache during the private operating mode are held until changing to the public operating mode, wherein in response to changing to the public operating mode the content updates are stored in the upload cache to be shared with the master copy of the document.

16. A computer readable storage device storing computer executable instructions, which perform a method of authoring a user copy of a document stored on a user device when executed by a computing device, the method comprising:
    configuring an authoring application configured to be executed by the user device to locally author the user copy of the document into one of: a public mode of operation and a private mode of operation;
    receiving edits from a local user to the user copy of the document with the authoring application to generate a plurality of local content updates;
    storing and queuing the plurality of local content updates in a single local cache of the user device;
    storing in the single local cache metadata updates generated by the authoring application in response to the edits from the local user to the user copy of the documents;
    connecting the user device to the storage device;
    when the authoring application is configured into the public mode of operation:
       sharing the plurality of local content updates from the single local cache to the connected storage device; and
       sharing the metadata updates from the single local cache to the connected storage device; and
    when the authoring application is configured into the private mode of operation:
       withholding the plurality of local content updates from the single local cache from the connected storage device; and
       sharing the metadata updates from the single local cache to the connected storage device.

17. The computer readable storage device of claim 16, further comprising:
    sharing the local content updates stored in the local cache according to the queue when the user device is connected to the storage device even if the authoring application is closed before the user device is connected.

18. The computer readable storage device of claim 16, further comprising:

obtaining external metadata updates based on external metadata updates made by coauthors to coauthor copies of the document from the master copy of the document after connecting the user device to the storage device; and instantiating the external metadata updates into the user copy of the document automatically.

19. The computer readable storage device of claim 16, wherein storing and queueing the plurality of local content updates in the single local cache of the user device comprises storing the plurality of local content updates in the local cache when the authoring application receives finalization instructions from the local user.

20. The computer readable storage device of claim 19, wherein receiving the finalization instructions triggers sharing of the plurality of local content updates from the single local cache to the connected storage device when the authoring application is configured into the public mode.

* * * * *